(12) United States Patent
Zhao et al.

(10) Patent No.: US 11,652,999 B2
(45) Date of Patent: May 16, 2023

(54) IMAGE ENCODING/DECODING METHOD AND APPARATUS USING ADAPTIVE TRANSFORM, AND METHOD FOR TRANSMITTING BITSTREAM

(71) Applicant: LG ELECTRONICS INC., Seoul (KR)

(72) Inventors: Jie Zhao, Seoul (KR); Seung Hwan Kim, Seoul (KR); Hendry Hendry, Seoul (KR); Seethal Paluri, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/731,044

(22) Filed: Apr. 27, 2022

(65) Prior Publication Data

US 2022/0329814 A1    Oct. 13, 2022

Related U.S. Application Data

(63) Continuation of application No. PCT/KR2020/014845, filed on Oct. 28, 2020.

(Continued)

(51) Int. Cl.
*H04N 19/132*    (2014.01)
*H04N 19/18*    (2014.01)
(Continued)

(52) U.S. Cl.
CPC ......... *H04N 19/132* (2014.11); *H04N 19/176* (2014.11); *H04N 19/18* (2014.11); *H04N 19/186* (2014.11); *H04N 19/70* (2014.11)

(58) Field of Classification Search
CPC .... H04N 19/124; H04N 19/186; H04N 19/82; H04N 19/159; H04N 19/61; H04N 19/117; H04N 19/52
See application file for complete search history.

(56) References Cited

U.S. PATENT DOCUMENTS

2015/0264364 A1 * 9/2015 Zhang ................... H04N 19/14
375/240.18
2015/0358631 A1 * 12/2015 Zhang ................... H04N 19/176
375/240.16
(Continued)

FOREIGN PATENT DOCUMENTS

KR    10-2028186    10/2019
KR    10-2032603    10/2019
WO    WO-2015138962 A1 *  9/2015    ........... H04N 19/102

OTHER PUBLICATIONS

"Adaptive Color-Space Transform in HEVC Screen Content Coding"— Li Zhang et al.; IEEE Journal on Emerging and Selected Topics in Circuits and Systems, vol. 6, No. 4, Dec. 2016. (Year: 2016).*

(Continued)

*Primary Examiner* — Mainul Hasan
(74) *Attorney, Agent, or Firm* — Dentons US LLP

(57) ABSTRACT

An image encoding/decoding method and apparatus are provided. The image decoding method performed by the image decoding apparatus, according to the present disclosure, comprises the steps of: determining a current block by splitting an image on the basis of split information acquired from a bitstream; determining a quantization parameter of the current block; and determining a transform coefficient of the current block on the basis of the quantization parameter.

15 Claims, 38 Drawing Sheets

Related U.S. Application Data

(60) Provisional application No. 62/957,128, filed on Jan. 4, 2020, provisional application No. 62/939,533, filed on Nov. 22, 2019, provisional application No. 62/931,786, filed on Nov. 6, 2019, provisional application No. 62/927,113, filed on Oct. 28, 2019.

(51) Int. Cl.
  *H04N 19/186* (2014.01)
  *H04N 19/176* (2014.01)
  *H04N 19/70* (2014.01)

(56) References Cited

U.S. PATENT DOCUMENTS

| | | | | |
|---|---|---|---|---|
| 2016/0100168 A1* | 4/2016 | Rapaka | ............... | H04N 19/12 |
| | | | | 375/240.03 |
| 2017/0134728 A1* | 5/2017 | Sullivan | ............... | H04N 19/70 |
| 2020/0404275 A1* | 12/2020 | Hsiang | ............... | H04N 19/186 |
| 2020/0413101 A1* | 12/2020 | Ramasubramonian | ............... | |
| | | | | H04N 19/176 |

OTHER PUBLICATIONS

JVET-O0919-v4 Jul. 11, 2019 for Gothenburg meeting (MPEG No. m49373), M. Karczewicz et al., "NonCE8: Minimum QP for Transform Skip Mode" 5 pages.

JVET-P0339-v4 Oct. 8, 2019 for Geneva meeting (MPEG No. m50306), Z. Want et al., "AHG15: Signalling of CU level chroma QP offset" 10 pages.

JVET-P0517-v3 Jan. 11, 2019 for Geneva meeting (MPEG No. m50488), X. Xiu et al., "Support of adaptive color transform for 4444 video coding in VVC" 6 pages.

* cited by examiner

FIG. 4
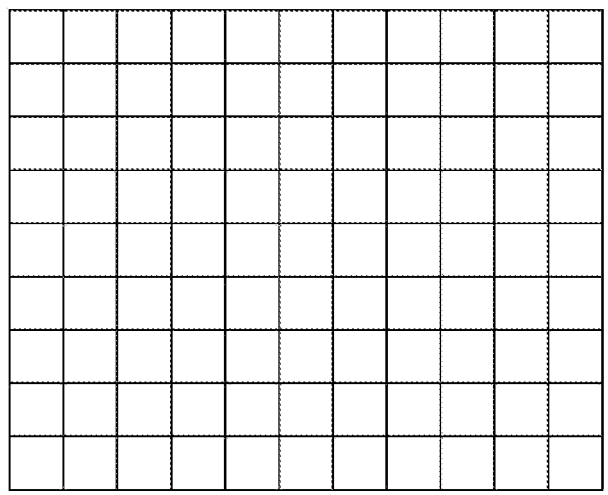
FIG. 5
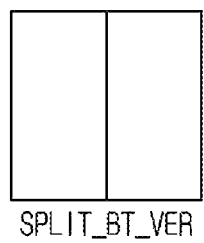 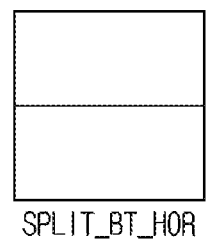 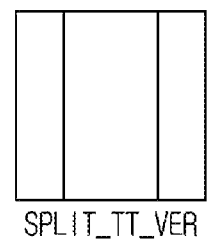 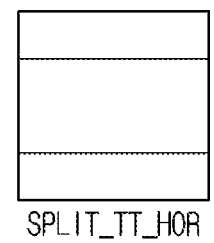
SPLIT_BT_VER  SPLIT_BT_HOR  SPLIT_TT_VER  SPLIT_TT_HOR

FIG. 21

| coding_unit( x0, y0, cbWidth, cbHeight, cqtDepth, treeType, modeType ) { | Descriptor |
|---|---|
| chType = treeType == DUAL_TREE_CHROMA? 1 : 0 | |
| if( slice_type != I \|\| sps_ibc_enabled_flag \|\| sps_palette_enabled_flag) { | |
| if( treeType != DUAL_TREE_CHROMA && <br> !( ( ( cbWidth == 4 && cbHeight == 4 ) \|\| modeType == MODE_TYPE_INTRA ) <br> && !sps_ibc_enabled_flag ) ) | |
| cu_skip_flag[ x0 ][ y0 ] | ae(v) |
| if( cu_skip_flag[ x0 ][ y0 ] == 0 && slice_type != I <br> && !( cbWidth == 4 && cbHeight == 4 ) && modeType == MODE_TYPE_ALL ) | |
| pred_mode_flag | ae(v) |
| if( ( ( slice_type == I && cu_skip_flag[ x0 ][ y0 ] ==0 ) \|\| <br> ( slice_type != I && ( CuPredMode[ chType ][ x0 ][ y0 ] != MODE_INTRA \|\| <br> ( cbWidth == 4 && cbHeight == 4 && cu_skip_flag[ x0 ][ y0 ] == 0 ) ) ) ) && <br> cbWidth <= 64 && cbHeight <=64 && modeType != MODE_TYPE_INTER && <br> sps_ibc_enabled_flag && treeType != DUAL_TREE_CHROMA) | |
| pred_mode_ibc_flag | ae(v) |
| if( CuPredMode[ x0 ][ y0 ] == MODE_INTRA && sps_palette_enabled_flag && <br> cbWidth <= 64 && cbHeight <= 64 && cu_skip_flag[ x0 ][ y0 ] == 0 && <br> modeType != MODE_TYPE_INTER ) | |
| pred_mode_plt_flag | ae(v) |
| } | |
| if( CuPredMode[ chType ][ x0 ][ y0 ] == MODE_INTRA && sps_act_enabled_flag && <br> treeType == SINGLE_TREE ) | |
| cu_act_enabled_flag | ae(v) |

| | |
|---|---|
| if( CuPredMode[ chType ][ x0 ][ y0 ] == MODE_INTRA \|\| | |
|   CuPredMode[ chType ][ x0 ][ y0 ] == MODE_PLT ) { | |
|   if( treeType == SINGLE_TREE \|\| treeType == DUAL_TREE_LUMA ) { | |
|     if( pred_mode_plt_flag ) { | |
|       if( treeType == DUAL_TREE_LUMA ) | |
|         palette_coding( x0, y0, cbWidth, cbHeight, 0, 1 ) | |
|       else /* SINGLE_TREE */ | |
|         palette_coding( x0, y0, cbWidth, cbHeight, 0, 3 ) | |
|     } else { | |
|       if( sps_bdpcm_enabled_flag && | |
|         cbWidth <= MaxTsSize && cbHeight <= MaxTsSize ) | |
|         intra_bdpcm_luma_flag | ae(v) |
|       if( intra_bdpcm_luma_flag ) | |
|         intra_bdpcm_luma_dir_flag | ae(v) |
|       else { | |
|         if( sps_mip_enabled_flag ) | |
|           intra_mip_flag[ x0 ][ y0 ] | ae(v) |
|         if( intra_mip_flag[ x0 ][ y0 ] ) { | |
|           intra_mip_transposed[ x0 ][ y0 ] | ae(v) |
|           intra_mip_mode[ x0 ][ y0 ] | ae(v) |
|         } else { | |
|           if( sps_mrl_enabled_flag && ( ( y0 % CtbSizeY ) > 0 ) ) | |
|             intra_luma_ref_idx[ x0 ][ y0 ] | ae(v) |
|           if( sps_isp_enabled_flag && intra_luma_ref_idx[ x0 ][ y0 ] == 0 && | |
|             ( cbWidth <= MaxTbSizeY && cbHeight <= MaxTbSizeY ) && | |
|             ( cbWidth * cbHeight > MinTbSizeY * MinTbSizeY ) && !cu_act_enabled_flag ) | |
|             intra_subpartitions_mode_flag[ x0 ][ y0 ] | ae(v) |
|           if( intra_subpartitions_mode_flag[ x0 ][ y0 ] == 1 ) | |
|             intra_subpartitions_split_flag[ x0 ][ y0 ] | ae(v) |
|           if( intra_luma_ref_idx[ x0 ][ y0 ] == 0 ) | |
|             intra_luma_mpm_flag[ x0 ][ y0 ] | ae(v) |
|           if( intra_luma_mpm_flag[ x0 ][ y0 ] ) { | |
|             if( intra_luma_ref_idx[ x0 ][ y0 ] == 0 ) | |
|               intra_luma_not_planar_flag[ x0 ][ y0 ] | ae(v) |
|             if( intra_luma_not_planar_flag[ x0 ][ y0 ] ) | |
|               intra_luma_mpm_idx[ x0 ][ y0 ] | ae(v) |
|           } else | |
|             intra_luma_mpm_remainder[ x0 ][ y0 ] | ae(v) |
|         } | |
|       } | |
|     } | |
|   } | |

FIG. 23

| | |
|---|---|
| if( ( treeType == SINGLE_TREE \|\| treeType == DUAL_TREE_CHROMA ) && ChromaArrayType != 0 ) { | |
|   if( pred_mode_plt_flag && treeType == DUAL_TREE_CHROMA ) | |
|     palette_coding( x0, y0, cbWidth / SubWidthC, cbHeight / SubHeightC, 1, 2 ) | |
|   else { | |
|     if( !cu_act_enabled_flag ) { | |
|       if( cbWidth <= MaxTsSize && cbHeight <= MaxTsSize && sps_bdpcm_chroma_enabled_flag ) { | |
|         intra_bdpcm_chroma_flag | ae(v) |
|         if( intra_bdpcm_chroma_flag ) | |
|           intra_bdpcm_chroma_dir_flag | ae(v) |
|       } else { | |
|         if( CclmEnabled ) | |
|           cclm_mode_flag | ae(v) |
|         if( cclm_mode_flag ) | |
|           cclm_mode_idx | ae(v) |
|         else | |
|           intra_chroma_pred_mode | ae(v) |
|       } | |
|     } | |
|   } | |
| } | |
| } else if( treeType != DUAL_TREE_CHROMA ) { /* MODE_INTER or MODE_IBC */ | |
|   if( cu_skip_flag[ x0 ][ y0 ] == 0 ) | |
|     general_merge_flag[ x0 ][ y0 ] | ae(v) |
|   if( general_merge_flag[ x0 ][ y0 ] ) | |
|     merge_data( x0, y0, cbWidth, cbHeight, chType ) | |
|   else if( CuPredMode[ chType ][ x0 ][ y0 ] == MODE_IBC ) { | |
|     mvd_coding( x0, y0, 0, 0 ) | |
|     if( MaxNumIbcMergeCand > 1 ) | |
|       mvp_l0_flag[ x0 ][ y0 ] | ae(v) |
|     if( sps_amvr_enabled_flag && ( MvdL0[ x0 ][ y0 ][ 0 ] != 0 \|\| MvdL0[ x0 ][ y0 ][ 1 ] != 0 ) ) | |
|       amvr_precision_idx[ x0 ][ y0 ] | ae(v) |

FIG. 24

| | |
|---|---|
| } else { | |
| if( slice_type = = B ) | |
|   inter_pred_idc[ x0 ][ y0 ] | ae(v) |
| if( sps_affine_enabled_flag && cbWidth >= 16 && cbHeight >= 16 ) { | |
|   inter_affine_flag[ x0 ][ y0 ] | ae(v) |
| if( sps_affine_type_flag && inter_affine_flag[ x0 ][ y0 ] ) | |
|   cu_affine_type_flag[ x0 ][ y0 ] | ae(v) |
| } | |
| if( sps_smvd_enabled_flag && !mvd_l1_zero_flag && | |
|   inter_pred_idc[ x0 ][ y0 ] = = PRED_BI && | |
|   !inter_affine_flag[ x0 ][ y0 ] && RefIdxSymL0 > −1 && RefIdxSymL1 > −1 ) | |
|   sym_mvd_flag[ x0 ][ y0 ] | ae(v) |
| if( inter_pred_idc[ x0 ][ y0 ] != PRED_L1 ) { | |
|   if( NumRefIdxActive[ 0 ] > 1 && !sym_mvd_flag[ x0 ][ y0 ] ) | |
|     ref_idx_l0[ x0 ][ y0 ] | ae(v) |
|   mvd_coding( x0, y0, 0, 0 ) | |
|   if( MotionModelIdc[ x0 ][ y0 ] > 0 ) | |
|     mvd_coding( x0, y0, 0, 1 ) | |
|   if(MotionModelIdc[ x0 ][ y0 ] > 1 ) | |
|     mvd_coding( x0, y0, 0, 2 ) | |
|   mvp_l0_flag[ x0 ][ y0 ] | ae(v) |
| } else { | |
|   MvdL0[ x0 ][ y0 ][ 0 ] = 0 | |
|   MvdL0[ x0 ][ y0 ][ 1 ] = 0 | |
| } | |
| if( inter_pred_idc[ x0 ][ y0 ] != PRED_L0 ) { | |
|   if( NumRefIdxActive[ 1 ] > 1 && !sym_mvd_flag[ x0 ][ y0 ] ) | |
|     ref_idx_l1[ x0 ][ y0 ] | ae(v) |
|   if( mvd_l1_zero_flag && inter_pred_idc[ x0 ][ y0 ] = = PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |

FIG. 25

| | |
|---|---|
|     } else { | |
|         if( sym_mvd_flag[ x0 ][ y0 ] ) { | |
|             MvdL1[ x0 ][ y0 ][ 0 ] = −MvdL0[ x0 ][ y0 ][ 0 ] | |
|             MvdL1[ x0 ][ y0 ][ 1 ] = −MvdL0[ x0 ][ y0 ][ 1 ] | |
|         } else | |
|             mvd_coding( x0, y0, 1, 0 ) | |
|         if( MotionModelIdc[ x0 ][ y0 ] > 0 ) | |
|             mvd_coding( x0, y0, 1, 1 ) | |
|         if(MotionModelIdc[ x0 ][ y0 ] > 1 ) | |
|             mvd_coding( x0, y0, 1, 2 ) | |
|         mvp_l1_flag[ x0 ][ y0 ] | ae(v) |
|     } | |
| } else { | |
|     MvdL1[ x0 ][ y0 ][ 0 ] = 0 | |
|     MvdL1[ x0 ][ y0 ][ 1 ] = 0 | |
| } | |
| if( ( sps_amvr_enabled_flag && inter_affine_flag[ x0 ][ y0 ] == 0 && | |
|     ( MvdL0[ x0 ][ y0 ][ 0 ] != 0 \|\| MvdL0[ x0 ][ y0 ][ 1 ] != 0 \|\| | |
|     MvdL1[ x0 ][ y0 ][ 0 ] != 0 \|\| MvdL1[ x0 ][ y0 ][ 1 ] != 0 ) ) \|\| | |
|     ( sps_affine_amvr_enabled_flag && inter_affine_flag[ x0 ][ y0 ] == 1 && | |
|     ( MvdCpL0[ x0 ][ y0 ][ 0 ][ 0 ] != 0 \|\| MvdCpL0[ x0 ][ y0 ][ 0 ][ 1 ] != 0 \|\| | |
|     MvdCpL1[ x0 ][ y0 ][ 0 ][ 0 ] != 0 \|\| MvdCpL1[ x0 ][ y0 ][ 0 ][ 1 ] != 0 \|\| | |
|     MvdCpL0[ x0 ][ y0 ][ 1 ][ 0 ] != 0 \|\| MvdCpL0[ x0 ][ y0 ][ 1 ][ 1 ] != 0 \|\| | |
|     MvdCpL1[ x0 ][ y0 ][ 1 ][ 0 ] != 0 \|\| MvdCpL1[ x0 ][ y0 ][ 1 ][ 1 ] != 0 \|\| | |
|     MvdCpL0[ x0 ][ y0 ][ 2 ][ 0 ] != 0 \|\| MvdCpL0[ x0 ][ y0 ][ 2 ][ 1 ] != 0 \|\| | |
|     MvdCpL1[ x0 ][ y0 ][ 2 ][ 0 ] != 0 \|\| MvdCpL1[ x0 ][ y0 ][ 2 ][ 1 ] != 0 ) ) { | |
|     amvr_flag[ x0 ][ y0 ] | ae(v) |
|     if( amvr_flag[ x0 ][ y0 ] ) | |
|         amvr_precision_idx[ x0 ][ y0 ] | ae(v) |
| } | |
| if( sps_bcw_enabled_flag && inter_pred_idc[ x0 ][ y0 ] == PRED_BI && | |
|     luma_weight_l0_flag[ ref_idx_l0 [ x0 ][ y0 ] ] == 0 && | |
|     luma_weight_l1_flag[ ref_idx_l1 [ x0 ][ y0 ] ] == 0 && | |
|     chroma_weight_l0_flag[ ref_idx_l0 [ x0 ][ y0 ] ] == 0 && | |
|     chroma_weight_l1_flag[ ref_idx_l1 [ x0 ][ y0 ] ] == 0 && | |
|     cbWidth * cbHeight >= 256 ) | |
|     bcw_idx[ x0 ][ y0 ] | ae(v) |
|     } | |
| } | |

FIG. 26

| | |
|---|---|
| if( CuPredMode[ chType ][ x0 ][ y0 ] != MODE_INTRA && !pred_mode_plt_flag && general_merge_flag[ x0 ][ y0 ] == 0 ) | |
|   cu_cbf | ae(v) |
| if( cu_cbf ) { | |
|   if( CuPredMode[ chType ][ x0 ][ y0 ] == MODE_INTER && sps_sbt_enabled_flag && !ciip_flag[ x0 ][ y0 ] && !MergeTriangleFlag[ x0 ][ y0 ] ) { | |
|     if( cbWidth <= MaxTbSizeY && cbHeight <= MaxTbSizeY ) { | |
|       allowSbtVerH = cbWidth >= 8 | |
|       allowSbtVerQ = cbWidth >= 16 | |
|       allowSbtHorH = cbHeight >= 8 | |
|       allowSbtHorQ = cbHeight >= 16 | |
|       if( allowSbtVerH || allowSbtHorH || allowSbtVerQ || allowSbtHorQ ) | |
|         cu_sbt_flag | ae(v) |
|     } | |
|     if( cu_sbt_flag ) { | |
|       if( ( allowSbtVerH || allowSbtHorH ) && ( allowSbtVerQ || allowSbtHorQ ) ) | |
|         cu_sbt_quad_flag | ae(v) |
|       if( ( cu_sbt_quad_flag && allowSbtVerQ && allowSbtHorQ ) || ( !cu_sbt_quad_flag && allowSbtVerH && allowSbtHorH ) ) | |
|         cu_sbt_horizontal_flag | ae(v) |
|         cu_sbt_pos_flag | ae(v) |
|     } | |
|   } | |

FIG. 27

| | |
|---|---|
| if( sps_act_enabled_flag && CuPredMode[ chType ][ x0 ][ y0 ] != MODE_INTRA && <br> treeType == SINGLE_TREE ) | |
| 2710— cu_act_enabled_flag | ae(v) |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType == DUAL_TREE_CHROMA ) ? cbWidth / SubWidthC <br> : ( ( IntraSubPartitionsSplitType == ISP_VER_SPLIT ) ? cbWidth / <br> NumIntraSubPartitions : cbWidth ) | |
| lfnstHeight = ( treeType == DUAL_TREE_CHROMA ) ? cbHeight / SubHeightC <br> : ( ( IntraSubPartitionsSplitType == ISP_HOR_SPLIT ) ? cbHeight / <br> NumIntraSubPartitions : cbHeight ) | |
| if( Min( lfnstWidth, lfnstHeight ) >= 4 && sps_lfnst_enabled_flag == 1 && <br> CuPredMode[ chType ][ x0 ][ y0 ] == MODE_INTRA && <br> ( !intra_mip_flag[ x0 ][ y0 ] \|\| Min( lfnstWidth, lfnstHeight ) >= 16 ) && <br> Max( cbWidth, cbHeight ) <= MaxTbSizeY) { | |
| if( ( IntraSubPartitionsSplitType != ISP_NO_SPLIT \|\| LfnstDcOnly == 0 ) && <br> LfnstZeroOutSigCoeffFlag == 1 ) | |
| lfnst_idx | ae(v) |
| } | |
| if( treeType != DUAL_TREE_CHROMA && lfnst_idx == 0 && <br> transform_skip_flag[ x0 ][ y0 ][ 0 ] == 0 && Max( cbWidth, cbHeight ) <= 32 && <br> IntraSubPartitionsSplit[ x0 ][ y0 ] == ISP_NO_SPLIT && cu_sbt_flag == 0 && <br> MtsZeroOutSigCoeffFlag == 1 && tu_cbf_luma[ x0 ][ y0 ]) { | |
| if( ( ( CuPredMode[ chType ][ x0 ][ y0 ] == MODE_INTER && <br> sps_explicit_mts_inter_enabled_flag ) \|\| <br> ( CuPredMode[ chType ][ x0 ][ y0 ] == MODE_INTRA && <br> sps_explicit_mts_intra_enabled_flag ) ) ) | |
| mts_idx | ae(v) |
| } | |
| } | |

FIG. 28

| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | Descriptor |
|---|---|
| if( ( allowSplitBtVer \|\| allowSplitBtHor \|\| allowSplitTtVer \|\| allowSplitTtHor \|\| allowSplitQt ) && ( x0 + cbWidth <= pps_pic_width_in_luma_samples ) && ( y0 + cbHeight <= pps_pic_height_in_luma_samples ) ) | |
|    split_cu_flag | ae(v) |
| if( pps_cu_qp_delta_enabled_flag && qgOnY && cbSubdiv <= CuQpDeltaSubdiv ) { | |
|    IsCuQpDeltaCoded = 0 | |
|    CuQpDeltaVal = 0 | |
|    CuQgTopLeftX = x0 | |
|    CuQgTopLeftY = y0 | |
| } | |
| ... | ... |

FIG. 30

| Horizontal BDPCM | | | | | |
|---|---|---|---|---|---|
| $Q(r_{0,0})$ | $Q(r_{1,0})$ $-Q(r_{0,0})$ | ... | $Q(r_{M-2,0})$ $-Q(r_{M-3,0})$ | $Q(r_{M-1,0})$ $-Q(r_{M-2,0})$ |
| $Q(r_{0,1})$ | $Q(r_{1,1})$ $-Q(r_{0,1})$ | ... | $Q(r_{M-2,1})$ $-Q(r_{M-3,1})$ | $Q(r_{M-1,1})$ $-Q(r_{M-2,1})$ |
| ... | ... | ... | ... | ... |
| $Q(r_{0,N-2})$ | $Q(r_{1,N-2})$ $-Q(r_{0,N-2})$ | ... | $Q(r_{M-2,N-2})$ $-Q(r_{M-3,N-2})$ | $Q(r_{M-1,N-2})$ $-Q(r_{M-2,N-2})$ |
| $Q(r_{0,N-1})$ | $Q(r_{1,N-1})$ $-Q(r_{0,N-1})$ | ... | $Q(r_{M-2,N-1})$ $-Q(r_{M-3,N-1})$ | $Q(r_{M-1,N-1})$ $-Q(r_{M-2,N-1})$ |

| Vertical BDPCM | | | | | |
|---|---|---|---|---|---|
| $Q(r_{0,0})$ | $Q(r_{1,0})$ | ... | $Q(r_{M-2,0})$ | $Q(r_{M-1,0})$ |
| $Q(r_{0,1})$ $-Q(r_{0,0})$ | $Q(r_{1,1})$ $-Q(r_{1,0})$ | ... | $Q(r_{M-2,1})$ $-Q(r_{M-2,0})$ | $Q(r_{M-1,1})$ $-Q(r_{M-1,0})$ |
| ... | ... | ... | ... | ... |
| $Q(r_{0,N-2})$ $-Q(r_{0,N-3})$ | $Q(r_{1,N-2})$ $-Q(r_{1,N-3})$ | ... | $Q(r_{M-2,N-2})$ $-Q(r_{M-2,N-3})$ | $Q(r_{M-1,N-2})$ $-Q(r_{M-1,N-3})$ |
| $Q(r_{0,N-1})$ $-Q(r_{0,N-2})$ | $Q(r_{1,N-1})$ $-Q(r_{1,N-2})$ | ... | $Q(r_{M-2,N-1})$ $-Q(r_{M-2,N-2})$ | $Q(r_{M-1,N-1})$ $-Q(r_{M-1,N-2})$ |

FIG. 33

| seq_parameter_set_rbsp() { | Descriptor |
|---|---|
| (...) | |
|   sps_transform_skip_enabled_flag | u(1) |
|   if( sps_transform_skip_enabled_flag ) | |
|     sps_bdpcm_enabled_flag | u(1) |
|   (...) | |
| } | |

FIG. 34

| general_constraint_info() { | Descriptor |
|---|---|
| (...) | |
|   no_transform_skip_constraint_flag | u(1) |
|   no_bdpcm_constraint_flag | u(1) |
| (...) | |
| } | |

FIG. 35

| coding_unit( x0, y0, cbWidth, cbHeight, cqtDepth, treeType, modeType ) { | Descriptor |
|---|---|
|   chType = treeType == DUAL_TREE_CHROMA ? 1 : 0 | |
|   if( slice_type != I \|\| sps_ibc_enabled_flag \|\| sps_palette_enabled_flag) { | |
|     if( treeType != DUAL_TREE_CHROMA && | |
|       !( ( cbWidth == 4 && cbHeight == 4 ) \|\| modeType == MODE_TYPE_INTRA ) | |
|       && !sps_ibc_enabled_flag ) ) | |
|       cu_skip_flag[ x0 ][ y0 ] | ae(v) |
|     if( cu_skip_flag[ x0 ][ y0 ] == 0 && slice_type != I | |
|       && !( cbWidth == 4 && cbHeight == 4 ) && modeType == MODE_TYPE_ALL ) | |
|       pred_mode_flag | ae(v) |
|     if( ( ( slice_type == I && cu_skip_flag[ x0 ][ y0 ] == 0 ) \|\| | |
|       ( slice_type != I && ( CuPredMode[ chType ][ x0 ][ y0 ] != MODE_INTRA \|\| | |
|       ( cbWidth == 4 && cbHeight == 4 && cu_skip_flag[ x0 ][ y0 ] == 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|     if( ( ( ( slice_type == I \|\| ( cbWidth == 4 && cbHeight == 4 ) \|\| sps_ibc_enabled_flag ) && | |
|       CuPredMode[ x0 ][ y0 ] == MODE_INTRA ) \|\| | |
|       ( slice_type != I && !( cbWidth == 4 && cbHeight == 4 ) && !sps_ibc_enabled_flag | |
|       && CuPredMode[ x0 ][ y0 ] != MODE_INTRA ) ) && sps_palette_enabled_flag && | |
|       cbWidth <= 64 && cbHeight <= 64 && && cu_skip_flag[ x0 ][ y0 ] == 0 && | |
|       modeType != MODE_INTER ) | |
|       pred_mode_plt_flag | ae(v) |
|   } | |
|   if( CuPredMode[ chType ][ x0 ][ y0 ] == MODE_INTRA \|\| | |
|     CuPredMode[ chType ][ x0 ][ y0 ] == MODE_PLT ) { | |
|     if( treeType == SINGLE_TREE \|\| treeType == DUAL_TREE_LUMA ) { | |
|       if( pred_mode_plt_flag ) { | |
|         if( treeType == DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag && | |
|           cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|       (...) | |

FIG. 36

| pic_parameter_set_rbsp( ) { | Descriptor |
|---|---|
|   ...... | |
| | |
|   pps_act_qp_offsets_present_flag | u(1) |
|   pps_act_y_qp_offset_plus5 | se(v) |
|   pps_act_cb_qp_offset_plus5 | se(v) |
|   pps_act_cr_qp_offset_plus3 | se(v) |
|   ... | |
| } | |

FIG. 37

| Coding_unit( x0, y0, cbWidth, cbHeight, cqtDepth, treeType, modeType ) { | Descriptor |
|---|---|
| ... | |
| if( ( treeType == SINGLE_TREE \|\| treeType == DUAL_TREE_CHROMA ) && ChromaArrayType != 0 ) { | |
| if( pred_mode_plt_flag && treeType == DUAL_TREE_CHROMA ) | |
| palette_coding( x0, y0, cbWidth / SubWidthC, cbHeight / SubHeightC, 1, 2 ) | |
| else { | |
| ~~if( !cu_act_enabled_flag ) {~~ | |
| if( cbWidth <= MaxTsSize && cbHeight <= MaxTsSize && sps_bdpcm_chroma_enabled_flag ) { | |
| intra_bdpcm_chroma_flag | ae(v) |
| if( intra_bdpcm_chroma_flag ) | |
| intra_bdpcm_chroma_dir_flag | ae(v) |
| } else if( !cu_act_enabled_flag ) { | |
| if( CclmEnabled ) | |
| cclm_mode_flag | ae(v) |
| if( cclm_mode_flag ) | |
| cclm_mode_idx | ae(v) |
| else | |
| intra_chroma_pred_mode | ae(v) |
| } | |
| ~~}~~ | |
| } | |
| } | |
| } else if( treeType != DUAL_TREE_CHROMA ) { /* MODE_INTER or MODE_IBC */ | |
| ... | |

FIG. 38

| Coding_unit( x0, y0, cbWidth, cbHeight, cqtDepth, treeType, modeType ) { | Descriptor |
|---|---|
| ... | |
| if( ( treeType == SINGLE_TREE \|\| treeType == DUAL_TREE_CHROMA ) && ChromaArrayType != 0 ) { | |
| if( pred_mode_plt_flag && treeType == DUAL_TREE_CHROMA ) | |
| palette_coding( x0, y0, cbWidth / SubWidthC, cbHeight / SubHeightC, 1, 2 ) | |
| else { | |
| ~~if( !cu_act_enabled_flag ) {~~ | |
| if( cbWidth <= MaxTsSize && cbHeight <= MaxTsSize && sps_bdpcm_chroma_enabled_flag ) { | |
| intra_bdpcm_chroma_flag | ae(v) |
| if( intra_bdpcm_chroma_flag ) | |
| intra_bdpcm_chroma_dir_flag | ae(v) |
| } else { | |
| if( CclmEnabled ) | |
| cclm_mode_flag | ae(v) |
| if( cclm_mode_flag ) | |
| cclm_mode_idx | ae(v) |
| else | |
| intra_chroma_pred_mode | ae(v) |
| } | |
| ~~}~~ | |
| } | |
| } | |
| } else if( treeType != DUAL_TREE_CHROMA ) { /* MODE_INTER or MODE_IBC */ | |
| ... | |

FIG. 39

| pic_parameter_set_rbsp( ) { | Descriptor |
|---|---|
| ...... | |
| | |
| pps_act_qp_offsets_present_flag | u(1) |
| if( pps_act_qp_offsets_present_flag ) { | |
|   pps_act_y_qp_offset_plusX1 | se(v) |
|   pps_act_cb_qp_offset_plusX2 | se(v) |
|   pps_act_cr_qp_offset_plusX3 | se(v) |
|   pps_act_cbcr_qp_offset_plusX4 | se(v) |
| } | |
| ... | |
| } | |
| ... | |

FIG. 40

| pic_parameter_set_rbsp( ) { | Descriptor |
|---|---|
| ...... | |
| | |
| pps_act_qp_offsets_present_flag | u(1) |
| if( pps_act_qp_offsets_present_flag ) { | |
|   pps_act_y_qp_offset_plusX1 | se(v) |
|   pps_act_cb_qp_offset_plusX2 | se(v) |
|   pps_act_cr_qp_offset_plusX3 | se(v) |
|   pps_act_cbcr_qp_offset_modeA_plusX4 | se(v) |
|   pps_act_cbcr_qp_offset_modeB_plusX5 | se(v) |
| } | |
| ... | |
| } | |

FIG. 41

| pic_parameter_set_rbsp( ) { | Descriptor |
|---|---|
| ...... | |
| | |
| pps_act_qp_offsets_present_flag | u(1) |
| if( pps_act_qp_offsets_present_flag ) { | |
|   pps_act_y_qp_offset_plusX1 | se(v) |
|   pps_act_cb_qp_offset_plusX2 | se(v) |
|   pps_act_cr_qp_offset_plusX3 | se(v) |
| } | |
| ... | |
| } | |

FIG. 42

| pic_parameter_set_rbsp( ) { | Descriptor |
|---|---|
| ...... | |
| pps_slice_act_qp_offsets_present_flag | u(1) |
| ... | |
| ... | |

FIG. 43

| slice_header_rbsp( ) { | Descriptor |
|---|---|
| ..... | |
| if(pps_slice_act_qp_offsets_present_flag) { | |
|    slice_act_y_qp_offset | se(v) |
|    slice_act_cb_qp_offset | se(v) |
|    slice_act_cr_qp_offset | se(v) |
|   if( sps_joint_cbcr_enabled_flag ) | |
|     slice_act_cbcr_qp_offset | se(v) |
|   ... | |
|   } | |
| } | |

FIG. 44

| slice_header_rbsp( ) { | Descriptor |
|---|---|
| ..... | |
| if(pps_slice_act_qp_offsets_present_flag) { | |
|    slice_act_y_qp_offset | se(v) |
|    slice_act_cb_qp_offset | se(v) |
|    slice_act_cr_qp_offset | se(v) |
|   if( sps_joint_cbcr_enabled_flag ) { | |
|     slice_act_cbcr_qp_offset_modeA | se(v) |
|     slice_act_cbcr_qp_offset_modeB | se(v) |
|   } | |
|   ... | |
|   } | |
| } | |

FIG. 45

| slice_header_rbsp( ) { | Descriptor |
|---|---|
| ... | |
| if( pps_slice_act_qp_offsets_present_flag ) { | |
|   slice_act_y_qp_offset | se(v) |
|   slice_act_cb_qp_offset | se(v) |
|   slice_act_cr_qp_offset | se(v) |
| } | |
| ... | |
| } | |

FIG. 46

| pic_parameter_set_rbsp( ) { | Descriptor |
|---|---|
| ... | |
|   pps_pic_slice_act_qp_offsets_present_flag | u(1) |
| ... | |
| } | |

FIG. 47

| picture_header_rbsp( ) { | Descriptor |
|---|---|
| ... | |
| if( pps_pic_slice_act_qp_offsets_present_flag ) { | |
|   pic_act_qp_offsets_present_flag | u(1) |
|   if( pic_act_qp_offsets_present_flag ) { | |
|     slice_act_y_qp_offset | se(v) |
|     slice_act_cb_qp_offset | se(v) |
|     slice_act_cr_qp_offset | se(v) |
|   } | |
| } | |
| ... | |
| } | |

FIG. 48

| slice_header_rbsp( ) { | Descriptor |
|---|---|
| if( pps_pic_slice_act_qp_offsets_present_flag && !pic_act_qp_offsets_present_flag ) { | |
|    slice_act_y_qp_offset | se(v) |
|    slice_act_cb_qp_offset | se(v) |
|    slice_act_cr_qp_offset | se(v) |
| } | |
| | |
| } | |

FIG. 49

| pic_parameter_set_rbsp( ) { | Descriptor |
|---|---|
| ... | |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|    pps_joint_cbcr_qp_offset_value | se(v) |
| pps_slice_chroma_qp_offsets_present_flag | u(1) |
| pps_cu_chroma_qp_offset_list_enabled_flag | u(1) |
| if( pps_cu_chroma_qp_offset_list_enabled_flag ) { | |
|    chroma_qp_offset_list_len_minus1 | ue(v) |
|    for( i = 0; i <= chroma_qp_offset_list_len_minus1; i++ ) { | |
|      cb_qp_offset_list[ i ] | se(v) |
|      cr_qp_offset_list[ i ] | se(v) |
|      if( pps_joint_cbcr_qp_offset_present_flag ) | |
|        joint_cbcr_qp_offset_list[ i ] | se(v) |
|    } | |
| } | |
| pps_act_qp_offsets_present_flag | u(1) |
| if( pps_act_qp_offsets_present_flag ) | |
|    pps_act_y_qp_offset | se(v) |
|    pps_act_cb_qp_offset | se(v) |
|    pps_act_cr_qp_offset | se(v) |
|    if( pps_joint_cbcr_qp_offset_present_flag ) | |
|      pps_act_cbcr_qp_offset | se(v) |
|    pps_cu_act_qp_offset_list_enabled_flag | u(1) |
|    if( pps_cu_act_qp_offset_list_enabled_flag ) { | |
|      for( i = 0; i <= chroma_qp_offset_list_len_minus1; i++ ) { | |
|        act_y_qp_offset_list[ i ] | se(v) |
|        act_cb_qp_offset_list[ i ] | se(v) |
|        act_cr_qp_offset_list[ i ] | se(v) |
|        if( pps_joint_cbcr_qp_offset_present_flag ) | |
|          act_cbcr_qp_offset_list[ i ] | se(v) |
|      } | |
|    } | |
| } | |
| ... | |
| } | |

FIG. 50

| seq_parameter_set_rbsp( ) { | Descriptor |
|---|---|
| ... | |
| sps_act_reversible_conversion | u(1) |
| | |

FIG. 51

| seq_parameter_set_rbsp( ) { | Descriptor |
|---|---|
| ... | |
| sps_act_shift_flag | u(1) |
| ... | |

IMAGE ENCODING/DECODING METHOD AND APPARATUS USING ADAPTIVE TRANSFORM, AND METHOD FOR TRANSMITTING BITSTREAM

CROSS-REFERENCE TO RELATED APPLICATIONS

This application is the Continuation Bypass of International Application No. PCT/KR2020/014845, filed on Oct. 28, 2020, which claims the benefit of U.S. Provisional Application No. 62/927,113, filed on Oct. 28, 2019, U.S. Provisional Application No. 62/931,786, filed Nov. 6, 2019, U.S. Provisional Application No. 62/939,533, filed Nov. 22, 2019, U.S. Provisional Application No. 62/957,128, filed Jan. 4, 2020, the contents of which are all hereby incorporated by reference herein in their entirety.

TECHNICAL FIELD

The present disclosure relates to an image encoding/decoding method and apparatus. More particularly, the present disclosure relates to an image encoding/decoding method and apparatus using adaptive transform, and a method for transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

The present disclosure is directed to providing an image encoding/decoding method and apparatus with improved encoding/decoding efficiency.

In addition, the present disclosure is directed to providing an image encoding/decoding method and apparatus for improving encoding/decoding efficiency by performing adaptive transform.

In addition, the present disclosure is directed to providing a method for transmitting a bitstream generated by an image encoding method or apparatus according to the present disclosure.

In addition, the present disclosure is directed to providing a recording medium storing therein a bitstream generated by an image encoding method or apparatus according to the present disclosure.

In addition, the present disclosure is directed to providing a recording medium storing therein a bitstream that is received, decoded, and used to reconstruct an image by an image decoding apparatus according to the present disclosure.

It will be appreciated by persons skilled in the art that technical objectives to be achieved in the present disclosure are not limited to the above-mentioned technical objectives and other technical objectives which are not described herein will be clearly understood from the following description.

Technical Solution

According to an aspect of the present disclosure, there is provided an image decoding method performed by an image decoding apparatus, the method including: determining a current block by splitting an image on the basis of split information acquired from a bitstream; determining a quantization parameter of the current block; and determining a transform coefficient of the current block on the basis of the quantization parameter. The determining of the quantization parameter may be performed on the basis of whether color space transform is applied to a residual sample of the current block, and a value of the quantization parameter may be determined to have a value within a range that is set to be from a predetermined upper limit to a predetermined lower limit.

In addition, according to an aspect of the present disclosure, there is provided an image decoding apparatus including a memory and at least one processor, wherein the at least one processor is configured to determine a current block by splitting an image on the basis of split information acquired from a bitstream, determine a quantization parameter of the current block, and determine a transform coefficient of the current block on the basis of the quantization parameter, and the processor is configured to determine the quantization parameter on the basis of whether color space transform is applied to a residual sample of the current block. Herein, a value of the quantization parameter may be determined to be a value within a range that is set to be from a predetermined upper limit to a predetermined lower limit.

In addition, according to an aspect of the present disclosure, there is provided an image encoding method performed by an image encoding apparatus, the method including: determining a current block by splitting an image; determining a quantization parameter of the current block; and determining a transform coefficient of the current block on the basis of the quantization parameter. Herein, the determining of the quantization parameter may be performed on the basis of whether color space transform is applied to a residual sample of the current block, and a value of the quantization parameter may be determined to have a value within a range that is set to be from a predetermined upper limit to a predetermined lower limit.

In addition, according to another aspect of the present disclosure, there is provided a transmission method for transmitting a bitstream generated by an image encoding apparatus or an image encoding method of the present disclosure.

In addition, according to another aspect of the present disclosure, there is provided a computer-readable recording medium storing therein a bitstream generated by an image encoding method or an image encoding apparatus of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

In addition, according to the present disclosure, it is possible to provide an image encoding/decoding method and apparatus capable of improving encoding/decoding efficiency by performing adaptive transform.

In addition, according to the present disclosure, it is possible to provide a method for transmitting a bitstream generated by an image encoding method or apparatus according to the present disclosure.

In addition, according to the present disclosure, it is possible to provide a recording medium storing therein a bitstream generated by an image encoding method or apparatus according to the present disclosure.

In addition, according to the present disclosure, it is possible to provide a recording medium storing therein a bitstream that is received, decoded, and used to reconstruct an image by an image decoding apparatus according to the present disclosure.

It will be appreciated by persons skilled in the art that the effects that can be achieved through the present disclosure are not limited to what has been particularly described hereinabove and other advantages of the present disclosure will be more clearly understood from the following description.

DESCRIPTION OF DRAWINGS

FIG. 4 is a view showing a partitioning structure of an image according to an embodiment.

FIG. 5 is a view showing an embodiment of a partitioning type of a block according to a multi-type tree structure.

FIGS. 21 to 27 are views successively showing an embodiment of a syntax table of an encoding basis in which a syntax element related to ACT is signaled.

FIG. 28 is a view showing coding tree syntax according to an embodiment.

FIG. 30 is a view showing modified quantized residual blocks generated by performing BDPCM according to an embodiment.

FIGS. 33 to 35 are views schematically showing syntax for signaling information on BDPCM.

FIGS. 36 to 51 are views showing a syntax table for signaling an ACT syntax element according to each individual embodiment of the present disclosure.

MODE FOR INVENTION

Figure 1:
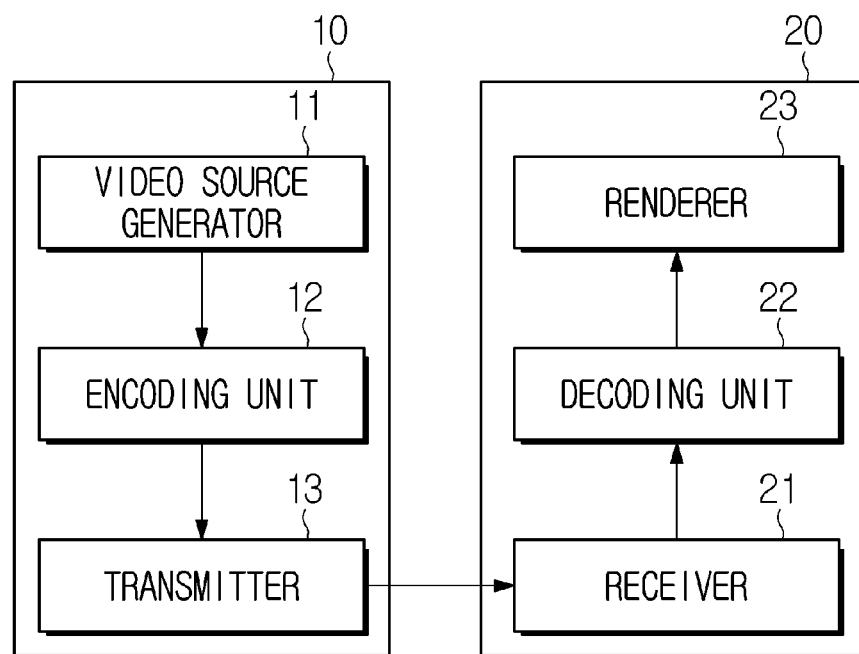
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "video" may mean a set of images in a series according to the passage of time. A "picture" generally means the basis representing one image in a particular time period, and a slice/tile is an encoding basis constituting a part of a picture in encoding. One picture may be composed of one or more slices/tiles. In addition, a slice/tile may include one or more coding tree units (CTUs). One picture may be composed of one or more slices/tiles. One picture may be composed of one or more tile groups. One tile group may include one or more tiles. A brick may refer to a quadrangular area of CTU rows within a tile in a picture. One tile may include one or more bricks. A brick may refer to a quadrangular area of CTU rows within a tile. One tile may be partitioned into a plurality of bricks, and each brick may include one or more CTU rows belonging to a tile. A tile that is not partitioned into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a source device 10 and a receiving device 20. The source device 10 may deliver encoded video and/or image information or data to the receiving device 20 in the form of a file or streaming via a digital storage medium or network.

The source device 10 according to an embodiment may include a video source generator 11, an encoding apparatus 12 and a transmitter 13. The receiving device 20 according to an embodiment may include a receiver 21, a decoding apparatus 12 and a renderer 23. The encoding apparatus 12 may be called a video/image encoding apparatus, and the decoding apparatus 12 may be called a video/image decoding apparatus. The transmitter 13 may be included in the encoding apparatus 12. The receiver 21 may be included in the decoding apparatus 12. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus 12 may encode an input video/image. The encoding apparatus 12 may perform a series of procedures such as prediction, transform, and quantization for compression and coding efficiency. The encoding apparatus 12 may output encoded data (encoded video/image information) in the form of a bitstream.

The transmitter 13 may transmit the encoded video/image information or data output in the form of a bitstream to the receiver 21 of the receiving device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding apparatus 12.

The decoding apparatus 12 may decode the video/image by performing a series of procedures such as dequantization, inverse transform, and prediction corresponding to the operation of the encoding apparatus 12.

The renderer 23 may render the decoded video/image. The rendered video/image may be displayed through the display.

Overview of Image Encoding Apparatus

Figure 2:
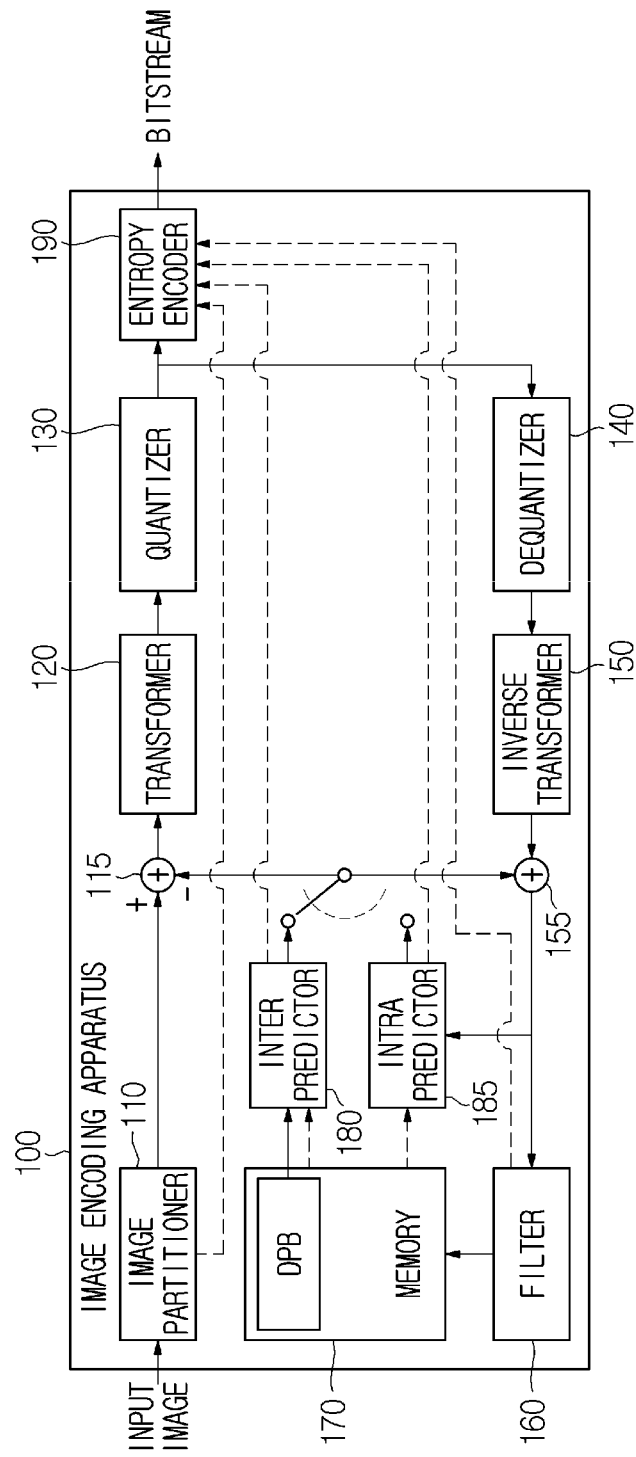
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CTIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
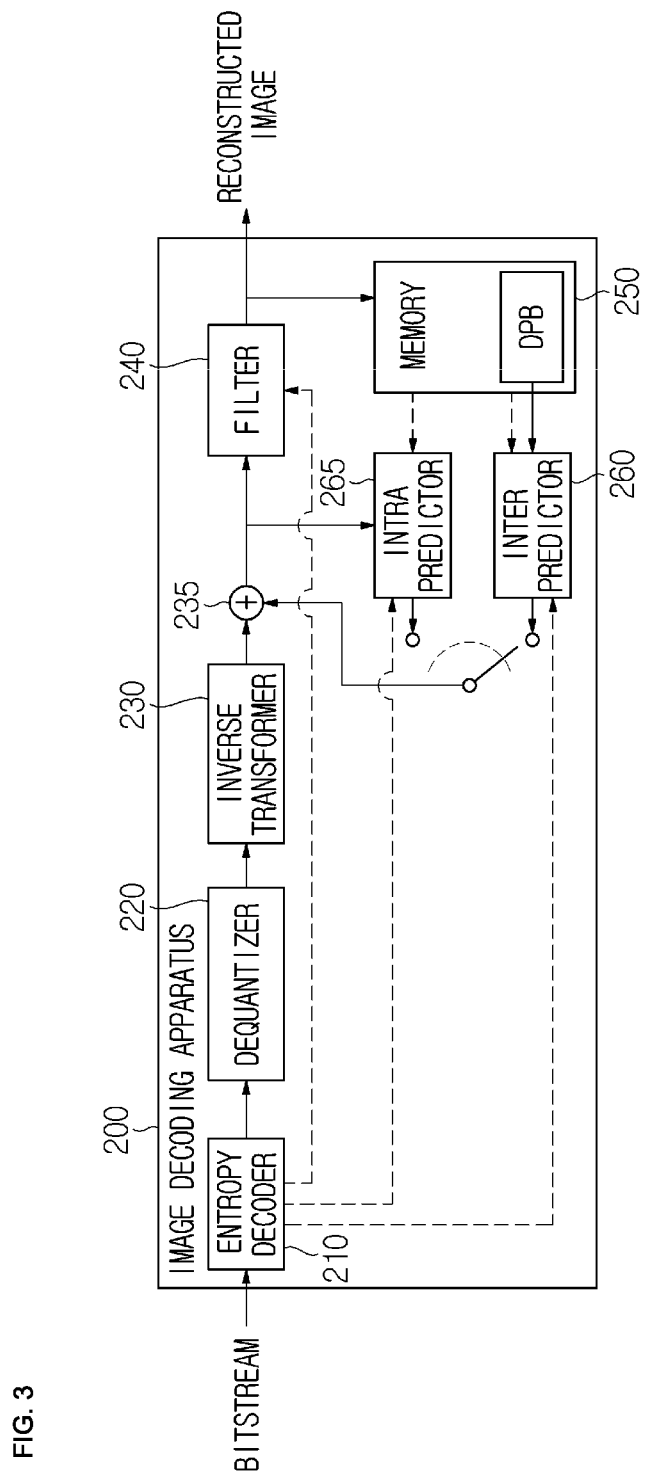
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as a case where the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Partitioning

The video/image coding method according to the present disclosure may be performed based on an image partitioning structure as follows. Specifically, the procedures of prediction, residual processing ((inverse) transform, (de)quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the image decoding apparatus in the form of a bitstream. The entropy decoder 210 of the image decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

FIG. 5 is a view showing a partitioning type of a block according to a multi-type tree structure. Splitting according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 4, by horizontal ternary splitting, two CUs having a height which is ¼ of the height of the current CU and having the same width as the current CU and a CU having a height which is half the height of the current CU and having the same width as the current CU may be generated.

Figure 6:
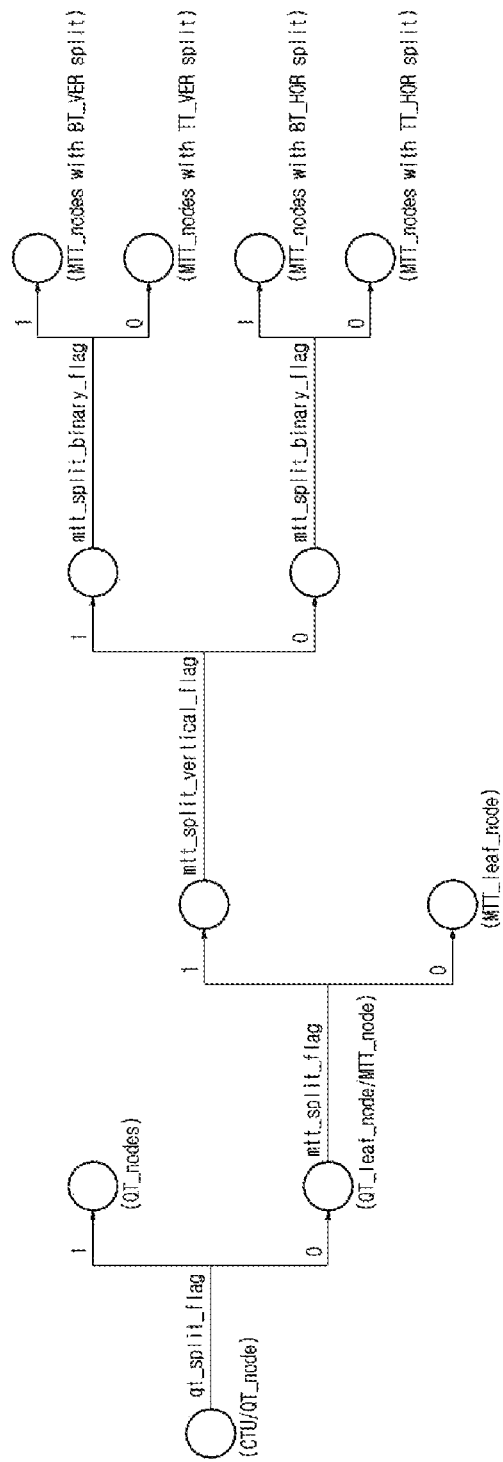
FIG. 6 is a view showing a signaling mechanism of block splitting information in a structure of a quadtree with a nested multi-type tree according to the present disclosure.

FIG. 6 is a view showing a signaling mechanism of block splitting information in a structure of a quadtree with a nested multi-type tree according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) is signaled. For example, when the qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-tree splitting mode may be referred to as a multi-tree split type or a split type for short.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
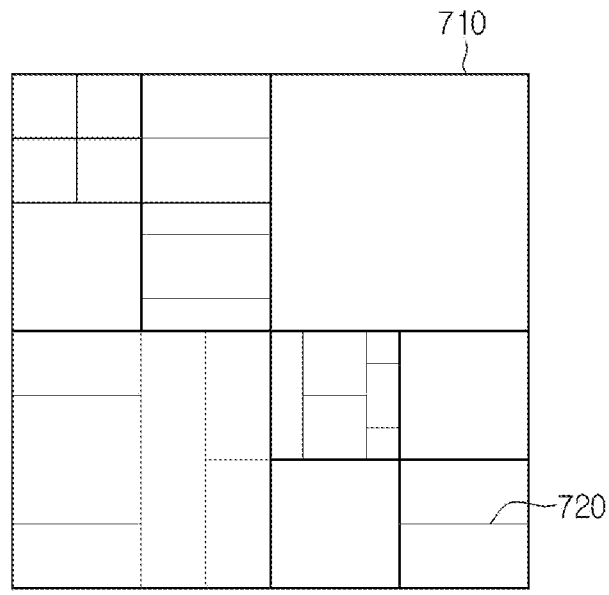
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally represents a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with a nested multitype tree, the following parameters may be signaled as SPS syntax elements from the image encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size is signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multi-type tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the image encoding apparatus may skip signaling of partitioning information. In this case, the image decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (e.g., MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the image encoding apparatus and the decoding apparatus, by limiting the occurrence of such redundant partition patterns, a data amount of partitioning information may be reduced.

In addition, in encoding and decoding of a video/image according to the present document, an image processing basis may have a hierarchical structure. One picture may be divided into one or more tiles, bricks, slices, and/or tile groups. One slice may include one or more bricks. One brick may include one or more CTU rows within a tile. A slice may include bricks of a picture, wherein the number of the bricks is an integer. One tile group may include one or more tiles. One tile may include one or more CTUs. The CTU may be partitioned into one or more CUs. A tile may be a quadrangular area composed of particular tile rows and particular tile columns composed of a plurality of CTUs within a picture. A tile group may include tiles according to tile raster scanning within a picture, wherein the number of the tiles is an integer. A slice header may carry information/a parameter applicable to the corresponding slice (blocks in the slice). When the encoding apparatus or the decoding apparatus has a multi-core processor, encoding/decoding procedures for the tile, slice, brick, and/or tile group may be performed in parallel.

In the present disclosure, the names or concepts of a slice or a tile group may be used interchangeably. That is, a tile group header may be referred to as a slice header. Herein, a slice may have one of slice types including an intra (I) slice, a predictive (P) slice, and a bi-predictive (B) slice. For blocks within an I slice, inter prediction is not used for prediction, and only intra prediction may be used. Even in this case, an original sample value may be coded and signaled without prediction. For blocks within a P slice, intra prediction or inter prediction may be used. When inter prediction is used, only uni-prediction may be used. In the meantime, for blocks within a B slice, intra prediction or inter prediction may be used. When inter prediction is used, bi-prediction, which is the maximum extent, may be used.

According to a characteristic (for example, resolution) of a video image or considering coding efficiency or parallel processing, the encoding apparatus may determine a tile/tile group, a brick, a slice, and largest and smallest coding unit sizes. In addition, information on this or information for deriving this may be included in a bitstream.

The decoding apparatus may obtain information indicating whether a CTU within a tile/tile group, a brick, a slice, or a tile of a current picture is partitioned into multiple coding units. The encoding apparatus and the decoding apparatus signal such information only under a particular condition, thereby increasing encoding efficiency.

The slice header (slice header syntax) may include information/a parameter applicable to the slice in common. APS (APS syntax) or PPS (PPS syntax) may include information/a parameter applicable to one or more pictures in common. SPS (SPS syntax) may include information/a parameter applicable to one or more sequences in common. VPS (VPS syntax) may include information/a parameter applicable to multiple layers in common. DPS (DPS syntax) may include information/a parameter applicable to the entire video in common. DPS may include information/a parameter related to combination of coded video sequences (CVSs).

In addition, for example, information on the partitioning and configuration of the tile/tile group/brick/slice may be constructed at the encoding stage through the high level syntax, and transmitted in the form of a bitstream to the decoding apparatus.

Overview of Intra Prediction

Hereinafter, intra prediction performed by the encoding apparatus and the decoding apparatus described above will be described in detail. Intra prediction may refer to prediction that generates prediction samples for a current block on the basis of reference samples in a picture (hereinafter, a current picture) to which the current block belongs.

Figure 8:
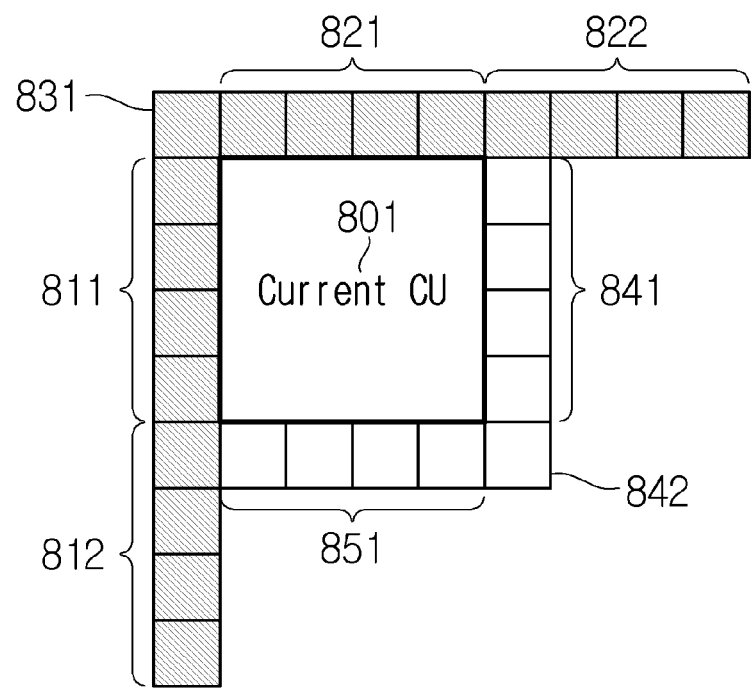
FIG. 8 is a view showing neighboring reference samples according to an embodiment.
Figure 9:
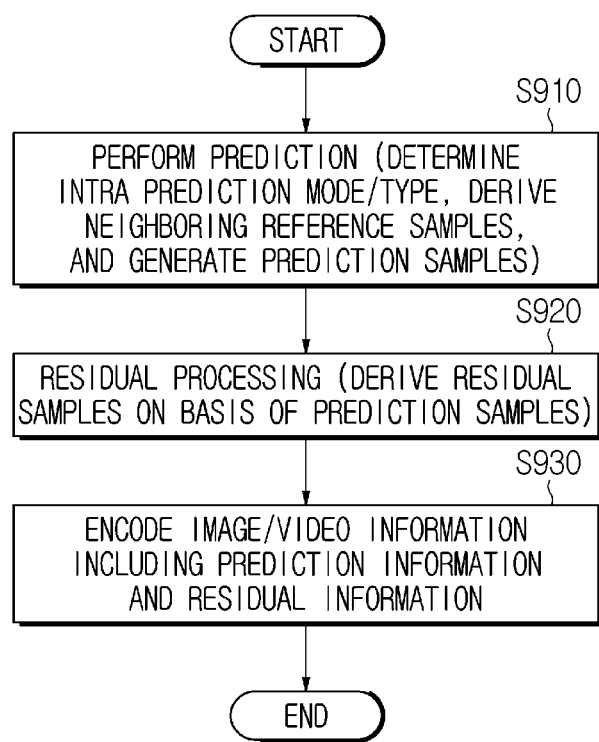
FIGS. 9 and 10 are views showing intra prediction according to an embodiment.
Figure 10:
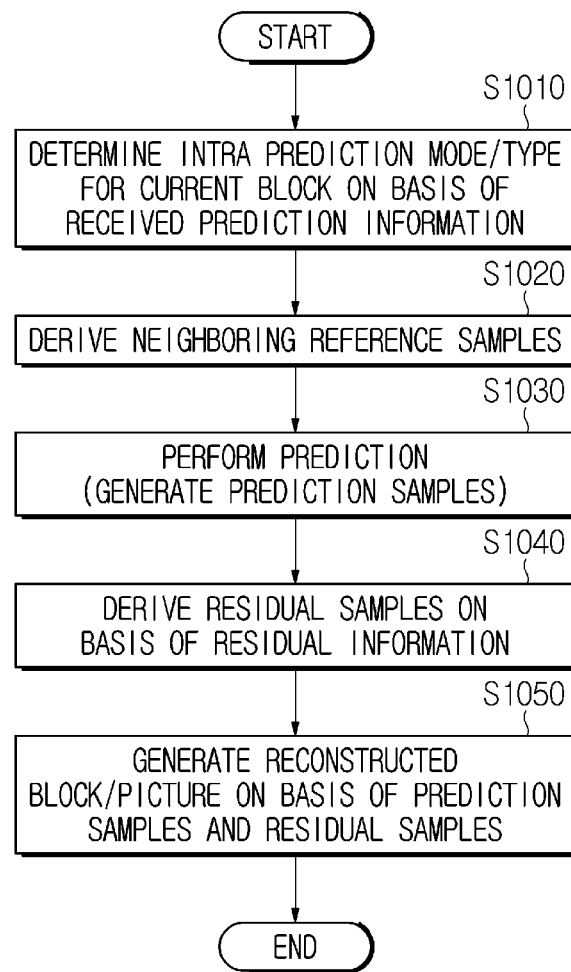

This will be described with reference to FIG. 8. When intra prediction is applied to a current block 801, neighboring reference samples to be used for intra prediction of the current block 801 may be derived. The neighboring reference samples of the current block may include: a total of 2×nH samples including samples 811 adjacent to a left boundary of the current block having a size of nW×nH and samples 812 neighboring the bottom-left; a total of 2×nW samples including samples 821 adjacent to the top boundary of the current block and samples 822 neighboring the top-right; and one sample 831 neighboring the top-left of the current block. Alternatively, the neighboring reference samples of the current block may include a plurality of columns of top neighboring samples and a plurality of rows of left neighboring samples.

In addition, the neighboring reference samples of the current block may include: a total of nH samples 841 adjacent to the right boundary of the current block having a size of nW×nH; a total of nW samples 851 adjacent to the bottom boundary of the current block; and one sample 842 neighboring the bottom-right of the current block.

However, some of the neighboring reference samples of the current block have not yet been decoded or may be unavailable. In this case, the decoding apparatus may construct neighboring reference samples to be used for prediction, by substituting unavailable samples with available samples. Alternatively, neighboring reference samples to be used for prediction may be constructed through interpolation of available samples.

When the neighboring reference samples are derived, (i) a prediction sample may be derived on the basis of an average or interpolation of the neighboring reference samples of the current block, or (ii) the prediction sample may be derived on the basis of the reference sample present in a particular (prediction) direction with respect to the prediction sample, among the neighboring reference samples of the current block. The case of (i) may be referred to as a non-directional mode or a non-angular mode, and the case of (ii) may be referred to as a directional mode or an angular mode. In addition, the prediction sample may be generated through interpolation with the second neighboring sample and the first neighboring sample that are located in the opposite direction of the prediction direction of the intra prediction mode of the current block on the basis of the prediction sample of the current block, among the neighboring reference samples. The above-described case may be referred to as a linear interpolation intra prediction (LIP). In addition, chroma prediction samples may be generated on the basis of luma samples by using a linear model. This case may be referred to as an LM mode. In addition, a temporary prediction sample of the current block may be derived on the basis of filtered neighboring reference samples, and the prediction sample of the current block may be derived by weighted-summing the temporary prediction sample and at least one reference sample derived according to the intra prediction mode among the existing neighboring reference samples, namely, the unfiltered neighboring reference samples. The above-described case may be referred to as Position dependent intra prediction (PDPC). In addition, a reference sample line having the highest prediction accuracy may be selected among multiple neighboring reference sample lines of the current block to derive a prediction sample by using a reference sample located in a prediction direction in the corresponding line. At this time, intra prediction encoding may be performed by indicating (signaling) the used reference sample line to the decoding apparatus. The above-described case may be referred to as multi-reference line (MRL) intra prediction or MRL based intra prediction. In addition, the current block may be divided into vertical or horizontal sub-partitions to perform intra prediction based on the same intra prediction mode, and neighboring reference samples may be derived on a per sub-partition basis and used. That is, in this case, the intra prediction mode for the current block is equally applied to the sub-partitions, and a neighboring reference sample is derived on a per sub-partition basis and used, thereby increasing intra prediction performance in some cases. This prediction method may be referred to as intra sub-partitions (ISP) or ISP based intra prediction. These intra prediction methods may be referred to as intra prediction types, being distinguished from intra prediction modes (e.g., a DC mode, a planar mode, and a directional mode). The intra prediction types may be referred to as various terms such as intra prediction schemes or additional intra prediction modes. For example, the intra prediction types (or additional intra prediction modes) may include at least one selected from a group of LIP, PDPC, MRL, and ISP that are described above. A general intra prediction method excluding the particular intra prediction types, such as LIP, PDPC, MRL, and ISP, may be referred to as a normal intra prediction type. The normal intra prediction type may refer to a case in which the particular intra prediction types are not applied, and prediction may be performed on the basis of the above-described intra prediction modes. In the meantime, when necessary, post-filtering may be performed on the derived prediction sample.

Specifically, an intra prediction procedure may include an intra prediction mode/type determination step, a neighboring reference sample derivation step, and an intra prediction mode/type based prediction sample derivation step. In addition, when necessary, a post-filtering step may be performed on the derived prediction sample.

In the meantime, in addition to the above-described intra prediction types, affine linear weighted intra prediction (ALWIP) may be used. The ALWIP may be referred to as linear weighted intra prediction (LWIP), or matrix weighted intra prediction or matrix based intra prediction (MIP). When the MIP is applied to a current block, prediction samples for the current block may be derived by i) using neighboring reference samples subjected to an averaging procedure, ii) performing a matrix-vector-multiplication procedure, and further performing iii) a horizontal/vertical interpolation procedure when necessary. The intra prediction modes used for the MIP may be different from the intra prediction modes used in LIP, PDPC, MRL, ISP intra prediction, or in normal intra prediction. The intra prediction modes for the MIP may be referred to as MIP intra prediction modes, MIP prediction modes, or MIP modes. For example, different matrices and offsets used in the matrix-vector-multiplication may be set according to the intra prediction modes for MIP. Herein, a matrix may be referred to as a (MIP) weighted matrix, and an offset may be referred to as an (MIP) offset vector or (MIP) bias vector. A detailed MIP method will be described later.

A block reconstruction procedure based on intra prediction and the intra prediction unit in the encoding apparatus may schematically include, for example, the following described below. Step S910 may be performed by the intra prediction unit 185 of the encoding apparatus. Step S920 may be performed by the residual processor that includes at least one selected from a group of the subtractor 115, the transformer 120, the quantizer 130, the dequantizer 140, and the inverse transformer 150 of the encoding apparatus. Specifically, step S920 may be performed by the subtractor 115 of the encoding apparatus. In step S930, prediction information may be derived by the intra prediction unit 185, and may be encoded by the entropy encoder 190. In step S930, residual information may be derived by the residual processor, and may be encoded by the entropy encoder 190. The residual information is information on the residual samples. The residual information may include information on quantized transformation coefficients for the residual samples. As described above, the residual samples may be derived as transformation coefficients through the transformer 120 of the encoding apparatus, and the transformation coefficients may be derived as quantized transformation coefficients through the quantizer 130. Information on the quantized transformation coefficients may be encoded by the entropy encoder 190 through a residual coding procedure.

The encoding apparatus may perform intra prediction on a current block in step S910. The encoding apparatus derives an intra prediction mode/type for the current block, derives neighboring reference samples of the current block, and generates prediction samples in the current block on the basis of the intra prediction mode/type and the neighboring reference samples. Herein, the procedures of determination of the intra prediction mode/type, derivation of the neighboring reference samples, and generation of the prediction samples may be performed simultaneously, or any one procedure may be performed before the other procedures. For example, although not shown, the intra prediction unit 185 of the encoding apparatus may include an intra prediction mode/type determination unit, a reference sample derivation unit, and a prediction sample derivation unit. The intra prediction mode/type determination unit may determine an intra prediction mode/type for the current block, the reference sample derivation unit may derive neighboring reference samples of the current block, and the prediction sample derivation unit may derive prediction samples of the current block. In the meantime, when a prediction sample filtering procedure, which will be described later, is performed, the intra prediction unit 185 may further include a prediction sample filter. The encoding apparatus may determine a mode/type applied to the current block among a plurality of intra prediction modes/types. The encoding apparatus may compare RD costs for the intra prediction modes/types and determine the optimum intra prediction mode/type for the current block.

In the meantime, the encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The encoding apparatus may generate residual samples for the current block on the basis of (filtered) prediction samples in step S920. The encoding apparatus may compare the prediction samples in the original samples of the current block on the basis of a phase, and may derive the residual samples.

The encoding apparatus may encode image information including information (prediction information) on the intra prediction and residual information on the residual samples in step S930. The prediction information may include the intra prediction mode information and the intra prediction type information. The encoding apparatus may output encoded image information in the form of a bitstream. The output bitstream may be transmitted to the decoding apparatus through a storage medium or a network.

The residual information may include residual coding syntax, which will be described later. The encoding apparatus may derive quantized transformation coefficients by transforming/quantizing the residual samples. The residual information may include information on the quantized transformation coefficients.

In the meantime, as described above, the encoding apparatus may generate a reconstructed picture (including reconstructed samples and a reconstructed block). To this end, the encoding apparatus may perform dequantization/inverse transformation on the quantized transformation coefficients and derive (modified) residual samples. The reason for performing dequantization/inverse transformation after transformation/quantization of the residual samples is to derive residual samples that are the same as the residual samples derived by the decoding apparatus as described above. The encoding apparatus may generate a reconstructed block including reconstructed samples for the current block, on the basis of the prediction samples and the (modified) residual samples. On the basis of the reconstructed block, a reconstructed picture for the current picture may be generated. As described above, an in-loop filtering procedure may be further applied to the reconstructed picture.

A video/image decoding procedure based on intra prediction and the intra prediction unit in the decoding apparatus may schematically include, for example, the following described below. The decoding apparatus may perform the operation corresponding to the operation performed by the encoding apparatus.

Steps S1010 to S1030 may be performed by the intra prediction unit 265 of the decoding apparatus. Prediction information in step S1010 and residual information in step S1040 may be obtained from a bitstream by the entropy decoder 210 of the decoding apparatus. A residual processor including the dequantizer 220 or the inverse transformer 230 of the decoding apparatus or both may derive residual samples for the current block on the basis of the residual information. Specifically, the dequantizer 220 of the residual processor may perform dequantization on the basis of quantized transformation coefficients derived on the basis of the residual information, and may derive transformation coefficients. The inverse transformer 230 of the residual processor may perform inverse transformation on the transformation coefficients and may derive residual samples for the current block. Step S1050 may be performed by the adder 235 or the reconstructor of the decoding apparatus.

Specifically, the decoding apparatus may derive an intra prediction mode/type for a current block on the basis of received prediction information (intra prediction mode/type information) in step S1010. The decoding apparatus may derive neighboring reference samples of the current block in step S1020. The decoding apparatus may generate prediction samples in the current block on the basis of the intra prediction mode/type and the neighboring reference samples in step S1030. In this case, the decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The decoding apparatus may generate residual samples for the current block on the basis of received residual information. The decoding apparatus may generate reconstructed samples for the current block on the basis of the prediction samples and the residual samples, and may derive a reconstructed block including the reconstructed samples in step S1040. On the basis of the reconstructed block, a reconstructed picture for the current picture may be generated. As described above, an in-loop filtering procedure may be further applied to the reconstructed picture.

Herein, although not shown, the intra prediction unit 265 of the decoding apparatus may include an intra prediction mode/type determination unit, a reference sample derivation unit, and a prediction sample derivation unit. The intra prediction mode/type determination unit may determine an intra prediction mode/type for the current block on the basis of the intra prediction mode/type information obtained from the entropy decoder 210. The reference sample derivation unit may derive neighboring reference samples of the current block. The prediction sample derivation unit may derive prediction samples of the current block. In the meantime, when the above-described prediction sample filtering procedure is performed, the intra prediction unit 265 may further include a prediction sample filter.

The intra prediction mode information may include, for example, flag information (e.g., intra_luma_mpm_flag) indicating whether a most probable mode (MPM) is applied to the current block or a remaining mode is applied. When the MPM is applied to the current block, the prediction mode information may further include index information (e.g., intra_luma_mpm_idx) indicating one of the intra prediction mode candidates (MPM candidates). The intra prediction mode candidates (MPM candidates) may be constructed as a MPM candidate list or an MPM list. In addition, when the MPM is not applied to the current block, the intra prediction mode information may further include remaining mode information (e.g., intra_luma_mpm_remainder) indicating one of the remaining intra prediction modes except the intra prediction mode candidates (MPM candidates). The decoding apparatus may determine an intra prediction mode of the current block on the basis of the intra prediction mode information. A separate MPM list may be constructed for the above-described MIP.

In addition, the intra prediction type information may be realized in various forms. For example, the intra prediction type information may include intra prediction type index information indicating one of the intra prediction types. As another example, the intra prediction type information may include at least one of reference sample line information (e.g., intra_luma_ref_idx) indicating whether the MRL is applied to the current block and which reference sample line is used when the MRL is applied to the current block, ISP flag information (e.g., intra_subpartitions_mode_flag) indicating whether the ISP is applied to the current block, ISP type information (e.g., intra_subpartitions_split_flag) indicating a partition type of sub-partitions when the ISP is applied, flag information indicating whether PDCP is applied, or flag information indicating whether LIP is applied. In addition, the intra prediction type information may include an MIP flag indicating whether MIP is applied to the current block.

The intra prediction mode information and/or the intra prediction type information may be encoded/decoded through a coding method described in the present document. For example, the intra prediction mode information and/or the intra prediction type information may be encoded/decoded through entropy coding (e.g., CABAC, CAVLC) on the basis of a truncated (rice) binary code.

Quantization/Dequantization

As described above, the quantizer of the encoding apparatus may derive quantized transformation coefficients by applying quantization to transformation coefficients. The dequantizer of the encoding apparatus or the dequantizer of the decoding apparatus may derive transformation coefficients by applying dequantization to quantized transformation coefficients.

In encoding and decoding of a video/still image, a quantization ratio may be changed, and the changed quantization ratio may be used to adjust a compression ratio. From an angle on realization, considering complexity, a quantization parameter (QP) may be used instead of using a quantization ratio directly. For example, quantization parameters having integer values of 0 to 63 may be used, and each quantization parameter value may correspond to an actual quantization ratio. In addition, a quantization parameter $QP_Y$ for a luma component (luma sample) and a quantization parameter $QP_C$ for a chroma component (chroma sample) may be set to be different from each other.

In a quantization process, a transformation coefficient C may be input and divided by a quantization ratio Qstep, and on the basis of this, a quantized transformation coefficient C' may be obtained. In this case, considering calculation complexity, a quantization ratio may be multiplied by a scale to be in the form of an integer, and shift operation may be performed by the value corresponding to the scale value. Based on multiplication of a quantization ratio and a scale value, a quantization scale may be derived. That is, the quantization scale may be derived according to a QP. The quantization scale may be applied to the transformation coefficient C, and on the basis of this, the quantized transformation coefficient C' may be derived.

The dequantization process is the reverse process of the quantization process. A quantized transformation coefficient C' may be multiplied by a quantization ratio Qstep, and on the basis of this, a reconstructed transformation coefficient C" may be obtained. In this case, a level scale may be derived according to the quantization parameter. The level scale may be applied to the quantized transformation coefficient C', and on the basis of this, a reconstructed transformation coefficient C" may be derived. The reconstructed transformation coefficient C" may be slightly different from the original transformation coefficient C because of the loss in a transformation and/or quantization process. Therefore, the encoding apparatus may perform dequantization in the same manner as the decoding apparatus.

In the meantime, an adaptive frequency weighting quantization technology in which a quantization strength is adjusted according to frequency may be applied. The adaptive frequency weighting quantization technology is a method of applying quantization strengths that vary from frequency to frequency. In the adaptive frequency weighting quantization, quantization strengths varying from frequency to frequency may be applied by using a pre-defined quantization scaling matrix. That is, the above-described quantization/dequantization process may be performed further on the basis of the quantization scaling matrix. For example, different quantization scaling matrices may be used according to a size of a current block and/or whether the prediction mode applied to the current block to generate a residual signal of the current block is inter prediction or intra prediction. The quantization scaling matrix may be referred to as a quantization matrix or a scaling matrix. The quantization scaling matrix may be pre-defined. In addition, for frequency adaptive scaling, frequency-specific quantization scale information for the quantization scaling matrix may be constructed/encoded by the encoding apparatus, and may be signaled to the decoding apparatus. The frequency-specific quantization scale information may be referred to as quantization scaling information. The frequency-specific quantization scale information may include scaling list data (scaling_list_data). The (modified) quantization scaling matrix may be derived on the basis of the scaling list data. In addition, the frequency-specific quantization scale information may include a present flag information indicating whether the scaling list data is present. Alternatively, when the scaling list data is signaled at a high level (e.g., an SPS), further included is information indicating whether the scaling list data is modified at a lower level (e.g., a PPS or a tile group header, etc.).

Transformation/Inverse Transformation

As described above, the encoding apparatus may derive a residual block (residual samples) on the basis of a block (prediction samples) predicted through intra/inter/IBC prediction, and may derive quantized transformation coefficients by applying transformation and quantization to the derived residual samples. Being included in residual coding syntax, information (residual information) on quantized transformation coefficients may be encoded and output in the form of a bitstream. The decoding apparatus may obtain information (residual information) on the quantized transformation coefficients from the bitstream, and may derive the quantized transformation coefficients by performing decoding. The decoding apparatus may derive residual samples through dequantization/inverse transformation on the basis of the quantized transformation coefficients. As described above, either the quantization/dequantization or the transformation/inverse transformation or both may be omitted. When the transformation/inverse transformation is omitted, the transformation coefficient may be referred to as a coefficient or a residual coefficient, or may still be referred to as a transformation coefficient for consistency of expression. Whether the transformation/inverse transformation is omitted may be signaled on the basis of a transformation skip flag (e.g., transform_skip_flag). A first value (e.g., 0) of the transform_skip_flag may indicate that whether transformation is omitted is determined by another syntax element. A second value (e.g., 1) of the transform_skip_flag may indicate transformation omission (e.g., skip).

The transformation/inverse transformation may be performed on the basis of a transformation kernel(s). For example, a multiple transform selection (MTS) scheme for performing transformation/inverse transformation may be applied. In this case, some of multiple transformation kernel sets may be selected and applied to a current block. A transformation kernel may be referred to as various terms, such as a transformation matrix, a transformation type, etc. For example, a transformation kernel set may refer to a combination of a vertical-direction transformation kernel (vertical transformation kernel) and a horizontal-direction transformation kernel (horizontal transformation kernel).

The transformation/inverse transformation may be performed on a per CU or TU basis. That is, the transformation/inverse transformation may be applied to residual samples in a CU or residual samples in a TU. A CU size and a TU size may be the same, or a plurality of TUs may be present in a CU area. In the meantime, a CU size may generally refer to a luma component (sample) CB size. A TU size may generally refer to a luma component (sample) TB size. A chroma component (sample) CB or TB size may be derived on the basis of a luma component (sample) CB or TB size according to a component ratio according to a color format (a chroma format, e.g., 4:4:4, 4:2:2, 4:2:0, or the like). The TU size may be derived on the basis of maxTbSize. For example, when the CU size is greater than the maxTbSize, a plurality of TUs (TBs) having the maxTbSize may be derived from the CU and transformation/inverse transformation may be performed on a per TU (TB) basis. The maxTbSize may be considered in determining whether various intra prediction types, such as ISP, are applied. Information on the maxTbSize may be pre-determined. Alternatively, information on the maxTbSize may be generated and encoded by the encoding apparatus and signaled to the encoding apparatus.

Entropy Coding

As described above with reference to FIG. 2, some or all of video/image information may be entropy-encoded by the entropy encoder 190. Some or all of video/image information described with reference to FIG. 3 may be entropy-decoded by the entropy decoder 310. In this case, the video/image information may be encoded/decoded on a per syntax element basis. In the present document, encoding/decoding of information may include encoding/decoding by the method described in this paragraph.

Figure 11:
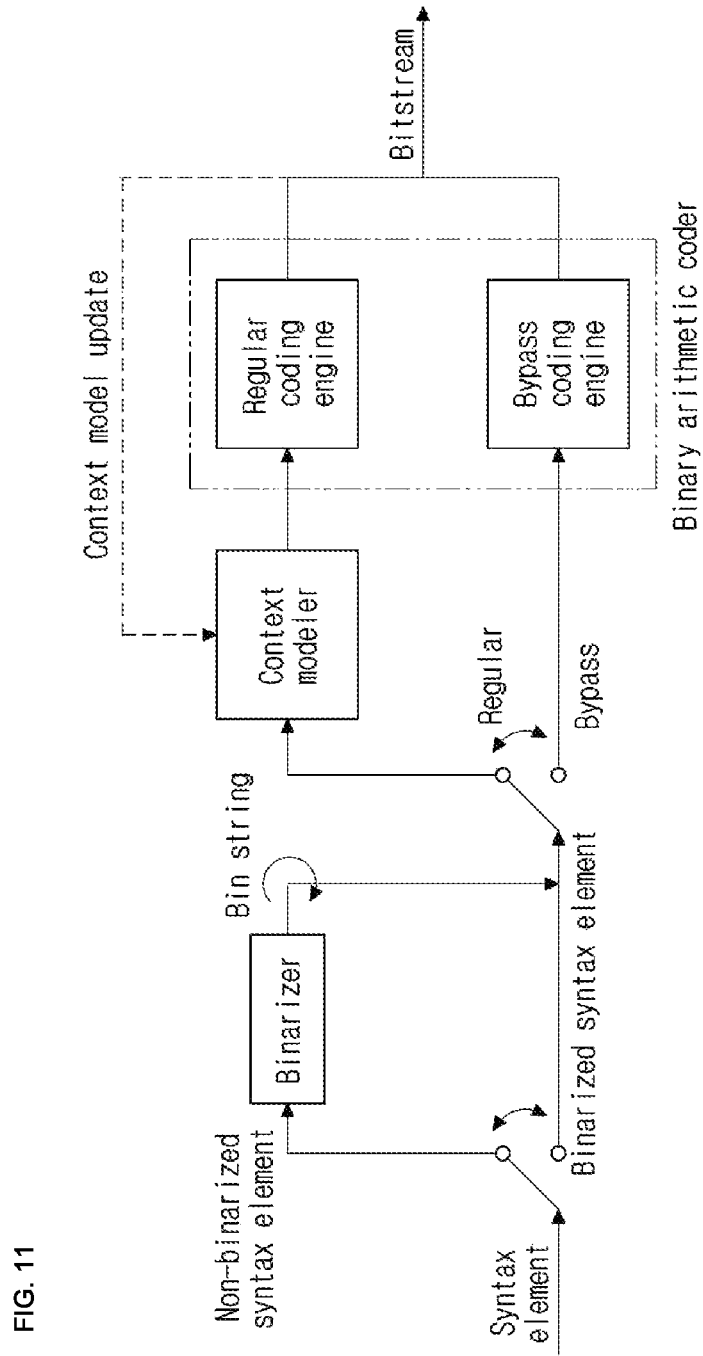
FIG. 11 is a view showing a block diagram of CABAC according to an embodiment for encoding one syntax element.

FIG. 11 shows a block diagram of CABAC for encoding one syntax element. In an encoding process of CABAC, first, when an input signal is a syntax element not a binary value, the input signal is transformed into a binary value through binarization. When an input signal is already a binary value, the input signal bypasses binarization. Herein, each binary number 0 or 1 constituting a binary value may be referred to as a bin. For example, a binary string (bin string) after binarization is 110, each of 1, 1, and 0 is referred to as one bin. The bin(s) for one syntax element may refer to a value of the syntax element.

Binarized bins may be input to a regular coding engine or a bypass coding engine. The regular coding engine may assign a context model that applies a probability value to a corresponding bin, and may encode the bin on the basis of the assigned context model. After performing coding on each bin, the regular coding engine may update a probability model for the bin. The bins coded in this way may be referred to as context-coded bins. The bypass coding engine may omit a procedure for estimating a probability of an input bin and a procedure for updating the probability model applied to the bin after coding. In the case of the bypass coding engine, an input bin is coded by applying a uniform probability distribution (e.g., 50:50) instead of assigning a context, thereby improving a coding rate. The bins coded in this way may be referred to as bypass bins. The context model may be assigned and updated for each bin to be context-coded (regular-coded), and the context model may be indicated on the basis of ctxidx or ctxInc. ctxidx may be derived on the basis of ctxInc. Specifically, for example, the context index (ctxidx) indicating a context model for each of the regular-coded bins may be derived as the sum of a context index increment (ctxInc) and a context index offset (ctxIdxOffset). Herein, ctxInc varying from bin to bin may be derived. The ctxIdxOffset may be represented by the lowest value of the ctxIdx. The lowest value of the ctxIdx may be referred to as an initial value (initValue) of the ctxIdx. The ctxIdxOffset is a value generally used for distinguishment from context models for other syntax elements, and a context model for one syntax element may be distinguished/derived on the basis of ctxinc.

In an entropy encoding procedure, it is determined whether to perform encoding through the regular coding engine or perform encoding through the bypass coding engine, and a coding path may be switched. Entropy decoding may perform the same process as entropy encoding in reverse order.

Figure 12:
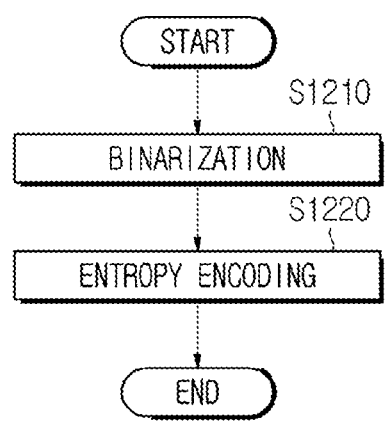
FIGS. 12 to 15 are views showing entropy encoding and decoding according to an embodiment.
Figure 13:
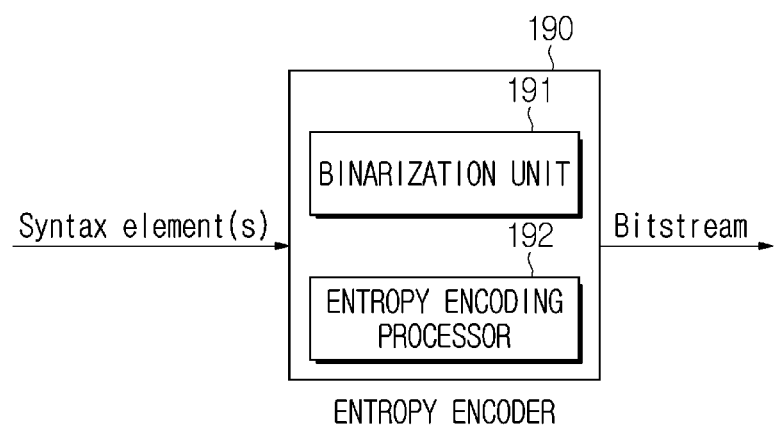

The above-described entropy coding may be performed as in FIGS. 12 and 13, for example. Referring to FIGS. 12 and 13, the encoding apparatus (entropy encoder) may perform an entropy coding procedure on image/video information. The image/video information may include partitioning-related information, prediction-related information (e.g., inter/intra prediction classification information, intra prediction mode information, and inter prediction mode information), residual information, and in-loop filtering-related information, or may include various syntax elements related thereto. The entropy coding may be performed on a per syntax element basis. Steps S1210 to S1220 of FIG. 12 may be performed by the entropy encoder 190 of the encoding apparatus of FIG. 2 described above.

The encoding apparatus may perform binarization on a target syntax element in step S1210. Herein, the binarization may be based on various binarization methods, such as truncated rice binarization process and fixed-length binarization process, and a binarization method for a target syntax element may be pre-defined. The binarization procedure may be performed by a binarization unit 191 in the entropy encoder 190.

The encoding apparatus may perform entropy encoding on the target syntax element in step S1220. The encoding apparatus may perform regular coding-based (context-based) or bypass coding-based encoding on a bin string of a target syntax element on the basis of an entropy coding scheme such as context-adaptive arithmetic coding (CABAC) or context-adaptive variable length coding (CAVLC). The output may be included in a bitstream. The entropy encoding procedure may be performed by an entropy encoding processor 192 in the entropy encoder 190. As described above, the bitstream may be transmitted to the decoding apparatus through a (digital) storage medium or a network.

Figure 14:
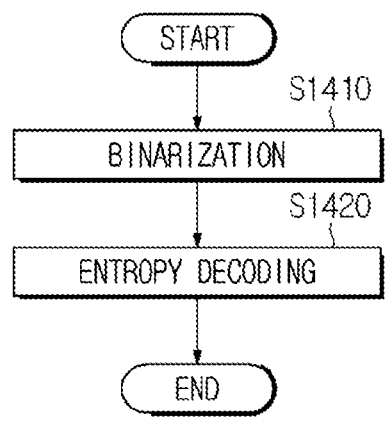
Figure 15:
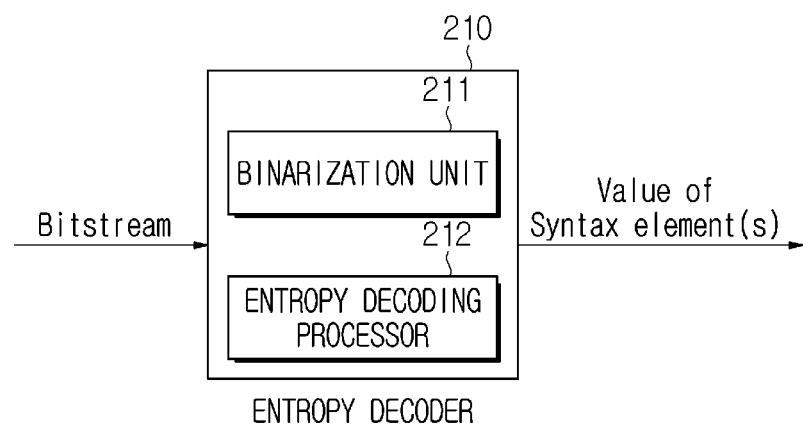

Referring to FIGS. 14 and 15, the decoding apparatus (entropy decoder) may decode encoded image/video information. The image/video information may include partitioning-related information, prediction-related information (e.g., inter/intra prediction classification information, intra prediction mode information, and inter prediction mode information), residual information, and in-loop filtering-related information, or may include various syntax elements related thereto. The entropy coding may be performed on a per syntax element basis. Steps S1410 to S1420 may be performed by the entropy decoder 210 of the decoding apparatus of FIG. 3 described above.

The decoding apparatus may perform binarization on a target syntax element in step S1410. Herein, the binarization may be based on various binarization methods, such as truncated rice binarization process and fixed-length binarization process, and a binarization method for a target syntax element may be pre-defined. The decoding apparatus may derive available bin strings (bin string candidates) for available values of a target syntax element through the binarization procedure. The binarization procedure may be performed by a binarization unit 211 in the entropy decoder 210.

The decoding apparatus may perform entropy decoding on the target syntax element in step S1420. While the decoding apparatus sequentially decodes and parses each bin for the target syntax element from an input bit(s) in a bitstream, and may compare a derived bin string with available bin strings for the syntax element. When the derived bin string is the same as one of the available bin strings, a value corresponding to the bin string may be derived as a value of the syntax element. If not, the next bit in the bitstream is further parsed and the above-described procedure is performed again. Through this process, a start bit or an end bit for particular information (particular syntax element) in a bitstream is not used, but variable-length bits are used to signal the information. Through this, relatively fewer bits are assigned for a low value, thereby increasing overall coding efficiency.

The decoding apparatus may perform context-based or bypass-based decoding on each bin in the bin string from a bitstream on the basis of the entropy coding scheme such as CABAC or CAVLC. The entropy decoding procedure may be performed by an entropy decoding processor 212 in the entropy decoder 210. The bitstream may include various types of information for image/video decoding as described above. As described above, the bitstream may be transmitted to the decoding apparatus through a (digital) storage medium or a network.

In the present document, a table (syntax table) including syntax elements may be used to represent signaling of information from the encoding apparatus to the decoding apparatus. The order of syntax elements in the table including the syntax elements used in the present document may refer to the parsing order of syntax elements from a bitstream. The encoding apparatus may construct and encode a syntax table so that the syntax elements are parsed in the parsing order by the decoding apparatus. The decoding apparatus may parse and decode the syntax elements of the syntax table from a bitstream in the parsing order, and may thus obtain values of the syntax elements.

General Image/Video Coding Procedure

In image/video coding, pictures constituting an image/video may be encoded/decoded according to decoding order in a series. The picture order corresponding to the output order of decoded pictures may be set to be different from the decoding order, and on the basis of this, forward prediction as well as backward direction may be performed when inter prediction is performed.

Figure 16:
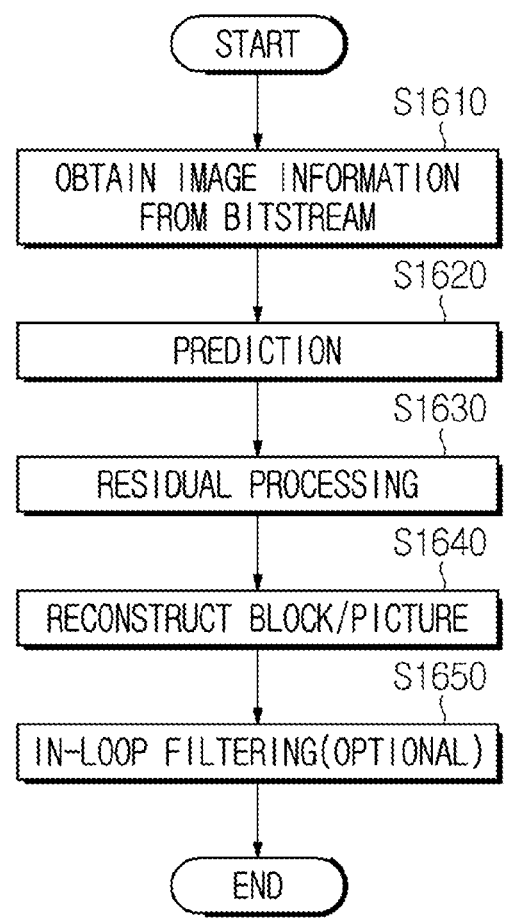
FIGS. 16 and 17 are views showing examples of picture decoding and encoding procedures according to an embodiment.

FIG. 16 shows an example of a schematic picture decoding procedure to which an embodiment(s) of the present document is applicable. In FIG. 16, step S1610 may be performed by the entropy decoder 210 of the decoding apparatus described above with reference to FIG. 3. Step S1620 may be performed by the prediction unit including the intra prediction unit 265 and the inter prediction unit 260. Step S1630 may be performed by the residual processor including the dequantizer 220 and the inverse transformer 230. Step S1640 may be performed by the adder 235. Step S1650 may be performed by the filter 240. Step S1610 may include the information decoding procedure described in the present document. Step S1620 may include the inter/intra prediction procedure described in the present document. Step S1630 may include the residual processing procedure described in the present document. Step S1640 may include the block/picture reconstruction procedure described in the present document. Step S1650 may include the in-loop filtering procedure described in the present document.

Referring to FIG. 16, the picture decoding procedure may schematically include, as described above with reference to FIG. 3, an image/video information acquisition procedure from a bitstream (through decoding) in step S1610, the picture reconstruction procedure in steps S1620 to S1640, and the in-loop filtering procedure for a reconstructed picture in step S1650. The picture reconstruction procedure may be performed on the basis of prediction samples and residual samples that are obtained through the inter/intra prediction in step S1620 and the residual processing in step S1630 (dequantization and inverse transformation of quantized transformation coefficients) process described in the present document. A modified reconstructed picture may be generated through the in-loop filtering procedure for a reconstructed picture generated through the picture reconstruction procedure. The modified reconstructed picture may be output as a decoded picture, and may be stored in the decoded picture buffer or the memory 250 of the decoding apparatus to be used later as a reference picture in the inter prediction procedure when a picture is decoded. In some cases, the in-loop filtering procedure may be omitted. In this case, the reconstructed picture may be output as a decoded picture, and may be stored in the decoded picture buffer or the memory 250 of the decoding apparatus to be used later as a reference picture in the inter prediction procedure when a picture is decoded. As described above, the in-loop filtering procedure in step S1650 may include a deblocking filtering procedure, a sample adaptive offset (SAO) procedure, an adaptive loop filter (ALF) procedure, and/or a bi-lateral filter procedure. Some or all thereof may be omitted. In addition, one or some of the deblocking filtering procedure, the sample adaptive offset (SAO) procedure, the adaptive loop filter (ALF) procedure, and the bi-lateral filter procedure may be sequentially applied, or all of them may be sequentially applied. For example, the deblocking filtering procedure may be applied to a reconstructed picture, and then the SAO procedure may be performed. Alternatively, for example, the deblocking filtering procedure may be applied to a reconstructed picture, and then the ALF procedure may be performed. This may be performed in the same manner as in the encoding apparatus.

Figure 17:
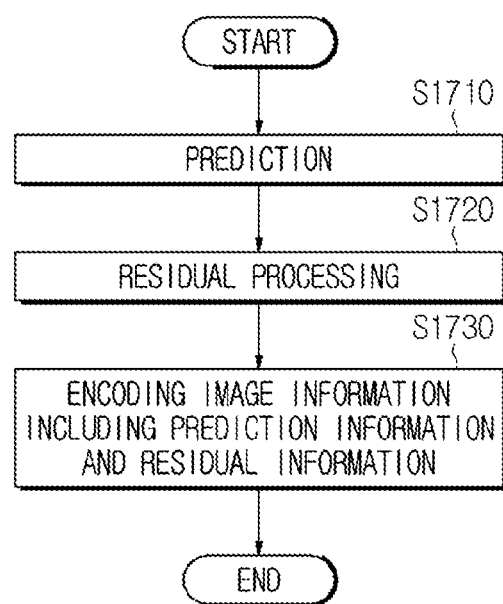

FIG. 17 shows an example of a schematic picture encoding procedure to which an embodiment(s) of the present document is applicable. In FIG. 17, step S1710 may be performed by the prediction unit including the intra prediction unit 185 or the inter prediction unit 180 of the encoding apparatus described above with reference to FIG. 2. Step S1720 may be performed by the residual processor including the transformer 120 and/or the quantizer 130. Step S1730 may be performed by the entropy encoder 190. Step S1710 may include the inter/intra prediction procedure described in the present document. Step S1720 may include the residual processing procedure described in the present document. Step S1730 may include the information encoding procedure described in the present document.

Referring to FIG. 17, the picture encoding procedure may schematically include, as described above with reference to FIG. 2, a procedure for encoding information (e.g., prediction information, residual information, and partitioning information) for picture reconstruction and outputting the information in the form of a bitstream, a procedure for generating a reconstructed picture for a current picture, and a procedure (optional) for applying in-loop filtering to the reconstructed picture. The encoding apparatus may derive (modified) residual samples from quantized transformation coefficients through the dequantizer 140 and the inverse transformer 150, and may generate a reconstructed picture on the basis of the prediction samples that are an output in step S1710, and the (modified) residual samples. The generated reconstructed picture may be the same as the reconstructed picture generated by the decoding apparatus described above. The in-loop filtering procedure may be performed on the reconstructed picture to generate a modified reconstructed picture. The modified reconstructed picture may be stored in the decoded picture buffer or the memory 170. Similarly to the case in the decoding apparatus, the modified reconstructed picture may be used later as a reference picture in the inter prediction procedure when a picture is encoded. As described above, in some cases, some or all of the in-loop filtering procedure may be omitted. When the in-loop filtering procedure is performed, (in-loop) filtering-related information (parameter) may be encoded by the entropy encoder 190 and output in the form of a bitstream. The decoding apparatus may perform the in-loop filtering procedure on the basis of the filtering-related information in the same manner as the encoding apparatus.

Through this in-loop filtering procedure, noises, such as a blocking artifact and a ringing artifact, generating during image/video coding may be reduced, and subjective/objective visual quality may be improved. In addition, both the encoding apparatus and the decoding apparatus perform the in-loop filtering procedure, so that the encoding apparatus and the decoding apparatus may derive the same prediction result, the reliability of picture coding may be increased, and the amount of data to be transmitted for picture coding may be reduced.

As described above, the picture reconstruction procedure may be performed in the decoding apparatus as well as the encoding apparatus. A reconstructed block may be generated on the basis of intra prediction/inter prediction based on each block basis, and a reconstructed picture including reconstructed blocks may be generated. When a current picture/slice/tile group is an I picture/slice/tile group, the blocks included in the current picture/slice/tile group may be reconstructed on the basis of only intra prediction. In the meantime, when a current picture/slice/tile group is a P or B picture/slice/tile group, the blocks included in the current picture/slice/tile group may be reconstructed on the basis of intra prediction or inter prediction. In this case, inter prediction may be applied to some blocks in the current picture/slice/tile group, and intra prediction may be applied to some remaining blocks. A color component of a picture may include a luma component and a chroma component. Unless explicitly limited in the present document, the method and the embodiments proposed in the present document may be applied to the luma component and the chroma component.

Example of Coding Hierarchy and Structure

A coded video/image according to the present document may be processed according to, for example, a coding hierarchy and structure to be described later.

Figure 18:
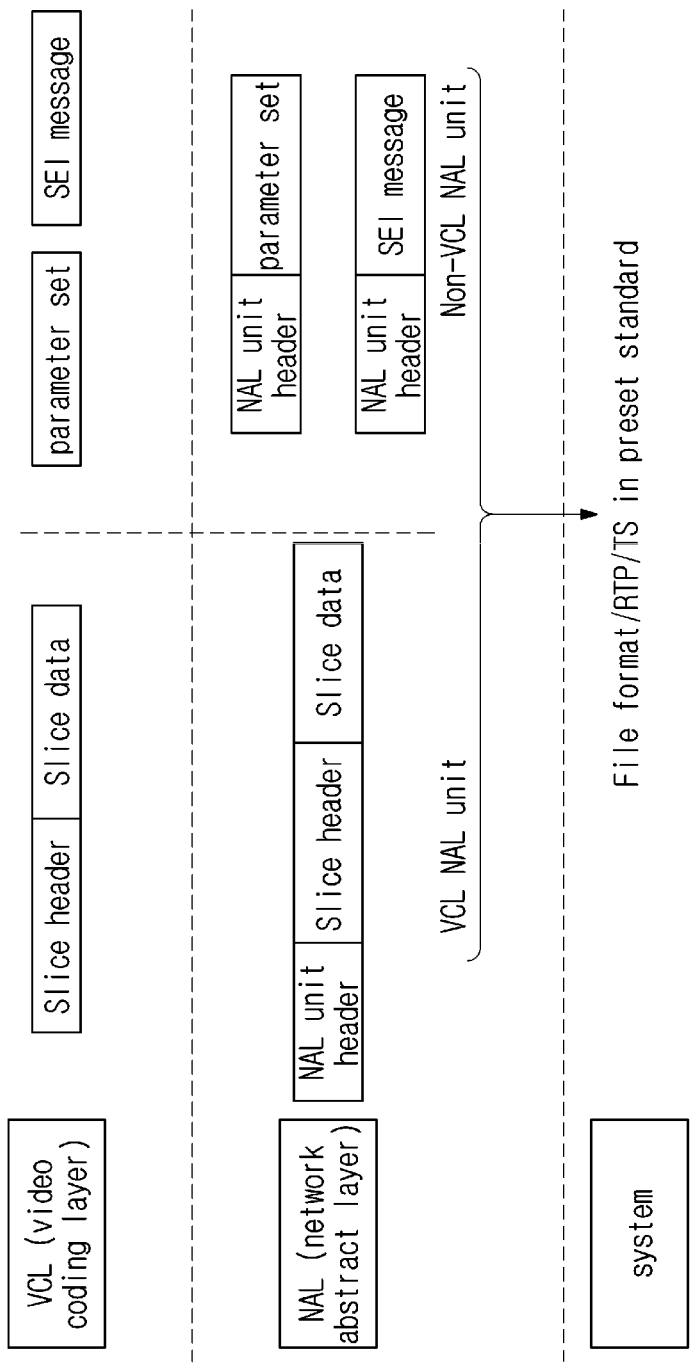
FIG. 18 is a view showing a hierarchical structure for a coded image according to an embodiment.

FIG. 18 is a view showing a hierarchical structure for a coded image. A coded image may be divided into a video coding layer (VCL, video coding hierarchy) that handles decoding processing of an image and itself, a subsystem for transmitting and storing encoded information, and a network abstraction layer (NAL, network abstraction hierarchy) that is present between the VCL and the subsystem, and is in charge of a network adaptation function.

In the VCL, VCL data including compressed image data (slice data) may be generated. Alternatively, a parameter set including information, such as a picture parameter set (PPS), a sequence parameter set (SPS), and a video parameter set (VPS), or a supplemental enhancement information (SEI) message additionally required for an image decoding process may be generated.

In the NAL, header information (NAL unit header) is added to a raw byte sequence payload (RBSP) generated in the VCL so that an NAL unit may be generated. Herein, the RBSP refers to slice data, a parameter set, and an SEI message generated in the VCL. The NAL unit header may include NAL unit type information that is specified according to RBSP data included in the NAL unit.

As shown in the figure, the NAL unit may be divided into a VCL NAL unit and a non-VCL NAL unit depending on the RBSP generated in the VCL. The VCL NAL unit may refer to an NAL unit that includes information (slice data) on an image. The non-VCL NAL unit may refer to an NAL unit that includes information (a parameter set or an SEI message) required for decoding an image.

With header information attached according to a data standard of the subsystem, the VCL NAL unit and the non-VCL NAL unit may be transmitted over a network. For example, an NAL unit may be transformed in the form of data of a predetermined standard, such as H.266/VVC file format, a real-time transport protocol (RTP), a transport stream (TS), and the resulting data may be transmitted over various networks.

As described above, regarding an NAL unit, an NAL unit type may be specified according to an RBSP data structure included in the NAL unit, and information on the NAL unit type may be stored in an NAL unit header and signaled.

For example, depending on whether an NAL unit includes information (slice data) on an image, rough classification into a VCL NAL unit type and a non-VCL NAL unit type is made. The VCL NAL unit type may be classified according to a characteristic and a type of a picture included in the VCL NAL unit, and the non-VCL NAL unit type may be classified according to the type of a parameter set.

NAL unit types specified according to types of parameter sets which non-VCL NAL unit types include are listed below as an example.

APS (Adaptation Parameter Set) NAL unit: a type of an NAL unit including an APS
DPS (Decoding Parameter Set) NAL unit: a type of an NAL unit including a DPS
VPS (Video Parameter Set) NAL unit: a type of an NAL unit including a VPS
SPS (Sequence Parameter Set) NAL unit: a type of an NAL unit including an SPS
PPS (Picture Parameter Set) NAL unit: a type of an NAL unit including a PPS The above-described NAL unit types have syntax information for an NAL unit type, and the syntax information may be stored in the NAL unit header and signaled. For example, the syntax information may be nal_unit_type, and NAL unit types may be specified by nal_unit_type values.

The slice header (slice header syntax) may include information/a parameter applicable to the slice in common. The APS (APS syntax) or the PPS (PPS syntax) may include information/a parameter applicable to one or more slices or pictures in common. The SPS (SPS syntax) may include information/a parameter applicable to one or more sequences in common. The VPS (VPS syntax) may include information/a parameter applicable to multiple layers in common. The DPS (DPS syntax) may include information/a parameter applicable to the entire video in common. The DPS may include information/a parameter related to concatenation of coded video sequences (CVSs). In the present document, a high level syntax (HLS) may include at least one selected from the group of the APS syntax, the PPS syntax, the SPS syntax, the VPS syntax, the DPS syntax, and the slice header syntax.

In the present document, image/video information encoded by the encoding apparatus and signaled in the form of a bitstream to the decoding apparatus may include partitioning-related information, intra/inter prediction information, residual information, and in-loop filtering information within a picture as well as information included in the slice header, information included in the APS, information included in the PPS, information included in the SPS, and/or information included in the VPS.

Overview of Adaptive Color Transform (ACT)

Adaptive color transform (ACT) is a color space transformation (conversion) technology for removing unnecessary overlap between color components, and has been used in an HEVC screen content extension version. This may also be applied to VVC.

In the HEVC screen content extension (HEVC SCC extension), ACT has been used to adaptively transform a prediction residual from an existing color space to a YCgCo color space. One of the two color spaces may be optionally selected by signaling one ACT flag for each transformation basis.

For example, a first value (e.g., 1) of the flag may indicate that a residual of the transformation basis is encoded in the original color space. A second value (e.g., 1) of the flag may indicate that a residual of the transformation basis is encoded in the YCgCo color space.

Figures 19, 20:
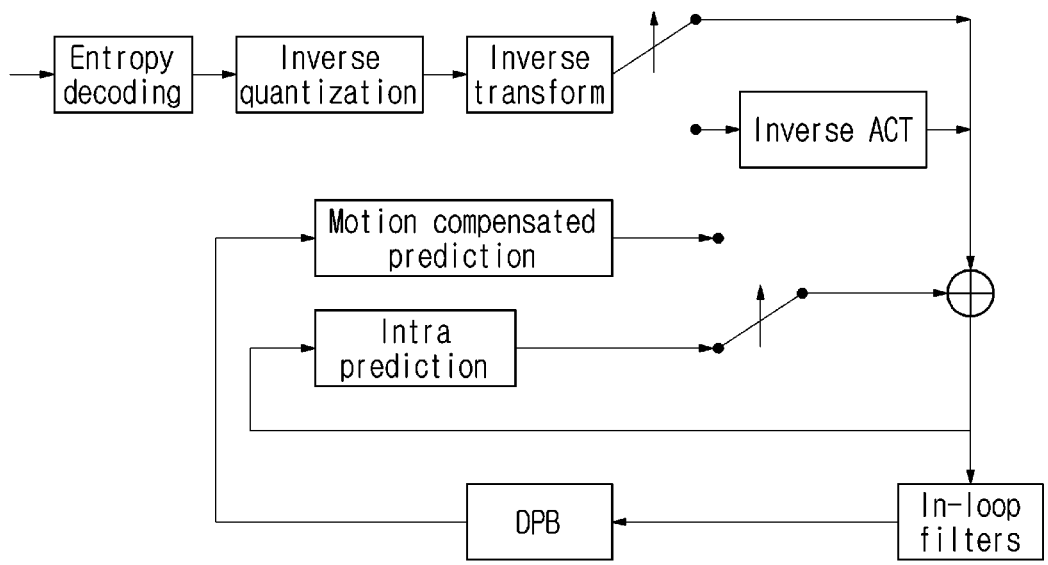
FIG. 19 is a view showing an embodiment of a decoding process to which ACT is applied.
FIG. 20 is a view showing an embodiment of a sequence parameter set syntax table in which a syntax element related to ACT is signaled.

FIG. 19 is a view showing an embodiment of a decoding process to which ACT is applied. In an embodiment of FIG. 19, motion compensated prediction may correspond to inter prediction in the present disclosure.

As shown in FIG. 19, a reconstructed picture (or a reconstructed block, a reconstructed sample array, a reconstructed sample(s), a reconstructed signal) may be generated on the basis of a prediction output value and a residual output value. Herein, the residual output value may be an inverse transformation output value. Herein, inverse transformation may be normal inverse transformation. Herein, the normal inverse transformation may be MTS-based inverse transformation or inverse low frequency non-separable transform (LFNST).

Herein, the prediction output value may be a prediction block, a prediction sample array, a prediction sample(s) or a prediction signal. The residual output value may be a residual block, a residual sample array, a residual sample(s), or a residual signal.

For example, in terms of the encoding apparatus, an ACT process may be performed on residual samples derived on the basis of prediction samples. In addition, an output value of the ACT process may be provided as an input of a normal transformation process. Herein, the normal transformation process may be MTS-based transformation or LFNST.

Information (parameter) on (inverse) ACT may be generated and encoded by the encoding apparatus, and may be transmitted to the decoding apparatus in the form of abitstream.

The decoding apparatus may obtain, parse, and decode (inverse) ACT-related information (parameter), and may perform inverse ACT on the basis of the (inverse) ACT-related information (parameter).

On the basis of the inverse ACT, (modified) residual samples (or residual block) may be derived. For example, (transformation) coefficients may be derived by applying dequantization to quantized (transformation) coefficients. In addition, residual samples may be derived by performing inverse transformation on (transformation) coefficients. In addition, (modified) residual samples may be obtained by applying inverse ACT to residual samples. The information (parameter) on (inverse) ACT will be described in detail later.

In an embodiment, a core transformation function used in HEVC may be used as a core transformation function (transformation kernel) for color space transformation. For example, matrices for forward transformation and backward transformation as shown in the equations below may be used.

$$\begin{bmatrix} C_0' \\ C_1' \\ C_2' \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4 \quad \text{[Equation 1]}$$

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C_0' \\ C_1' \\ C_2' \end{bmatrix} \quad \text{[Equation 2]}$$

Herein, C0, C1, and C2 may correspond to G, B, and R. Herein, G denotes a green color component, B denotes a blue color component, and R denotes a red color component. In addition, C0', C1', and C2' may correspond to Y, Cg, and Co. Herein, Y denotes a luma, Cg denotes a green chroma, and Co denotes an orange chroma component.

In addition, in order to compensate for a dynamic range change of a residual before and after color transformation, QP adjustment may be applied to a transformation residual by (−5, −5, −3). Details of QP adjustment will be described later.

In the meantime, in the encoding and decoding processes according to an embodiment, when ACT is applicable, the following limitations may be applied.

In the case of dual tree encoding/decoding, ACT is deactivated. For example, ACT may be applied only to single-tree encoding/decoding.

When ISP encoding and decoding are applied, ACT may be deactivated.

For the chroma block to which BDPCM is applied, ACT may be deactivated. Only for the luma block to which BDPCM is applied, ACT may be activated.

When application of ACT is possible, the CCLM may be deactivated.

FIG. 20 is a view showing an embodiment of a sequence parameter set syntax table in which a syntax element related to ACT is signaled.

FIGS. 21 to 27 are views successively showing an embodiment of a syntax table of an encoding basis in which a syntax element related to ACT is signaled.

As shown in FIG. 20, as an ACT activation flag indicating whether ACT is activated in the decoding process, sps_act_enabled_flag 2010 may be used.

A first value (e.g., 0) of the sps_act_enabled_flag may indicate that ACT is not used and a flag cu_act_enabled_flag 2110, 2710 indicating whether ACT is applied in the encoding basis is not provided in the syntax for the encoding basis.

A second value (e.g., 1) of the sps_act_enabled_flag may indicate that ACT may be used and the cu_act_enabled_flag may be provided in the syntax for the encoding basis.

When the sps_act_enabled_flag is not obtained in a bitstream, the value of the sps_act_enabled_flag may be derived as the first value (e.g., 0).

In addition, as shown in FIG. 21, as ACT flags indicating whether a residual of the current encoding basis is encoded in the YCgCo color space, the cu_act_enabled_flag 2110, 2710 may be used.

A first value (e.g., 0) of the cu_act_enabled_flag may indicate that a residual of the current encoding basis is encoded in the original color space. A second value (e.g., 1) of the cu_act_enabled_flag may indicate that a residual of the current encoding basis is encoded in the YCgCo color space.

When the cu_act_enabled_flag is not provided in a bitstream, the flag may be derived as the first value (e.g., 0). Herein, the original color space may be an RGB color space.

OP Derivation Method of Transformation Basis by Using ACT OP Offset

In an embodiment, in a scaling process for a transformation coefficient, a derivation process of a quantization parameter and a Qp update process may be performed as follows. For example, the quantization parameter derivation process may be performed using the following parameters.

Luma coordinates (xCb, yCb) indicating relative coordinates of the top left luma sample of a current encoding block with respect to the top left luma sample of a current picture, A variable cbWidth indicating the width of the current encoding block on a per luma sample basis, A variable cbHeight indicating the height of the current encoding block on a per luma sample basis A variable treeType indicating whether a single tree (SINGLE_TREE) or a dual tree is used to partition a current coding tree node, and indicating, when the dual tree is used, whether the dual tree is a luma component dual tree (DAUL_TREE_LUMA) or a chroma component dual tree (DAUL_TREE_CHROMA)

In the present process, a luma quantization parameter Qp'Y, chroma quantization parameters Qp'Cb, Qp'Cr, and Qp'CbCr may be derived.

A variable luma location (xQg, yQg) may indicate the location of the top left luma sample of a current quantization group corresponding to the top left sample of a current picture. Herein, the horizontal location xQg and the vertical location yQg may be set to be equal to the values of a variable CuQgTopLeftX and a variable CuQgTopLeftY, respectively. The variables CuQgTopLeftX and CuQgTopLeftY may be defined as predetermined values in the coding tree syntax as shown in FIG. 28.

Herein, the current quantization group may be a quadrangular area within a coding tree block, and may share the same $qP_{Y\_PRED}$ value. The width and the height thereof may be equal to the width and the height of a coding tree node in which a top left luma sample location is assigned to each of the CuQgTopLeftX and the CuQgTopLeftY.

When the treeType is the SINGLE_TREE or the DUAL_TREE_LUMA, a luma quantization parameter prediction value $qP_{Y\_PRED}$ may be derived as in following steps.

1. The variable $qP_{Y\_RED}$ may be derived as follows.

(Condition 1) When any one of the following conditions is true, the value of the $qP_{Y\_PRED}$ may be set to the same value as $SliceQp_Y$ (herein, $SliceQp_Y$ indicates an initial value of a quantization parameter $Qp_Y$ for all slices in a picture, and this may be obtained from a bitstream). Alternatively, the value of the $qP_{Y\_PRED}$ may be set to the value of the luma quantization parameter $Qp_Y$ of the last luma encoding basis of the immediately preceding quantization group according to the decoding order.

(Condition 1-1) When the current quantization group is the first quantization group in a slice (Condition 1-2) When the current quantization group is the first quantization group in a tile (Condition 1-3) When the current quantization group is the first quantization group in a CTB row in a tile and predetermined synchronization occurs (e.g., when entropy_coding_sync_enabled_flag has a value of 1)

2. A value of a variable $qP_{Y\_A}$ may be derived as follows.

(Condition 2) When at least one of the following conditions is true, the value of the $qP_{Y\_A}$ may be set to the value of the $qP_{Y\_PRED}$. Alternatively, the value of the $qP_{Y\_A}$ may be set to the value of the luma quantization parameter $Qp_Y$ of the encoding basis that includes a luma encoding block covering a luma sample location (xQg−1, yQg).

(Condition 2-1) With respect to a block identified by a sample location (xCb, yCb), a block identified by a sample location (xQg−1, yQg) is not an available neighboring block, (Condition 2-2) When a CTB including a luma encoding block covering a luma sample location (xQg−1, yQg) is different from a CTB including a current luma encoding block at a luma sample location (xCb, yCb), for example, when all the following condition are true (Condition 2-2-1) The value of (xQg−1)>>CtbLog 2SizeY is different from that of (xCb)>>CtbLog 2SizeY (Condition 2-2-2) The value of (yQg)>>CtbLog 2SizeY is different from that of (yCb)>>CtbLog 2SizeY 3. A value of a variable $qP_{Y\_B}$ may be derived as follows.

(Condition 3) When at least one of the following conditions is true, the value of the $qP_{Y\_B}$ may be set to the value of the $qP_{Y\_PRED}$. Alternatively, the value of the $qP_{Y\_B}$ may be set to the value of the luma quantization parameter $Qp_Y$ of the encoding basis that includes a luma encoding block covering a luma sample location (xQg, yQg−1).

(Condition 3-1) With respect to a block identified by a sample location (xCb, yCb), when a block identified by a sample location (xQg, yQg−1) is not an available neighboring block, (Condition 3-2) When a CTB including a luma encoding block covering a luma sample location (xQg, yQg−1) is different from a CTB including a current luma encoding block at a luma sample location (xCb, yCb), for example, when all the following conditions are true (Condition 3-2-1) The value of (xQg)>>CtbLog 2SizeY is different from that of (xCb)>>CtbLog 2SizeY (Condition 3-2-2) The value of (yQg−1)>>CtbLog 2SizeY is different from that of (yCb)>>CtbLog 2SizeY 4. A luma quantization parameter prediction value $qP_{Y\_PRED}$ may be derived as follows.

When all the following conditions are true, the $qP_{Y\_PRED}$ may be set to the luma quantization parameter $Qp_Y$ of the encoding basis that includes a luma encoding block covering a luma sample location (xQg, yQg−1).

(Condition 3-1) With respect to a block identified by a sample location (xCb, yCb), a block identified by a sample location (xQg, yQg−1) is an available neighboring block When the current quantization group is the first quantization group in a CTB row in a tile In the meantime, when all the conditions are not true, the $qP_{Y\_PRED}$ may be derived as shown in the equation below.

$$qP_{Y\_PRED}=(qP_{Y\_A}+qP_{Y\_B}+1)>>1 \qquad \text{[Equation 3]}$$

The variable $Qp_Y$ may be derived as shown in the equation below.

$$Qp_Y=((qP_{Y\_PRED}+CuQpDeltaVal+64+2*QpBdOffset) \% (64+QpBdOffset))-QpBdOffset \qquad \text{[Equation 4]}$$

Herein, the CuQpDeltaVal indicates the difference between a luma quantization parameter for the encoding basis and a prediction value thereof. The value thereof may be obtained from a bitstream. The QpBdOffset indicates a luma and chroma quantization parameter range offset. The QpBdOffset may be preset to a predetermined constant or obtained from a bitstream. For example, the QpBdOffset may be calculated by multiplying a predetermined constant by a value of a syntax element that indicates the bit depth of a luma or chroma sample. The luma quantization parameter $Qp'_Y$ may be derived as shown in the equation below.

$$Qp'_Y=Qp_Y+QpBdOffset \qquad \text{[Equation 5]}$$

When the value of a variable ChromaArrayType indicating a type of a chroma array is not a first value (e.g., 0) and the treeType is the SINGLE_TREE or the DUAL_TREE_CHROMA, the following processing may be performed.

When the value of the treeType is the DUAL_TREE_CHROMA, the value of the variable $Qp_Y$ may be set to the same value as that of the luma quantization parameter $Qp_Y$ of the luma encoding basis covering the luma sample location (xCb+cbWidth/2, yCb+cbHeight/2).

Variables $qP_{Cb}$, $qP_{Cr}$, and $qP_{CbCr}$ may be derived as shown in the equation below.

$$qP_{Chroma}=Clip3(-QpBdOffset,63,Qp_Y)$$

$$qP_{Cb}=ChromaQpTable[0][qP_{Chroma}]$$

$$qP_{Cr}=ChromaQpTable[1][qP_{Chroma}]$$

$$qP_{CbCr}=ChromaQpTable[2][qP_{Chroma}] \qquad \text{[Equation 6]}$$

The chroma quantization parameters $Qp'_{Cb}$ and $Qp'_{Cr}$ for Cb and Cr components and the chroma quantization parameter $Qp'_{CbCr}$ for joint Cb-Cr coding may be derived as shown in the equation below.

$$Qp'Cb=Clip3(-QpBdOffset,63,qP_{Cb}+pps\_cb\_qp\_offset+slice\_cb\_qp\_offset+CuQpOffset_{Cb})+QpBdOffset$$

$$Qp'_{Cr}=Clip3(-QpBdOffset,63,qP_{Cr}+pps\_cr\_qp\_offset+slice\_cr\_qp\_offset+CuQpOffset_{Cr})+QpBdOffset$$

$$Qp'_{CbCr}=Clip3(-QpBdOffset,63,qP_{Cb}cr+pps\_joint\_cbcr\_qp\_offset+slice\_joint\_cbcr\_qp\_offset+CuQpOffsetcbcr)+QpBdOffset \qquad \text{[Equation 7]}$$

In the equation above, the pps_cb_qp_offset and the pps_cr_qp_offset are offsets used to derive the $Qp'_{Cb}$ and the $Qp'_{Cr}$, and may be obtained from a bitstream for a picture parameter set. The slice_cb_qp_offset and the slice_cr_qp_offset are offsets used to derive the $Qp'_{Cb}$ and the $Qp'_{Cr}$, and may be obtained from a bitstream for a slice header. The CuQpOffset$_{Cb}$ and the CuQpOffset$_{Cr}$ are offsets used to derive the $Qp'_{Cb}$ and the $Qp'_{Cr}$, and may be obtained from a bitstream for the transformation basis.

In addition, for example, a dequantization process for a transformation coefficient may be performed using the following parameters.

Luma coordinates (xTbY, yTbY) referring to relative coordinates of the top left sample of the current luma transformation block with respect to the top left luma sample of the current picture A variable nTbW indicating the width of a transformation block A variable nTbH indicating the height of a transformation block A variable cIdx indicating a color component of a current block The output of the present process may be an array d of scaled transformation coefficients. Herein, the size of the array d may be (nTbW)×(nTbH). The individual elements constituting this may be identified as d[x][y].

To this end, a quantization parameter qP may be derived as follows. When the cIdx has a value of 0, the qP may be derived as shown in the equation below.

$$qP=Qp'_Y \qquad \text{[Equation 8]}$$

Alternatively, when the TuCResMode[xTbY][yTbY] has a value of 2, derivation may be made as shown in the equation below.

$$qP=Qp'_{CbCr} \qquad \text{[Equation 9]}$$

Alternatively, when the cIdx has a value of 1, the qP may be derived as shown in the equation below.

$$qP=Qp'_{Cb} \qquad \text{[Equation 10]}$$

Alternatively, when the cIdx has a value of 2, the qP may be derived as shown in the equation below.

$$qP=Qp'_{Cr} \qquad \text{[Equation 11]}$$

Afterward, the quantization parameter qP may be updated as follows. In addition, variables rectNonTsFlag and bdShift may be derived as follows. For example, when transform_skip_flag[xTbY][yTbY][cIdx] has a value of 0 (e.g., when transformation of a current transformation block is not skipped), derivation may be made as shown in the equation below.

qP=qP−(cu_act_enabled_flag[xTbY][yTbY]?5:0)

rectNonTsFlag=0 bdShift=10     [Equation 12]

Alternatively, when the transform_skip_flag[xTbY][yTbY][cIdx] has a value of 1 (e.g., transformation of the current transformation block is skipped), derivation may be made as shown in the equation below.

qP=Max(QpPrimeTsMin,qP)−(cu_act_enabled_flag[xTbY][yTbY]?5:0)

rectNonTsFlag=(((Log 2($n$TbW)+Log 2($n$TbH))& 1)==1 bdShift=BitDepth+(rectNonTsFlag?1:0)+((Log 2(nTbW)+Log 2(nTbH))/2)−+pic_dep_quant_enabled_flag     [Equation 13]

Herein, the QpPrimeTsMin may indicate a minimum quantization parameter value allowed when a transformation skip mode is applied. This may be determined to be a predetermined constant or may be derived from a syntax element of the bitstream related thereto.

Herein, the suffixes Y, Cb, and Cr may denote G, B, and R color components in an RGB color model, or Y, Cg, and Co color components in a YCgCo color model.

Overview of Block Difference Pulse Code Modulation (BDPCM)

The image encoding apparatus and the image decoding apparatus according to an embodiment may perform differential encoding of a residual signal. For example, the image encoding apparatus may encode the residual signal by subtracting a prediction signal from the residual signal of a current block, and the image decoding apparatus may decode the residual signal by adding the prediction signal to the residual signal of the current block. The image encoding apparatus and the image decoding apparatus according to an embodiment may perform differential encoding of the residual signal by applying BDPCM described below.

BDPCM according to the present disclosure may be performed in a quantized residual domain. The quantized residual domain may include a quantized residual signal (or quantized residual coefficient), and, when applying BDPCM, transform of the quantized residual signal may be skipped. For example, when applying BDPCM, transform of the residual signal may be skipped and quantization may be performed. Alternatively, the quantized residual domain may include quantized transform coefficients.

In an embodiment to which BDPCM applies, the image encoding apparatus may derive a residual block of a current block predicted in an intra prediction mode and quantize the residual block, thereby deriving a residual block. When a differential encoding mode of the residual signal is performed with respect to the current block, the image encoding apparatus may perform differential encoding with respect to the residual block to derive a modified residual block. In addition, the image encoding apparatus may encode differential encoding mode information specifying the differential encoding mode of the residual signal and the modified residual block, thereby generating a bitstream.

More specifically, when BDPCM applies to the current block, a predicted block (prediction block) including predicted samples of the current block may be generated by intra prediction. In this case, an intra prediction mode for performing intra prediction may be signaled through a bitstream and may be derived based on a prediction direction of BDPCM described below. In addition, in this case, the intra prediction mode may be determined to be one of a vertical prediction direction mode or a horizontal prediction direction mode. For example, when the prediction direction of BDPCM is a horizontal direction, the intra prediction mode may be determined to be a horizontal prediction direction mode, and the prediction block of the current block may be generated by intra prediction of the horizontal direction. Alternatively, when the prediction direction of BDPCM is a vertical direction, the intra prediction mode may be determined to be a vertical prediction direction mode, and the prediction block of the current block may be generated by intra prediction of the vertical direction. When applying intra prediction of the horizontal direction, a value of a pixel adjacent to the left of the current block may be determined to be a prediction sample value of samples included in a corresponding row of the current block. When applying intra prediction of the vertical direction, a value of a pixel adjacent to the top of the current block may be determined to be a prediction sample value of samples included in a corresponding column of the current block. When applying BDPCM to the current block, a method of generating the prediction block of the current block may be equally performed in an image encoding apparatus and an image decoding apparatus.

When applying BDPCM to the current block, the image encoding apparatus may generate a residual block including residual samples of the current block, by subtracting the prediction sample from the current block. The image encoding apparatus may quantize the residual block and then encode a difference (or delta) between a quantized residual sample and a predictor of the quantized residual sample. The image decoding apparatus may generate the quantized residual block of the current block, by obtaining the quantized residual sample of the current block based on the predictor and the difference reconstructed from a bitstream. Thereafter, the image decoding apparatus may dequantize the quantized residual block and then add it to the prediction block, thereby reconstructing the current block.

Figure 29:
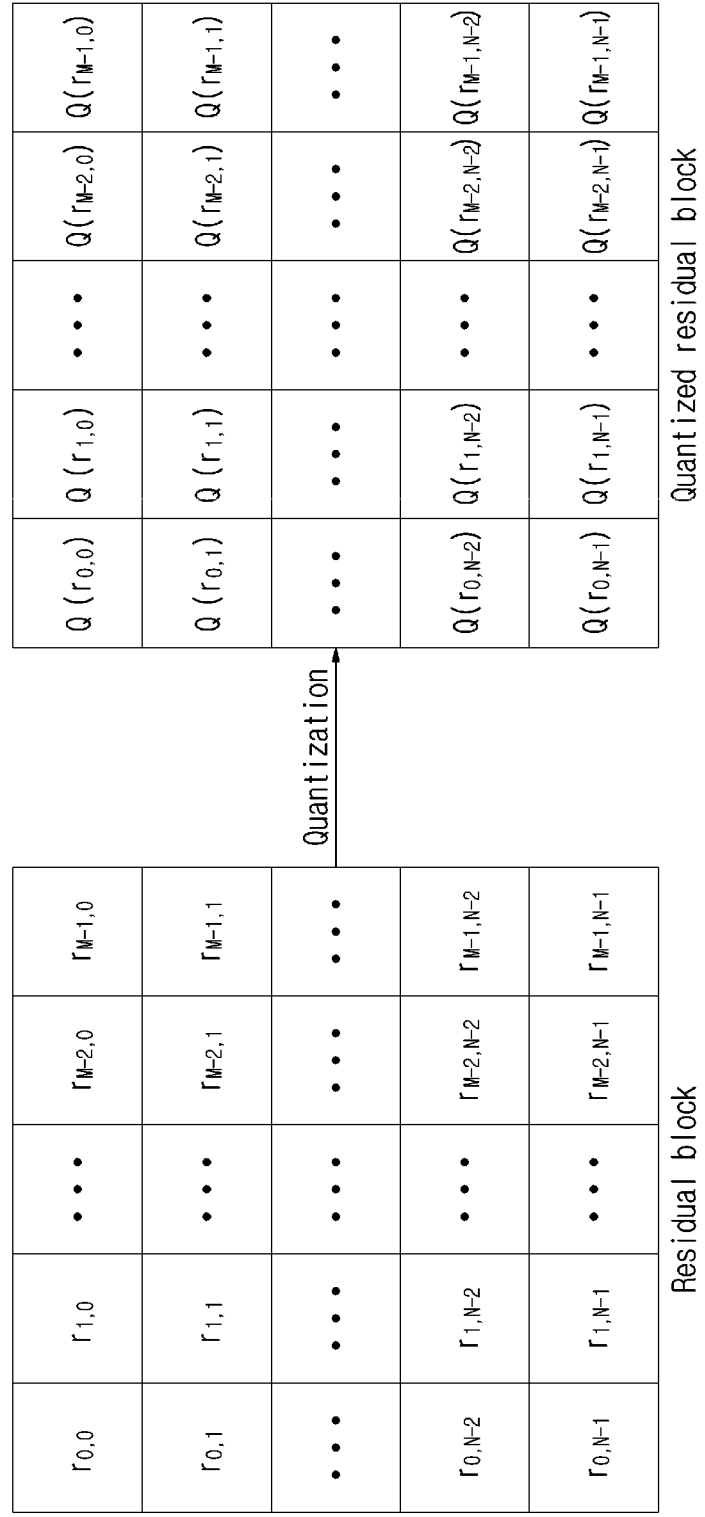
FIG. 29 is a view showing a method of encoding a residual sample of BDPCM according to an embodiment.

FIG. 29 is a view illustrating a method of encoding a residual sample of BDPCM according to the present disclosure. The residual block of FIG. 29 may be generated by subtracting a prediction block from a current block in an image encoding apparatus. The quantized residual block of FIG. 29 may be generated by quantizing the residual block by the image encoding apparatus. In FIG. 29, $r_{i,j}$ specifies a value of a residual sample of the (i, j) coordinates in a current block. When the size of the current block is M×N, a value i may be from 0 to M−1, inclusive. In addition, a value j may be from 0 to N−1, inclusive. For example, a residual may refer to a difference between an original block and a prediction block. For example, $r_{i,j}$ may be derived by subtracting the value of the prediction sample from the value of an original sample of the (i, j) coordinates in the current block. For example, $r_{i,j}$ may be a prediction residual after horizontal intra prediction or vertical intra prediction is performed using a sample that is not filtered from a top or left boundary sample. In the horizontal intra prediction, a value of a left neighboring pixel is copied along a line crossing a prediction block. In the vertical intra prediction, a top neighboring line is copied to an individual line of a prediction block.

In FIG. 29, $Q(r_{i,j})$ refer to a value of a quantized residual sample of coordinates (i, j) in the current block. For example, $Q(r_{i,j})$ may refer to a quantized value of $r_{i,j}$.

Prediction of BDPCM is performed on the quantized residual samples of FIG. 29, and a modified quantized residual block R' having a M×N size including modified quantized residual samples r' may be generated.

When a prediction direction of BDPCM is a horizontal direction, a value $r'_{i,j}$ of a modified quantized residual sample of coordinates (i, j) in the current block may be calculated as shown in the equation below.

$$r'_{i,j} = \begin{cases} Q(r_{i,j}), & i = 0, \quad 0 \leq j \leq (N-1) \\ Q(r_{i,j}) - Q(r_{(i-1),j}), & 1 \leq i \leq (M-1), \quad 0 \leq j \leq (N-1) \end{cases} \quad \text{[Equation 14]}$$

As shown in Equation 14, when the prediction direction of BDPCM is a horizontal direction, a value $Q(r_{0,j})$ of a quantized residual sample is assigned as it is to a value $r'_{0,j}$ of coordinates (0, j). A value $r'_{i,j}$ of other coordinates (i, j) may be derived as a difference value between a value $Q(r_{i,j})$ of a quantized residual sample of coordinates (i, j) and a value $Q(r_{i-1,j})$ of a quantized residual sample of coordinates (i−1, j). That is, instead of encoding a value $Q(r_{i,j})$ of a quantized residual sample of coordinates (i, j), a difference value calculated by using a value $Q(r_{i-1,j})$ of a quantized residual sample of coordinates (i−1, j) as a prediction value is derived as a modified quantized residual sample value $r'_{i,j}$, and then the value $r'_{i,j}$ is encoded.

When a prediction direction of BDPCM is a vertical direction, a value $(r'_{i,j})$ of a modified quantized residual sample of coordinates (i, j) in the current block may be calculated as shown in the equation below.

$$r'_{i,j} = \begin{cases} Q(r_{i,j}), & 0 \leq i \leq (M-1), \quad j = 0 \\ Q(r_{i,j}) - Q(r_{i,(j-1)}), & 0 \leq i \leq (M-1), \quad 1 \leq j \leq (N-1) \end{cases} \quad \text{[Equation 15]}$$

As shown in Equation 15, when the prediction direction of BDPCM is a vertical direction, a value $Q(r_{i,0})$ of a quantized residual sample is assigned as it is to a value $r'_{i,0}$ of coordinates (i, 0). A value $r'_{i,j}$ of other coordinates (i, j) may be derived as a difference value between a value $Q(r_{i,j})$ of a quantized residual sample of coordinates (i, j) and a value $Q(r_{i,j-1})$ of a quantized residual sample of coordinates (i, j−1). That is, instead of encoding a value $Q(r_{i,j})$ of a quantized residual sample of coordinates (i, j), a difference value calculated by using a value $Q(r_{i,j-1})$ of a quantized residual sample of coordinates (i, j−1) as a prediction value is derived as a modified quantized residual sample value $r'_{i,j}$, and then the value $r'_{i,j}$ is encoded.

As described above, the process of modifying a current quantized residual sample value by using a nearby quantized residual sample value as a prediction value may be called BDPCM prediction.

Finally, the image encoding apparatus may encode a modified quantized residual block including the modified quantized residual samples and may transmit the resulting block to the image decoding apparatus. Herein, as described above, transformation of the modified quantized residual block is not performed.

FIG. 30 is a view showing modified quantized residual blocks generated by performing BDPCM of the present disclosure.

In FIG. 30, horizontal BDPCM shows a modified quantized residual block generated according to Equation 14 when the prediction direction of BDPCM is a horizontal direction. In addition, vertical BDPCM shows a modified quantized residual block generated according to Equation 15 when the prediction direction of BDPCM is a vertical direction.

Figure 31:
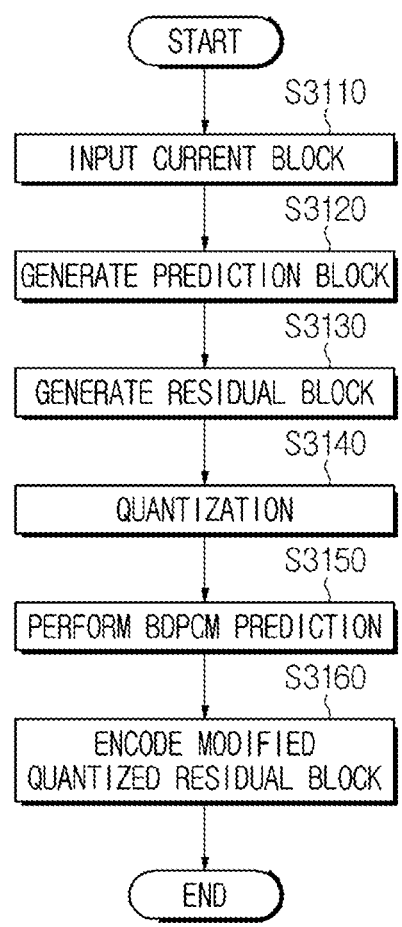
FIG. 31 is a flowchart showing a procedure for encoding a current block by applying BDPCM in an image encoding apparatus according to an embodiment.

FIG. 31 is a flowchart showing a procedure for encoding a current block by applying BDPCM in an image encoding apparatus.

First, when a current block that is an encoding target block is input in step S3110, prediction may be performed on the current block to generate a prediction block in step S3120. The prediction block in step S3120 may be an intra-predicted block, and an intra prediction mode may be determined as described above. On the basis of the prediction block generated in step S3120, a residual block of the current block may be generated in step S3130. For example, the image encoding apparatus may generate a residual block (values of residual samples) by subtracting a prediction block (values of predicted samples) from the current block (values of original samples). For example, by performing step S3130, a residual block of FIG. 29 may be generated. On the residual block generated in step S3130, quantization may be performed in step S3140 to generate a quantized residual block, and BDPCM prediction may be performed on the quantized residual block in step S3150. The quantized residual block generated as a result of performing step S3140 may be the quantized residual block of FIG. 29. As a result of BDPCM prediction in step S3150, a modified quantized residual block of FIG. 30 may be generated according to a prediction direction. Since BDPCM prediction in step S3150 has been described with reference to FIGS. 29 to 30, a detailed description thereof will be omitted. Afterward, the image encoding apparatus may encode the modified quantized residual block in step S3160 to generate a bitstream. Herein, transformation of the modified quantized residual block may be skipped.

The BDPCM operation in the image encoding apparatus described with reference to FIGS. 29 to 31 may be performed in reverse by the image decoding apparatus.

Figure 32:
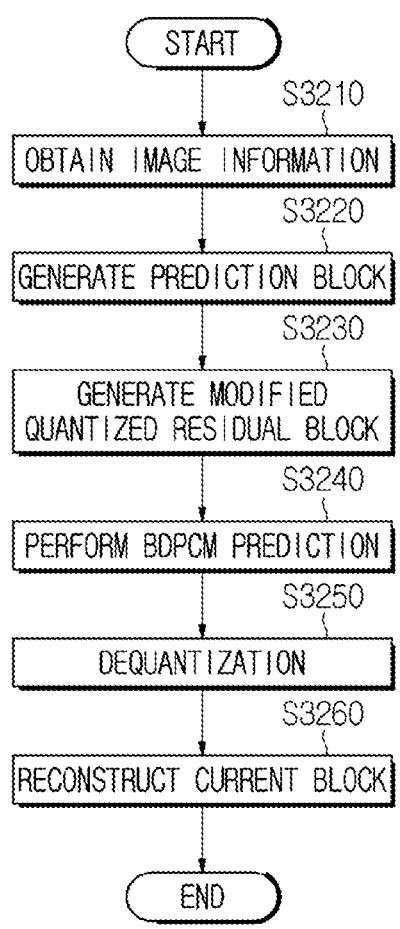
FIG. 32 is a flowchart showing a procedure for reconstructing a current block by applying BDPCM in an image decoding apparatus according to an embodiment.

FIG. 32 is a flowchart showing a procedure for reconstructing a current block by applying BDPCM in the image decoding apparatus.

The image decoding apparatus may obtain information (image information) required for reconstructing the current block from a bitstream in step S3210. The information required for reconstructing the current block may include information (prediction information) on prediction of the current block, and information (residual information) on a residual of the current block. The image decoding apparatus may perform prediction on the current block on the basis of information on the current block, and may generate a prediction block in step S3220. Prediction on the current block may be intra prediction, and a detailed description thereof is the same as that described above with reference to FIG. 31. In FIG. 32, it is shown that step S3220 of generating the prediction block for the current block is performed before steps S3230 to S3250 of generating a residual block of the current block. However, no limitation thereto is imposed. After a residual block of the current block is generated, a prediction block of the current block may be generated. Alternatively, a residual block of the current block and a prediction block of the current block may be generated simultaneously.

The image decoding apparatus may generate a residual block of the current block in step S3230 by parsing residual information of the current block from the bitstream. The residual block generated in step S3230 may be the modified quantized residual block shown in FIG. 30.

The image decoding apparatus may generate the quantized residual block of FIG. 29 by performing BDPCM prediction in step S3240 on the modified quantized residual block of FIG. 30. BDPCM prediction in step S3240 is a procedure for generating the quantized residual block of FIG. 29 from the modified quantized residual block of FIG. 30, which corresponds to the reverse process of step S3150 performed by the image encoding apparatus. For example, when differential encoding mode information (e.g., bdpcm_flag) obtained from a bitstream indicates a differential encoding mode in which differential encoding of a residual coefficient is performed as BDPCM is applied, the image decoding apparatus performs differential encoding on a residual block to derive a modified residual block. Using a residual coefficient to be modified and a prediction residual coefficient, the image decoding apparatus may modify at least one residual coefficient to be modified among residual coefficients in a residual block. The prediction residual coefficient may be determined on the basis of the prediction direction indicated by differential encoding direction information (e.g., bdpcm_dir_flag) obtained from the bitstream. The differential encoding direction information may indicate either a vertical direction or a horizontal direction. The image decoding apparatus may assign a value obtained by adding the residual coefficient to be modified and the prediction residual coefficient, to a location of the residual coefficient to be modified. Herein, the prediction residual coefficient may be a coefficient that is immediately before and adjacent to the residual coefficient to be modified, in terms of the order according to the prediction direction.

Hereinafter, BDPCM prediction in step S3240 performed by the image decoding apparatus will be described in more detail below. The decoding apparatus may calculate a quantized residual sample $Q(r_{i,j})$ by performing the calculation performed by the encoding apparatus in reverse. For example, when the prediction direction of BDPCM is a horizontal direction, the image decoding apparatus may generate a quantized residual block from a modified quantized residual block by using Equation 16.

$$Q(r_{i,j}) = \Sigma_{k=0}^{i} r'_{k,j},\ 0 \leq i \leq (M-1),\ 0 \leq j \leq (N-1) \quad \text{[Equation 16]}$$

As defined in Equation 16, a value $Q(r_{i,j})$ of a quantized residual sample of coordinates (i, j) may be calculated by adding up values of modified quantized residual samples starting from coordinates (0, j) to coordinates (i, j).

Alternatively, using Equation 17 instead of Equation 16, a value $Q(r_{i,j})$ of a quantized residual sample of coordinates (i, j) may be calculated.

$$Q(r_{i,j}) = \begin{cases} r'_{i,j}, & i = 0, \quad 0 \leq j \leq (N-1) \\ r'_{i,j} + Q(r_{(i-1),j}), & 1 \leq i \leq (M-1),\ 0 \leq j \leq (N-1) \end{cases} \quad \text{[Equation 17]}$$

Equation 17 is the reverse process corresponding to Equation 14. According to Equation 17, a value $Q(r_{0,j})$ of a quantized residual sample of coordinates (0, j) is derived as a value $r'_{0,j}$ of a modified quantized residual sample of coordinates (0, j). $Q(r_{i,j})$ of other coordinates (i, j) is derived as the sum of a value $r'_{i,j}$ of a modified quantized residual sample of coordinates (i, j) and a value $Q(r_{i-1,j})$ of a quantized residual sample of coordinates (i−1, j). That is, a difference value $r'_{i,j}$ is added up by using a value $Q(r_{i-1,j})$ of a quantized residual sample of coordinates (i−1, j) as a prediction value, thereby deriving a quantized residual sample value $Q(r_{i,j})$.

When the prediction direction of BDPCM is a vertical direction, the image decoding apparatus may generate a quantized residual block from a modified quantized residual block by using Equation 18.

$$Q(r_{i,j}) = \Sigma_{k=0}^{j} r'_{i,k},\ 0 \leq i \leq (M-1),\ 0 \leq j \leq (N-1) \quad \text{[Equation 18]}$$

As defined in Equation 18, a value $Q(r_{i,j})$ of a quantized residual sample of coordinates (i, j) may be calculated by adding up values of modified quantized residual samples starting from coordinates (i, 0) to coordinates (i, j).

Alternatively, using Equation 19 instead of Equation 18, a value $Q(r_{i,j})$ of a quantized residual sample of coordinates (i, j) may be calculated.

$$Q(r_{i,j}) = \begin{cases} r'_{i,j}, & 0 \leq i \leq (M-1), \quad j = 0 \\ r'_{i,j} + Q(r_{i,(j-1)}), & 0 \leq i \leq (M-1),\ 1 \leq j \leq (N-1) \end{cases} \quad \text{[Equation 19]}$$

Equation 19 is the reverse process corresponding to Equation 15. According to Equation 19, a value $Q(r_{i,0})$ of a quantized residual sample of coordinates (i, 0) is derived as a value $r'_{i,0}$ of a modified quantized residual sample of coordinates (i, 0). $Q(r_{i,j})$ of other coordinates (i, j) is derived as the sum of a value $r'_{i,j}$ of a modified quantized residual sample of coordinates (i, j) and a value $Q(r_{i,j-1})$ of a quantized residual sample of coordinates (i, j−1). That is, a difference value $r'_{i,j}$ is added up by using a value $Q(r_{i,j-1})$ of a quantized residual sample of coordinates (i, j−1) as a prediction value, thereby deriving a quantized residual sample value $Q(r_{i,j})$.

When a quantized residual block composed of quantized residual samples is generated by performing step S3240 according to the above-described method, the image decoding apparatus performs dequantization on the quantized residual block in step S3250 to generate a residual block of the current block. When BDPCM is applied, transformation of the current block is skipped as described above. Therefore, inverse transformation of a dequantized residual block may be skipped.

Afterward, the image decoding apparatus may reconstruct the current block in step S3260 on the basis of the prediction block generated in step S3220 and the residual block generated in step S3250. For example, the image decoding apparatus may reconstruct the current block (values of reconstructed samples) by adding the prediction block (values of predicted samples) and the residual block (values of residual samples). For example, a reconstructed sample value may be generated by adding a dequantized quantized sample $Q^{-1}(Q(r_{i,j}))$ to an intra block prediction value. Differential encoding mode information indicating whether BDPCM is applied to the current block may be signaled through a bitstream. In addition, when BDPCM is applied to the current block, differential encoding direction information indicating the prediction direction of BDPCM may be signaled through a bitstream. When BDPCM is not applied to the current block, the differential encoding direction information may not be signaled.

FIGS. 33 to 35 are views schematically showing syntax for signaling information on BDPCM.

FIG. 33 is a view showing syntax of a sequence parameter set according to an embodiment for signaling BDPCM information. In an embodiment, all SPS RBSPs included in at least one access unit (AU) having a value of 0 as a temporal ID (TemporalId) or provided through external means may be set to be used before being referenced in a decoding process. In addition, an SPS NAL unit including an SPS RBSP may be set to have nuh_layer_id that is the same as nuh_layer_id of a PPS NAL unit referring to the SPS NAL unit. In CVS, all SPS NAL units having a particular sps_seq_parameter_set_id value may be set to have the same content. In the seq_parameter_set_rbsp( ) syntax of FIG. 33, sps_transform_skip_enable_flag, described above, and sps_bdpcm_enabled_flag, described later, are disclosed.

The syntax element sps_bdpcm_enabled_flag may indicate whether for an intra coding unit, intra_bdpcm_flag is provided in CU syntax. For example, a first value (e.g., 0) of the sps_bdpcm_enabled_flag may indicate that for an intra coding unit, the intra_bdpcm_flag is not provided in CU syntax. A second value (e.g., 1) of the sps_bdpcm_enabled_flag may indicate that for an intra coding unit, the intra_bdpcm_flag is provided in CU syntax. In the meantime, when the sps_bdpcm_enabled_flag is not provided, the value of the sps_bdpcm_enabled_flag may be set to the first value (e.g., 0).

FIG. 34 is a view showing an embodiment of syntax for signaling whether limitation on BDPCM is applied. In an embodiment, a predetermined limitation condition in the encoding/decoding process may be signaled using general_constraint_info( ) syntax. Using the syntax of FIG. 34, the syntax element no_bdpcm_constraint_flag indicating whether the value of the sps_bdpcm_enabled_flag described above needs to be set to 0 may be signaled. For example, a first value (e.g., 0) of the no_bdpcm_constraint_flag may indicate that such a limitation is not applied. When the value of the no_bdpcm_constraint_flag is a second value (e.g., 1), the value of the sps_bdpcm_enabled_flag may be forced to be a first value (e.g., 0).

FIG. 35 is a view showing an embodiment of coding unit( ) syntax for signaling information on BDPCM for an encoding unit. As shown in FIG. 35, the syntax elements intra_bdpcm_flag and intra_bdpcm_dir_flag may be signaled using coding_unit( ) syntax. The syntax element intra_bdpcm_flag may indicate whether BDPCM is applied to a current luma encoding block located at (x0, y0).

For example, a first value (e.g., 0) of the intra_bdpcm_flag may indicate that BDPCM is not applied to the current luma encoding block. A second value (e.g., 1) of the intra_bdpcm_flag may indicate that BDPCM is applied to the current luma encoding block. By indicating that BDPCM is applied, the intra_bdpcm_flag may indicate whether transformation is skipped and also whether an intra luma prediction mode is performed by the intra_bdpcm_dir_flag, which will be described later.

In the meantime, the value of the above-described variable BdpcmFlag[x][y] may be set to the value of the intra_bdpcm_flag, with respect to x=x0 . . . x0+cbWidth−1 and y=y0 . . . y0+cbHeight−1.

The syntax element intra_bdpcm_dir_flag may indicate a prediction direction of BDPCM. For example, a first value (e.g., 0) of the intra_bdpcm_dir_flag may indicate that the BDPCM prediction direction is a horizontal direction. A second value (e.g., 1) of intra_bdpcm_dir_flag may indicate that the BDPCM prediction direction is a vertical direction.

In the meantime, the value of the variable BdpcmDir[x][y] may be set to the value of the intra_bdpcm_dir_flag, with respect to x=x0 . . . x0+cbWidth−1 and y=y0 . . . y0+cbHeight−1.

Intra Prediction on Chroma Block

When intra prediction is performed on a current block, prediction on a luma component block (luma block) of the current block and prediction on a chroma component block (chroma block) may be performed. In this case, an intra prediction mode for the chroma block may be set separately from an intra prediction mode for the luma block.

For example, the intra prediction mode for the chroma block may be indicated on the basis of intra chroma prediction mode information. The intra chroma prediction mode information may be signaled in the form of a syntax element intra_chroma_pred_mode. For example, the intra chroma prediction mode information may indicate one of the following: a planar mode, a DC mode, a vertical mode, a horizontal mode, a derived mode (DM), and a cross-component linear model (CCLM) mode. Herein, the planar mode may refer to intra prediction mode 0, the DC mode may refer to intra prediction mode 1, the vertical mode may refer to intra prediction mode 26, and the horizontal mode may refer to intra prediction mode 10. The DM may also be referred to as a direct mode. The CCLM may also be referred to as a linear model (LM). The CCLM mode may include any one of the following: L_CCLM, T_CCLM, and LT_CCLM.

In the meantime, the DM and the CCLM are dependent intra prediction modes for predicting a chroma block by using information of a luma block. The DM may refer to a mode in which the same intra prediction mode as the intra prediction mode for the luma component is applied as the intra prediction mode for the chroma component. In addition, the CCLM may refer to an intra prediction mode in which in a process of generating a prediction block for a chroma block, reconstructed samples of a luma block are sub-sampled, and then samples derived by applying CCLM parameters α and β to the sub-sampled samples are used as prediction samples of the chroma block.

Overview of Cross-Component Linear Model (CCLM) Mode

As described above, the CCLM mode may be applied to a chroma block. The CCLM mode is the intra prediction mode in which the correlation between a luma block and a chroma block corresponding to the luma block is used, and is performed by deriving a linear model on the basis of neighboring samples of the luma block and neighboring samples of the chroma block. In addition, a prediction sample of the chroma block may be derived on the basis of the derived linear model and the reconstructed samples of the luma block.

Specifically, when the CCLM mode is applied to a current chroma block, parameters for a linear model may be derived on the basis of neighboring samples used for intra prediction of the current chroma block and neighboring samples used for intra prediction of a current luma block. For example, a linear model for a CCLM may be represented on the basis of the equation as below.

$$pred_c(i,j) = \alpha \cdot rec_L'(i,j) + \beta \quad \text{[Equation 20]}$$

Herein, $pred_c(i,j)$ may refer to a prediction sample of coordinates (i,j) of the current chroma block in the current CU. $rec_L'(i,j)$ may refer to a reconstructed sample of coordinates (i,j) of the current luma block in the CU. For example, the $rec_L'(i,j)$ may refer to a down-sampled reconstructed sample of the current luma block. Linear model coefficients α and β may be signaled, or may be derived from a neighboring sample.

Joint Coding of Residuals (Joint CbCr)

In an encoding/decoding process according to an embodiment, chroma residuals may be encoded/decoded together. This may be referred to as joint coding of residuals or as joint CbCr. Whether to apply (activate) a joint coding mode of CbCr may be signaled by a joint coding mode signaling flag tu_joint_cbcr_residual_flag that is signaled at the level of the transformation basis. In addition, a selected encoding mode may be derived by chroma CBFs. The flag tu_joint_cbcr_residual_flag may be present when a value of at least one chroma CBF for the transformation basis is 1. A chroma QP offset value indicates a difference between a general chroma QP offset value signaled for a regular chroma residual encoding mode and a chroma QP offset value for a CbCr joint coding mode. The chroma QP offset value may be signaled through a PPS or a slice header. This QP offset value may be used to drive a chroma QP value for blocks using a joint chroma residual encoding mode.

In the case in which Mode 2, which is a corresponding joint chroma encoding mode, in the table below is activated for the transformation basis, while quantization and decoding of the transformation basis are performed, a chroma QP offset thereof may be added to a target luma-derived chroma QP (applied luma-derived chroma QP).

Regarding other modes like Modes 1 and 3 in the table below, a chroma QP may be derived in such a manner that it is obtained for a general Cb or Cr block. Such a process of reconstructing chroma residuals (resCb and resCr) from a transformation block may be selected according to the table below. When the present mode is activated, one single joint chroma residual block (resJointC[x] [y] in the table below) is signaled, and a residual block resCb for a Cb and a residual block resCr for a Cr may be derived considering information such as tu_cbf_cb, tu_cbf_cr, and CSign that is a sign value disclosed in a slice header.

In the encoding apparatus, a joint chroma component may be derived as follows. According to a joint coding mode, resJointC{1, 2} may be generated according to the following order. In the case of Mode 2 (single residual with reconstruction Cb=C, Cr=CSign*C), a joint residual may be determined according to the equation below.

$$resJointC[x][y] = (resCb[x][y] + CSign * resCr[x][y])/2. \quad \text{[Equation 21]}$$

Alternatively, in the case of Mode 1 (single residual with reconstruction Cb=C, Cr=(CSign*C)/2), a joint residual may be determined according to the equation below.

$$resJointC[x][y] = (4*resCb[x][y] + 2*CSign*resCr[x][y])/5. \quad \text{[Equation 22]}$$

Alternatively, in the case of Mode 3 (single residual with reconstruction Cr=C, Cb=(CSign*C)/2), a joint residual may be determined according to the equation below.

$$resJointC[x][y] = (4*resCr[x][y] + 2*CSign*resCb[x][y])/5. \quad \text{[Equation 23]}$$

TABLE 2

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] =<br>( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] =<br>( CSign * resJointC[ x ][ y ] ) >> 1<br>resCr[ x ][ y ] = resJointC[ x ][ y ] | 3 |

The above table shows reconstruction of chroma residuals. CSign refers to a sign value+1 or −1 specified in a slice header. resJointC[ ][ ] refers to a transmitted residual. In the table, the modes refer to TuCResMode, which will be described later. The three joint chroma encoding modes in the table may be supported only for an I slice. For P and B slices, only mode 2 may be supported. Therefore, for P and B slices, the syntax element tu_joint_cbcr_residual_flag may be provided only when both chroma cbf (e.g., tu_cbf_cb and tu_cbf_cr) values are 1. In the meantime, in context modeling of tu_cbf_luma and tu_cbf_cb, a transformation depth may be removed.

Embodiment 1: QP Update Method Using ACT Op Offset

As described above, the update of the QP to apply ACT may be performed. The above-described update of the QP has several problems. For example, when the above-described method is used, it is impossible to set different ACT Qp offsets for individual color components. Further, the derived qP value may have a negative value. Accordingly, in the following embodiment, described is a method of applying clipping to a Qp value derived on the basis of an ACT QP offset value of a color component value.

In an embodiment, a quantization parameter qP may be derived as follows.

First, when the cIdx has a value of 0, the qP and the ACT Qp offset may be derived as shown in the equation below.

$$qP = Qp'_Y$$

$$ActQpOffset = 5 \quad \text{[Equation 24]}$$

Alternatively, when the TuCResMode[xTbY][yTbY] has a value of 2, the qP and the ACT Qp offset may be derived as shown in the equation below.

$$qP=Qp'_{CbCr}$$

ActQpOffset=5  [Equation 25]

Alternatively, when the cIdx has a value of 1, the qP and the ACT Qp offset may be derived as shown in the equation below.

$$qP=Qp'_{Cb}$$

ActQpOffset=3  [Equation 26]

The quantization parameter qP may be updated as follows.

When the transform_skip_flag[xTbY][yTbY][cIdx] has a value of 0, the qP may be derived as shown in the equation below.

$$qP=\text{Max}(0,qP-(\text{cu\_act\_enabled\_flag}[xTbY][yTbY]\text{?ActQpOffset: }0))$$  [Equation 27]

Alternatively, when the transform_skip_flag[xTbY][yTbY][cIdx] has a value of 1, the qP may be derived as shown in the equation below.

$$qP=\text{Max}(0,\text{Max}(\text{QpPrimeTsMin},qP)-(\text{cu\_act\_enabled\_flag}[xTbY][yTbY]\text{?ActQpOffset: }0))$$  [Equation 28]

In another embodiment, when the transform_skip_flag[xTbY][yTbY][cIdx] has a value of 1, the qP may be clipped using a value of the QpPrimeTsMin instead of 0 as shown in the equation below.

$$qP=\text{Max}(\text{QpPrimeTsMin},qP-(\text{cu\_act\_enabled\_flag}[xTbY][yTbY]\text{?ActQpOffset: }0))$$  [Equation 29]

In the meantime, in another embodiment, a quantization parameter qP may be derived as follows.

First, when the cIdx has a value of 0, the qP and the ACT Qp offset may be derived as shown in the equation below.

$$qP=Qp'_{Y}$$

ActQpOffset=5  [Equation 30]

Alternatively, when the TuCResMode[xTbY][yTbY] has a value of 2, the qP and the ACT Qp offset may be derived as shown in the equation below.

$$qP=Qp'_{CbCr}$$

ActQpOffset=5  [Equation 31]

Alternatively, when the cIdx has a value of 1, the qP and the ACT Qp offset may be derived as shown in the equation below.

$$qP=Qp'_{Cb}$$

ActQpOffset=5  [Equation 32]

Alternatively, when the cIdx has a value of 2, the qP and the ACT Qp offset may be derived as shown in the equation below.

$$qP=Qp'_{Cr}$$

ActQpOffset=3  [Equation 33]

The quantization parameter qP may be updated as follows.

When the transform_skip_flag[xTbY][yTbY][cIdx] has a value of 0, the qP may be derived as shown in the equation below.

$$qP=\text{Max}(0,qP-(\text{cu\_act\_enabled\_flag}[xTbY][yTbY]\text{?ActQpOffset: }0))$$  [Equation 34]

Alternatively, when the transform_skip_flag[xTbY][yTbY][cIdx] has a value of 1, the qP may be derived as shown in the equation below.

$$qP=\text{Max}(0,\text{Max}(\text{QpPrimeTsMin},qP)-(\text{cu\_act\_enabled\_flag}[xTbY][yTbY]\text{?ActQpOffset: }0))$$  [Equation 35]

In another embodiment, when the transform_skip_flag[xTbY][yTbY][cIdx] has a value of 1, the qP may be clipped using a value of the QpPrimeTsMin instead of 0 as shown in the equation below.

$$qP=\text{Max}(\text{QpPrimeTsMin},qP-(\text{cu\_act\_enabled\_flag}[xTbY][yTbY]\text{?ActQpOffset: }0))$$  [Equation 36]

In the meantime, in still another embodiment, a quantization parameter qP may be derived as follows.

First, when the cIdx has a value of 0, the qP and the ACT Qp offset may be derived as shown in the equation below.

$$qP=Qp'_{Y}$$

ActQpOffset=-5  [Equation 37]

Alternatively, when the TuCResMode[xTbY][yTbY] has a value of 2, the qP and the ACT Qp offset may be derived as shown in the equation below.

$$qP=Qp'_{CbCr}$$

ActQpOffset=-5  [Equation 38]

Alternatively, when the cIdx has a value of 1, the qP and the ACT Qp offset may be derived as shown in the equation below.

$$qP=Qp'_{Cb}$$

ActQpOffset=-5  [Equation 39]

Alternatively, when the cIdx has a value of 2, the qP and the ACT Qp offset may be derived as shown in the equation below.

$$qP=Qp'_{Cr}$$

ActQpOffset=-3  [Equation 40]

The quantization parameter qP may be updated as follows.

When the transform_skip_flag[xTbY][yTbY][cIdx] has a value of 0, the qP may be derived as shown in the equation below.

$$qP=\text{Max}(0,qP+(\text{cu\_act\_enabled\_flag}[xTbY][yTbY]\text{?ActQpOffset: }0))$$  [Equation 41]

Alternatively, when the transform_skip_flag[xTbY][yTbY][cIdx] has a value of 1, the qP may be derived as shown in the equation below.

$$qP=\text{Max}(0,\text{Max}(\text{QpPrimeTsMin},qP)+(\text{cu\_act\_enabled\_flag}[xTbY][yTbY]\text{?ActQpOffset: }0))$$  [Equation 42]

In the meantime, in another embodiment, when the transform_skip_flag[xTbY][yTbY][cIdx] has a value of 1, the qP may be clipped using a value of the QpPrimeTsMin instead of 0 as shown in the equation below.

$$qP=\text{Max}(\text{QpPrimeTsMin},qP+(\text{cu\_act\_enabled\_flag}[xTbY][yTbY]\text{?ActQpOffset: }0))$$  [Equation 43]

In the above description, Y, Cb, and Cr may denote three color components. For example, in ACT transformation, Y may correspond to CO. Cb may correspond to C1 or Cg. In addition, Cr may correspond to C2 or Co.

In addition, the ACTQpOffset values of −5, −5, and −3 for the three color components may be replaced with other values or other variables.

Embodiment 2: Signaling of OP Offset Adjustment for ACT

In the above-described embodiment, ACT QP offset adjustments are fixed to −5, −5, and −3 for Y, Cg, and Co components. In the present embodiment, in order to provide more flexibility to an ACT QP adjustment offset, a method of signaling an ACT QP offset will be described. The ACT QP offset may be signaled as a parameter in a PPS.

In an embodiment, qp_offset may be signaled according to a syntax table of FIG. 36. The syntax elements therefor are as follows.

A syntax element pps_act_qp_offsets_present_flag may indicate whether a syntax element related to an ACT QP offset is present in a PPS. For example, the pps_act_qp_offsets_present_flag may indicate whether syntax elements pps_act_y_qp_offset, pps_act_cb_qp_offset, and pps_act_cr_qp_offset, which will be described later, are signaled as a PPS.

For example, a first value (e.g., 0) of the pps_act_qp_offsets_present_flag may indicate that the pps_act_y_qp_offset, the pps_act_cb_qp_offset, and the pps_act_cr_qp_offset are not signaled through a PPS syntax table.

A second value (e.g., 1) of the pps_act_qp_offsets_present_flag may indicate that the pps_act_y_qp_offset, the pps_act_cb_qp_offset, and the pps_act_cr_qp_offset are signaled through a PPS syntax table.

When the pps_act_qp_offsets_present_flag is not provided from a bitstream, the pps_act_qp_offsets_present_flag may be derived as the first value (e.g., 0). For example, when a flag (e.g., sps_act_enabled_flag signaled in an SPS) indicating whether ACT is applied has a first value (e.g., 0) indicating that ACT is not applied, the pps_act_qp_offsets_present_flag may be forced to have a first value (e.g., 0).

When a value of a syntax element cu_act_enabled_flag is a second value (e.g., 1) indicating that ACT is applied for the current encoding basis, syntax elements pps_act_y_qp_offset_plus5, pps_act_cb_qp_offset_plus5s, and pps_act_cr_qp_offset_plus3 may be used to determine offsets applied to quantization parameter values qP for luma, Cb, and Cr components, respectively. When the values of the pps_act_y_qp_offset_plus5, the pps_act_cb_qp_offset_plus5, and the pps_act_cr_qp_offset_plus3 are not present in a bitstream, each value may be set to 0.

According to the syntax elements, a value of a variable PpsActQpOffsetY may be determined to be pps_act_y_qp_offset_plus5−5. A value of a variable PpsActQpOffsetCb may be determined to be pps_act_cb_qp_offset_plus5−5. In addition, a value of a variable PpsActQpOffsetCr may be determined to be pps_act_cb_qp_offset_plus3−3.

Herein, ACT is not orthonormal transformation, so 5, 5, and 3 may be applied as the constant offset values to be subtracted. In an embodiment, for bitstream matching, the values of the PpsActQpOffsetY, the PpsActQpOffsetCb, and the PpsActQpOffsetCr may have values ranging from −12 to 12. In addition, according to an embodiment, in addition to 5, 5, and 3, the Qp offset values may be replaced with other constant values and used.

In another embodiment, a QP may be adjusted using a more flexible ACT_QP offset. In the following embodiment, described is an example in which an ACT QP offset is signaled in a bitstream. Accordingly, the ACT QP offset may have a wider offset range. Therefore, the QP updated using the ACT QP offset is more likely to be out of an available range, so it is necessary to perform clipping on the upper and lower limits for the updated QP (more detailed embodiments will be described later in Embodiments 6 and 7)

Variables PpsActQpOffsetY, PpsActQpOffsetCb, PpsActQpOffsetCr, and PpsActQpOffsetCbCr indicating ACT QP offsets may be values derived using ACT QP offsets signaled through a bitstream, or preset constants. For bitstream conformance, the PpsActQpOffsetY, the PpsActQpOffsetCb, the PpsActQpOffsetCr, and the PpsActQpOffsetCbCr may have values ranging from −12 to +12.

When without using a fixed value, a value of a QP offset is signaled and its value has a value ranging from −12 to 12, it is necessary to clip the upper limit value of the derived QP value, in addition to clipping the lower limit value of the QP value derived to avoid an QP having a negative value.

To prevent the value of the qP from having a negative value, the lowest value of the qP may be forced to 0. Alternatively, the lowest value of the qP may be set to the value determined by the signaled syntax element. For example, to signal the lowest value of the qP when a transformation skip mode is applied, a syntax element QpPrimeTsMin indicating a value of the qP applied when the transformation skip mode is applied may be used. The maximum value of the qP may be limited to the available maximum value (e.g., 63) of the qP or the maximum available qP value determined according to a signaled syntax element.

In an embodiment according to the above, a quantization parameter qP may be derived as follows. First, when the cIdx has a value of 0, the qP and the ACT Qp offset may be derived as shown in the equation below.

$$qP = Qp'_Y$$

$$ActQpOffset = PpsActQpOffsetY \quad \text{[Equation 44]}$$

Alternatively, when the TuCResMode[xTbY][yTbY] has a value of 2, the qP and the ACT Qp offset may be derived as shown in the equation below.

$$qP = Qp'_{CbCr}$$

$$ActQpOffset = PpsActQpOffsetCbCr \quad \text{[Equation 45]}$$

Alternatively, when the cIdx has a value of 1, the qP and the ACT Qp offset may be derived as shown in the equation below.

$$qP = Qp'_{Cb}$$

$$ActQpOffset = PpsActQpOffsetCb \quad \text{[Equation 46]}$$

Alternatively, when the cIdx has a value of 2, the qP and the ACT Qp offset may be derived as shown in the equation below.

$$qP = Qp'_{Cr}$$

$$ActQpOffset = PpsActQpOffsetCr \quad \text{[Equation 47]}$$

In an embodiment, the quantization parameter qP may be updated as follows. When the transform_skip_flag[xTbY][yTbY][cIdx] has a value of 0, the qP may be derived as shown in the equation below.

$$qP = \text{Clip3}(0, 63, qP - (cu\_act\_enabled\_flag[xTbY][yTbY]?ActQpOffset: 0)) \quad \text{[Equation 48]}$$

Alternatively, when the transform_skip_flag[xTbY][yTbY][cIdx] has a value of 1, the qP may be derived as shown in the equation below.

qP=Clip3(0,63,Max(QpPrimeTsMin,qP)−(cu_act_en-
abled_flag[xTbY][yTbY]?ActQpOffset: 0)  [Equation 49]

In another embodiment, when the transform_skip_flag[xTbY][yTbY][cIdx] has a value of 1, the lowest value of the qP may be clipped using a value of the QpPrimeTsMin instead of 0 as shown in the equation below.

[Equation 50]

The quantization parameter qP may be updated as follows.

When the transform_skip_flag[xTbY][yTbY][cIdx] has a value of 0, the qP may be derived as shown in the equation below.

qP=Clip3(0,63,qP−(cu_act_enabled_flag[xTbY]
[yTbY]?ActQpOffset: 0))

Alternatively, when the transform_skip_flag[xTbY][yTbY][cIdx] has a value of 1, the qP may be derived as shown in the equation below.

qP=Clip3(QpPrimeTsMin,63,qP−cu_act_enabled_flag
[xTbY][yTbY]?ActQpOffset: 0)

In another embodiment, the quantization parameter qP may be updated as follows.

When the transform_skip_flag[xTbY][yTbY][cIdx] has a value of 0, the qP may be derived as shown in the equation below.

qP=Clip3(0,63+QpBdOffset,qP+(cu_act_enabled_flag
[xTbY][yTbY]?ActQpOffset: 0))  [Equation 51]

Alternatively, when the transform_skip_flag[xTbY][yTbY][cIdx] has a value of 1, the qP may be derived as shown in the equation below.

qP=Clip3(0,63+QpBdOffset,Max(QpPrimeTsMin,
qP)+(cu_act_enabled_flag[xTbY][yTbY]
?ActQpOffset: 0)  [Equation 52]

In another embodiment, when the transform_skip_flag[xTbY][yTbY][cIdx] has a value of 1, the lowest value of the qP may be clipped using a value of the QpPrimeTsMin instead of 0 as shown in the equation below.

[Equation 53]

The quantization parameter qP may be updated as follows.

When the transform_skip_flag[xTbY][yTbY][cIdx] has a value of 0, the qP may be derived as shown in the equation below.

qP=Clip3(0,63+QpBdOffset,qP+(cu_act_enabled_flag
[xTbY][yTbY]?ActQpOffset: 0))

Alternatively, when the transform_skip_flag[xTbY][yTbY][cIdx] has a value of 1, the qP may be derived as shown in the equation below.

qP=Clip3(QpPrimeTsMin,63+QpBdOffset,qP+
cu_act_enabled_flag[xTbY][yTbY]?ActQpOff-
set: 0)

Embodiment 3: Method to Allow ACT when Chroma BDPCM is Performed

In an embodiment, when BDPCM is applied to a luma component block, ACT may be applied to encode/decode the block. However, when BDPCM is applied to a chroma component block, ACT is limited not to be applied to encode/decode the block.

In the meantime, even when BDPCM is applied to a chroma component block, ACT is applied to the block, thereby improving encoding efficiency. FIG. 37 shows an embodiment of a syntax configuration for applying ACT even when BDPCM is applied to a chroma component block. As shown in FIG. 37, by removing the condition for obtaining a BDPCM syntax element for a chroma component according to the value of the cu_act_enabled_flag indicating whether ACT is applied to the current encoding basis, the BDPCM syntax element therefor may be obtained regardless of whether ACT is applied to a chroma component block, and BDCPM encoding may be performed accordingly.

Embodiment 4: Method of Applying ACT Even when Encoding/Decoding is Performed with CCLM Both CCLM and ACT are intended to remove unnecessary overlap between components. There are some overlapping parts between CCLM and ACT, but even after applying all of these, it is impossible to completely remove overlap between components. Therefore, overlap between components may be more removed by applying CCLM and ACT together.

The following embodiment describes an embodiment in which CCLM and ACT are applied together. In performing decoding, the decoding apparatus may apply CCLM first, and apply ACT. When ACT is applied to both BDPCM and CCLM for a chroma component, a syntax table for signaling this may be modified as shown in FIG. 38. Accordingly, as shown in the syntax table of FIG. 38, among the limitations for signaling a syntax element related to intra_bdpcm_chroma and cclm, if(!cu_act_enabled_flag) for signaling a syntax element depending on whether ACT is not applied may be removed from the syntax table.

Embodiment 5: Method of Applying Flexible ACT Op Including Joint CbCr

When an ACT mode is applied, a prediction residual may be transformed from one color space (e.g., GBR or YCbCr) into a YCgCo color space. In addition, residuals of the transformation basis may be encoded in the YCgCo color space. As an embodiment of ACT core transformation (transformation kernel) used for color space transformation, the following transformation kernel as described above may be used.

$$\begin{bmatrix} C'_0 \\ C'_1 \\ C'_2 \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4 \quad \text{[Equation 54]}$$

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C'_0 \\ C'_1 \\ C'_2 \end{bmatrix} \quad \text{[Equation 55]}$$

As described in the equations above, C0', C1', and C2' (herein, C0'=Y, C1'=Cg, C2'=Co) transformations are not normalized. For example, the L2 norm does not have a value of 1. For example, the L2 norm of transformation for an individual component may have a value of about 0.6 for C0' and C1', and may have a value of about 0.7 for C2'. Herein, the L2 norm is a value obtained as the square root of the sum of the squares of respective coefficients. For example, C0'=2/4*C0+1/4*C1+1/4*C2 may be calculated. Therefore, the norm of C0' may be calculated as the square root of (2/4*2/4+1/4*1/4+1/4*1/4). Therefore, this may be calculated as the square root of 6/16, and may be calculated as having a value of about 0.6.

When normalized transformation is not applied, the dynamic range of the individual component is irregular. In addition, this causes a decrease in encoding performance of a general video compression system.

In order to compensate for the dynamic range of a residual signal, a QP offset value for compensating a dynamic range change for an individual transformation component is transmitted, so that QP adjustment may be performed. For example, this embodiment may be applied to a general QP adjustment control method for ACT transformation as well as joint CbCr.

Individual color components are not encoded independently, but together, so that the method described above in Embodiment 3 for joint CbCr may cause a dynamic range change between the individual color components.

In encoding and decoding methods according to an embodiment, ACT QP offset adjustment may be fixed to −5, which may be equally applied to Y, Cg, and Co.

In an embodiment, in order to provide flexible Qp control for individual components and jointCbCr, it may be allowed to use different ACT Qp offsets for Y, Cb, Cr, and/or joint CbCr. The ACT Qp offset values may be determined on the basis of a component index, and/or joint CbCr, and/or a joint CbCr mode.

In order to indicate the ACT Qp offsets, ppsActQpOffsetY, ppsActQpOffsetCb, and ppsActQpOffsetCr may be used. In addition, ppsActQpOffsetCbCr may be used for the ACT QP offset of joint CbCr mode 2 having CBF in which all Cb and Cr components have non-zero values. These values (e.g., ppsActQpOffsetY, ppsActQpOffsetCb, ppsActQpOffsetCr, and ppsActQpOffsetCbCr) may be predetermined to be predetermined values, or signaled through a bitstream. The ACT QP offset of the joint CbCr mode may be set in another method or to another value.

In an embodiment, the ACT Qp offsets of −5, −5, and −3 may be used for Y, Cb, and Cr, and the ACT Qp offset of −4 may be used for joint CbCr.

In another embodiment, the ACT Qp offsets of −5, −4, and −3 may be used for Y, Cb, and Cr, and the ACT Qp offset of −3 may be used for the joint CbCr mode in which the value of tu cbf cb is not 0.

In still another embodiment, the ACT QP offset of joint CbCr mode 2 may have its own offset value. For another joint CbCr mode, the ACT QP offset may use the offset of a corresponding component. For example, a quantization parameter qP may be determined as follows. First, when the cIdx has a value of 0, the qP and the ACT Qp offset may be derived as shown in the equation below.

$$qP=Qp'_Y$$

ActQpOffset=ppsActQpOffsetY  [Equation 56]

Alternatively, when the TuCResMode[xTbY][yTbY] has a value of 2, the qP and the ACT Qp offset may be derived as shown in the equation below.

$$qP=Qp'_{CbCr}$$

ActQpOffset=ppsActQpOffsetCbCr  [Equation 57]

Alternatively, when the cIdx has a value of 1, the qP and the ACT Qp offset may be derived as shown in the equation below.

$$qP=Qp'_{Cb}$$

ActQpOffset=ppsActQpOffsetCb  [Equation 58]

Alternatively, when the cIdx has a value of 2, the qP and the ACT Qp offset may be derived as shown in the equation below.

$$qP=Qp'_{Cr}$$

ActQpOffset=ppsActQpOffsetCr  [Equation 59]

In an embodiment, the quantization parameter qP may be updated as follows.

When the transform_skip_flag[xTbY][yTbY][cIdx] has a value of 0, the qP may be derived as shown in the equation below.

$$qP=Clip3(0,63+QpBdOffset,qP+(cu\_act\_enabled\_flag[xTbY][yTbY]?ActQpOffset: 0))$$  [Equation 60]

Alternatively, when the transform_skip_flag[xTbY][yTbY][cIdx] has a value of 1, the qP may be derived as shown in the equation below.

$$qP=Clip3(QpPrimeTsMin,63+QpBdOffset,qP+cu\_act\_enabled\_flag[xTbY][yTbY]?ActQpOffset: 0)$$  [Equation 61]

In another embodiment, with respect to a joint CbCr mode (e.g., in the case of Modes 1 and 2) with tu_cbf_cb!=0, an offset for joint CbCr may be determined using the ppsActQpOffsetCb. Alternatively, with respect to a joint CbCr mode (e.g., in the case of Mode 3) with tu_cbf_cb==0, an offset for joint CbCr may be determined using the ppsActQpOffsetCr. For example, the above-described embodiment may be modified and applied as follows.

The quantization parameter qP may be updated as follows. First, when the cIdx has a value of 0, the qP and the ACT Qp offset may be derived as shown in the equation below.

$$qP=Qp'_Y$$

ActQpOffset=ppsActQpOffsetY  [Equation 62]

Alternatively, when the TuCResMode[xTbY][yTbY] has a value of 2, the qP may be derived as shown in the equation below.

$$qP=Qp'_{CbCr}$$  [Equation 63]

Alternatively, when the cIdx has a value of 1, the qP and the ACT Qp offset may be derived as shown in the equation below.

$$qP=Qp'_{Cb}$$

ActQpOffset=ppsActQpOffsetCb  [Equation 64]

Alternatively, when the cIdx has a value of 2, the qP and the ACT Qp offset may be derived as shown in the equation below.

$$qP=Qp'_{Cr}$$

ActQpOffset=ppsActQpOffsetCr  [Equation 65]

When the cIdx does not have a value of 0 and the TuCResMode[xTbY][yTbY] does not have a value of 0, the ACT Qp offset for the joint CbCr mode may be determined according to the pseudocode below.

if(TuCResMode[xTbY][yTbY] is equal to 1 or 2)

ActQpOffset=ppsActQpOffsetCb;

else

ActQpOffset=ppsActQpOffsetCr;      [Equation 66]

In an embodiment, the quantization parameter qP may be updated as follows. When the transform_skip_flag[xTbY][yTbY][cIdx] has a value of 0, the qP may be derived as shown in the equation below.

$$qP=\text{Clip3}(0,63+\text{QpBdOffset},qP+(\text{cu\_act\_enabled\_flag}[xTbY][yTbY]?\text{ActQpOffset}: 0))$$ [Equation 67]

Alternatively, when the transform_skip_flag[xTbY][yTbY][cIdx] has a value of 1, the qP may be derived as shown in the equation below.

$$qP=\text{Clip3}(\text{QpPrimeTsMin},63+\text{QpBdOffset},qP+\text{cu\_act\_enabled\_flag}[xTbY][yTbY]?\text{ActQpOffset}: 0)$$ [Equation 68]

In another embodiment, regardless of the joint CbCr mode, ppsActQpOffsetY is used when the component index is Y, ppsActQpOffsetCb is used when the component index is Cb, and ppsActQpOffsetCr is used when the component index is Cr, whereby the qP may be derived. For example, the quantization parameter qP may be derived as follows.

First, when the cIdx has a value of 0, the qP and the ACT Qp offset may be derived as shown in the equation below.

$$qP=Qp'_Y$$ [Equation 69]

ActQpOffset=ppsActQpOffset$Y$

Alternatively, when the TuCResMode[xTbY][yTbY] has a value of 2, the qP and the ACT Qp offset may be derived as shown in the equation below.

$$qP=Qp'_{CbCr}$$ [Equation 70]

ActQpOffset=(cIdx==1)?ppsActQpOffsetCb:ppsActQpOffsetCr

Alternatively, when the cIdx has a value of 1, the qP and the ACT Qp offset may be derived as shown in the equation below.

$$qP=Qp'_{Cb}$$

ActQpOffset=ppsActQpOffsetCb      [Equation 71]

Alternatively, when the cIdx has a value of 2, the qP and the ACT Qp offset may be derived as shown in the equation below.

$$qP=Qp'_{Cr}$$

ActQpOffset=ppsActQpOffsetCr      [Equation 72]

The quantization parameter qP may be updated as follows.

When the transform_skip_flag[xTbY][yTbY][cIdx] has a value of 0, the qP may be derived as shown in the equation below.

$$qP=\text{Clip3}(0,63+\text{QpBdOffset},qP+(\text{cu\_act\_enabled\_flag}[xTbY][yTbY]?\text{ActQpOffset}: 0))$$ [Equation 73]

Alternatively, when the transform_skip_flag[xTbY][yTbY][cIdx] has a value of 1, the qP may be derived as shown in the equation below.

$$qP=\text{Clip3}(\text{QpPrimeTsMin},63+\text{QpBdOffset},qP+\text{cu\_act\_enabled\_flag}[xTbY][yTbY]?\text{ActQpOffset}: 0)$$ [Equation 74]

Embodiment 6: Method of Signaling ACT Op Offset Including Joint CbCr

Hereinafter, described is an example in which an ACT QP offset is signaled through a bitstream to provide more flexibility. ACT QP offsets may be signaled through a SPS, a PPS, a picture header, a slice header, or header sets of other types. An ACT Qp offset of joint CbCr may be signaled separately, or may be derived from ACT QP offsets for Y, Cb, and Cr.

Without loss of generality, FIG. 39 shows an example of a syntax table in which an ACT Qp offset is signaled in a PPS. As in the embodiment of FIG. 39, one ACT Qp offset may be signaled for joint CbCr. The syntax elements indicated in the syntax table of FIG. 39 will be described.

A syntax element pps_act_qp_offsets_present_flag may indicate whether a syntax element related to an ACT QP offset is present in a PPS. For example, the pps_act_qp_offsets_present_flag may indicate whether syntax elements pps_act_y_qp_offset_plusX1, pps_act_cb_qp_offset_plusX2, pps_act_cr_qp_offset_plusX3, and pps_act_cbcr_qp_offset_plusX4, which will be described later, are signaled as a PPS.

For example, a first value (e.g., 0) of the pps_act_qp_offsets_present_flag may indicate that the pps_act_y_qp_offset_plusX1, the pps_act_cb_qp_offset_plusX2, the pps_act_cr_qp_offset_plusX3, and the pps_act_cbcr_qp_offset_plusX4 are not signaled through a PPS syntax table.

A second value (e.g., 1) of the pps_act_qp_offsets_present_flag may indicate that the pps_act_y_qp_offset_plusX1, the pps_act_cb_qp_offset_plusX2, the pps_act_cr_qp_offset_plusX3, and the pps_act_cbcr_qp_offset_plusX4 are signaled through a PPS syntax table.

When the pps_act_qp_offsets_present_flag is not provided from a bitstream, the pps_act_qp_offsets_present_flag may be derived as the first value (e.g., 0). For example, when a flag (e.g., sps_act_enabled_flag signaled in an SPS) indicating whether ACT is applied has a first value (e.g., 0) indicating that ACT is not applied, the pps_act_qp_offsets_present_flag may be forced to have a first value (e.g., 0).

When a value of a syntax element cu_act_enabled_flag is a second value (e.g., 1) indicating that ACT is applied for the current encoding basis, the syntax elements pps_act_y_qp_offset_plusX1, pps_act_cb_qp_offset_plusX2, pps_act_cr_qp_offset_plusX3, and pps_act_cbcr_qp_offset_plusX4 may be used to determine offsets applied to quantization parameter values qP for luma, Cb, Cr components, and a joint CbCr component, respectively. When the values of the pps_act_y_qp_offset_plusX1, the pps_act_cb_qp_offset_plusX2, the pps_act_cr_qp_offset_plusX3, and the pps_act_cbcr_qp_offset_plusX4 are not present in a bitstream, each value may be set to 0.

According to the syntax elements, values of variables PpsActQpOffsetY, PpsActQpOffsetCb, PpsActQpOffsetCr, and PpsActQpOffsetCbCr may be determined as shown in the equation below.

PpsActQpOffset$Y$=pps_act_$y$_qp_offset_plus$X$1−$X$1

PpsActQpOffsetCb=pps_act_cb_qp_offset_plus$X$2−$X$2

PpsActQpOffsetCr=pps_act_cr_qp_offset_plus$X3$–$X3$

PpsActQpOffsetCbCr=pps_act_cbcr_qp_offset_plus$X4$–$X4$ [Equation 75]

Herein, X1, X2, X3, and X4 may indicate predetermined constant values. These may be the same values or different values, or only some may have the same value.

In an embodiment, for bitstream matching, the values of the PpsActQpOffsetY, the PpsActQpOffsetCb, the PpsActQpOffsetCr, and the PpsActQpOffsetCbCr may be limited to have values ranging from −12 to 12.

According to determination of the variables, a quantization parameter qP may be determined as follows. First, when the cIdx has a value of 0, the qP and the ACT Qp offset may be derived as shown in the equation below.

qP=Qp'$_Y$

ActQpOffset=PpsActQpOffset$Y$ [Equation 76]

Alternatively, when the TuCResMode[xTbY][yTbY] has a value of 2, the qP and the ACT Qp offset may be derived as shown in the equation below.

qP=Qp'$_{CbCr}$

ActQpOffset=PpsActQpOffsetCbCr [Equation 77]

Alternatively, when the cIdx has a value of 1, the qP and the ACT Qp offset may be derived as shown in the equation below.

qP=Qp'$_{Cb}$

ActQpOffset=PpsActQpOffsetCb [Equation 78]

Alternatively, when the cIdx has a value of 2, the qP and the ACT Qp offset may be derived as shown in the equation below.

qP=Qp'$_{Cr}$

ActQpOffset=PpsActQpOffsetCr [Equation 79]

In another embodiment of signaling an ACT Qp offset, a plurality of ACT QP offsets may be signaled for different joint CbCr modes identified as mode A and mode B.

The joint CbCr mode A may refer to a jointCbCr mode having tu_cbf_cb having a non-zero value, such as Mode 1 and Mode 2 of Table 2 described above. The joint CbCr mode B may refer to a jointCbCrmode having tu_cbf_cb having a value of 0, such as Mode 3 of Table 2 described above. The syntax table changed accordingly is shown in FIG. 40. The syntax elements indicated in the syntax table of FIG. 40 will be described.

When a value of a syntax element cu_act_enabled_flag is a second value (e.g., 1) indicating that ACT is applied for the current encoding basis, syntax elements pps_act_y_qp_offset_plusX1, pps_act_cb_qp_offset_plusX2, pps_act_cr_qp_offset_plusX3, pps_act_cbcr_qp_offset_modeA_plusX4, and pps_act_cbcr_qp_offset_modeB_plusX5 may be used to determine offsets applied to quantization parameter values qP for luma, Cb, Cr components, and a joint CbCr component, respectively. When the values of the pps_act_y_qp_offset_plusX1, the pps_act_cb_qp_offset_plusX2, the pps_act_cr_qp_offset_plusX3, the pps_act_cbcr_qp_offset_modeA_plusX4, and the pps_act_cbcr_qp_offset_modeB_plusX5 are not present in a bitstream, each value may be set to 0.

According to the syntax elements, values of variables PpsActQpOffsetY, PpsActQpOffsetCb, PpsActQpOffsetCr, PpsActQpOffsetCbCrModeA, and PpsActQpOffsetCbCrModeB may be determined as shown in the equation below.

PpsActQpOffset$Y$=pps_act_y_qp_offset_plus$X1$–$X1$

PpsActQpOffsetCb=pps_act_cb_qp_offset_plus$X2$–$X2$

PpsActQpOffsetCr=pps_act_cr_qp_offset_plus$X3$–$X3$

PpsActQpOffsetCbCrModeA=pps_act_cbcr_qp_offset_mode$A$_plus$X4$–$X4$

PpsActQpOffsetCbCrModeB=pps_act_cbcr_qp_offset_mode$B$_plus$X5$–$X5$ [Equation 80]

Herein, X1, X2, X3, X4, and X5 may indicate predetermined constant values. These may be the same values or different values, or only some may have the same value. In an embodiment, for bitstream matching, the values of the PpsActQpOffsetY, the PpsActQpOffsetCb, the PpsActQpOffsetCr, the PpsActQpOffsetCbCrModeA, and the PpsActQpOffsetCbCrModeB may be limited to have values ranging from −12 to 12.

According to determination of the variables, a quantization parameter qP may be determined as follows. First, when the cIdx has a value of 0, the qP and the ACT Qp offset may be derived as shown in the equation below.

qP=Qp'$_Y$

ActQpOffset=PpsActQpOffset$Y$ [Equation 81]

Alternatively, when the TuCResMode[xTbY][yTbY] has a value of 2, the qP may be derived as shown in the equation below.

qP=Qp'$_{CbCr}$ [Equation 82]

Alternatively, when the cIdx has a value of 1, the qP and the ACT Qp offset may be derived as shown in the equation below.

qP=Qp'$_{Cb}$

ActQpOffset=PpsActQpOffsetCb [Equation 83]

Alternatively, when the cIdx has a value of 2, the qP and the ACT Qp offset may be derived as shown in the equation below.

qP=Qp'$_{Cr}$

ActQpOffset=PpsActQpOffsetCr [Equation 84]

In addition, when the cIdx does not have a value of 0 and the TuCResMode[xTbY][yTbY] does not have a value of 0, the ACT Qp offset may be derived as shown in the equation below.

ActQpOffset=(tu_cbf_cb[xTbY][yTbY])?PpsActQpOffsetCbCrModeA:PpsActQpOffsetCbCrModeB [Equation 85]

In the meantime, in another embodiment, when the TuCResMode[xTbY][yTbY] has a value of 2, the ActQpOffset may be derived as shown in the equation below.

ActQpOffset=(tu_cbf_cb[xTbY][yTbY])?(PPsQpOffsetCbCrModeA+slice_act_CbCr_qp_offset_Mode$A$):(PPsQpOffsetCbCrMode$B$+slice_act_CbCr_qp_offset_Mode$B$) [Equation 86]

In another embodiment of signaling an ACT Qp offset, only ACT QP offsets for Y, Cb, and Cr may be signaled as in the syntax table of FIG. 41. An ACT QP offset for joint CbCr may be derived from PpsActQpOffsetY, PpsActQpOffsetCb, and/or PpsActQpOffsetCr.

In an embodiment, an ACT Qp offset for CbCr may be set to a value of PpsActQpOffsetCb. In another embodiment, an ACT Qp offset for CbCr may be set to the same value as PpsActQpOffsetCb in the case of the joint CbCr mode in which the tu_cbf_cb has a non-zero value, or may be set to the same value as PpsActQpOffsetCr in the case of the joint CbCr mode in which the tu_cbf_cb has a value of 0. Alternatively, it may be set vice versa.

FIG. 41 is a view showing another embodiment of a syntax table in which an ACT Qp offset is signaled in a PPS. According to determination of the syntax elements of FIG. 41, a quantization parameter qP may be determined as follows. First, when the cIdx has a value of 0, the qP and the ACT Qp offset may be derived as shown in the equation below.

$$qP=Qp'_Y$$

$$ActQpOffset=PpsActQpOffsetY \qquad \text{[Equation 87]}$$

Alternatively, when the TuCResMode[xTbY][yTbY] has a value of 2, the qP and the ACT Qp offset may be derived as shown in the equation below.

$$qP=Qp'_{CbCr}$$

$$ActQpOffset=(cIdx==1)?PpsActQpOffsetCb:PpsActQpOffsetCr \qquad \text{[Equation 88]}$$

In the meantime, in another embodiment, a value of an ActQpOffset may be determined as follows.

$$ActQpOffset=(tu\_cbf\_cb[xTbY][yTbY])?PpsActQpOffsetCb:PpsActQpOffsetCr \qquad \text{[Equation 89]}$$

Alternatively, when the cIdx has a value of 1, the qP and the ACT Qp offset may be derived as shown in the equation below.

$$qP=Qp'_{Cb}$$

$$ActQpOffset=PpsActQpOffsetCb \qquad \text{[Equation 90]}$$

Alternatively, when the cIdx has a value of 2, the qP and the ACT Qp offset may be derived as shown in the equation below.

$$qP=Qp'_{Cr}$$

$$ActQpOffset=PpsActQpOffsetCr \qquad \text{[Equation 91]}$$

Embodiment 7: Signaling of ACT Op Offset at Multiple Levels

In an embodiment, an ACT QP offset may be signaled at a plurality of levels. In addition to the signaling of an ACT QP offset at one level, such as a PPS, as in Embodiment 6 above, an ACT QP offset may be signaled at a lower level (e.g., a slice header, a picture header, or headers of other types suitable for Qp control).

Hereinafter, two embodiments will be described. FIGS. 42 and 43 show examples in which an ACT QP offset is signaled through a slice header and a picture header. In this way, an ACT QP offset may be signaled at multiple levels.

Hereinafter, the syntax elements shown in FIGS. 42 and 43 will be described. A syntax element pps_slice_act_qp_offsets_present_flag may indicate whether syntax elements slice_act_y_qp_offset, slice_act_cb_qp_offset, slice_act_cr_qp_offset, and slice_act_cbcr_qp_offset, which will be described later, are present in a slice header.

For example, a first value (e.g., 0) of the pps_slice_act_qp_offsets_present_flag may indicate that the slice_act_y_qp_offset, the slice_act_cb_qp_offset, the slice_act_cr_qp_offset, and the slice_act_cbcr_qp_offset are not present in a slice header.

For example, a second value (e.g., 1) of the pps_slice_act_qp_offsets_present_flag may indicate that the slice_act_y_qp_offset, the slice_act_cb_qp_offset, the slice_act_cr_qp_offset, and the slice_act_cbcr_qp_offset are present in a slice header.

The syntax elements slice_act_y_qp_offset, slice_act_cb_qp_offset, slice_act_cr_qp_offset, and slice_act_cbcr_qp_offset may indicate offsets for quantization parameter values qP for the luma, Cb, Cr components, and a joint CbCr component, respectively. The values of the slice_act_y_qp_offset, the slice_act_cb_qp_offset, the slice_act_cr_qp_offset, and the slice_act_cbcr_qp_offset may be limited to have values ranging from −12 to 12. When the values of the slice_act_y_qp_offset, the slice_act_cb_qp_offset, the slice_act_cr_qp_offset, and the slice_act_cbcr_qp_offset are not present in a bitstream, each value may be set to 0. Values of PpsActQpOffsetY+slice_act_y_qp_offset, PpsActQpOffsetCb+slice_act_cb_qp_offset, PpsActQpOffsetCr+slice_act_cr_qp_offset, and PpsActQpOffsetCbCr+slice_act_cbcr_qp_offset may be limited to also have values ranging from −12 to 12.

Various modified embodiments of signaling an ACT QP offset for joint CbCr at a PPS level may be applied. For example, one QP offset may be signaled for joint CbCr, a plurality of ACT Qp offsets may be signaled for joint CbCr of different modes, or without signaling an ACT Qp offset for joint CbCr, a method of deriving this by using ACTQpOffsets for Y, Cb, and Cr and/or a mode of jointCbCr may be applied when signaling through a slice header is performed.

Two modified embodiments are shown in FIGS. 44 and 45. FIG. 44 shows an embodiment in which an ACT Qp offset is signaled in a slice header. FIG. 45 shows another embodiment in which an ACT Qp offset is signaled in a slice header. In FIG. 45, only ACT Qp offsets for Y, Cb, and Cr may be signaled, and an ACT QP offset at a slice level for joint CbCr may be derived from slice_act_y_qp_offset, slice_act_cb_qp_offset, and/or slice_act_cr_qp_offset. This may be determined on the basis of a mode type of jointCbCr. In an embodiment, a slice-level ACT Qp offset for CbCr may be set to the same value as the slice_act_cb_qp_offset. In another embodiment, in the case of the joint CbCr mode having the tu_cbf_cb having a non-zero value, an ACT Qp offset at a slice level for joint CbCr may be set to the same value as the slice_act_cb_qp_offset. In addition, in the case of the jointCbCr mode having the tu_cbf_cb having a value of 0, an ACT Qp offset at a slice level for joint CbCr may be set to the same value as the slice_act_cr_qp_offset.

In the meantime, in another embodiment, a syntax element may be signaled in a slice header or a picture header. To realize this, encoding/decoding may be performed as follows.

A flag pps_picture_slice_act_qp_offsets_present_flag indicating whether an ACT Qp offset is present in a picture header or a slice header may be signaled in a PPS.

When ACT is applicable and the value of the pps_picture_slice_act_qp_offsets_present_flag is a second value (e.g., 1), a flag pic_act_qp_offsets_present_flag indicating whether an ACT Qp offset is present in a picture header is signaled in a picture header. Herein, a second value (e.g., 1) of the pic_act_qp_offsets_present_flag may indicate that ACT Qp offsets for all slices of a picture corresponding to the picture header are provided in the picture header.

A first value (e.g., 0) of the pic_act_qp_offsets_present_flag may indicate that ACT Qp offsets for all slices of a picture corresponding to the picture header are not provided in the picture header. For example, when ACT is applicable and the value of the pps_picture_slice_act_qp_offsets_present_flag is the second value (e.g., 1) and the value of the pic_act_qp_offsets_present_flag is the first value (e.g., 0), an ACT Qp offset for a slice may be provided in a slice header.

FIG. 46 is a view showing a syntax table of a PPS in which pps_pic_slice_act_qp_offsets_present_flag is signaled. The syntax element pps_pic_slice_act_qp_offsets_present_flag may indicate whether an ACT Qp offset is provided in a picture header and/or a slice header. For example, a first value (e.g., 0) of the pps_pic_slice_act_qp_offsets_present_flag may indicate that an ACT Qp offset is not provided in a picture header and a slice header. A second value (e.g., 1) of the pps_pic_slice_act_qp_offsets_present_flag may indicate that an ACT Qp offset is provided in a picture header or a slice header. When the pps_pic_slice_act_qp_offsets_present_flag is not provided in a bitstream, the value of the pps_pic_slice_act_qp_offsets_present_flag may be determined to be the first value (e.g., 0).

FIG. 47 is a view showing a syntax table of a picture header for signaling an ACT Qp offset. A syntax element pic_act_qp_offsets_present_flag may indicate whether an ACT Qp offset is provided in a picture header. A first value (e.g., 0) of the pic_act_qp_offsets_present_flag may indicate that an ACT Qp offset is not provided in a picture header, but in a slice header. A second value (e.g., 1) of the pic_act_qp_offsets_present_flag may indicate that an ACT Qp offset is provided in a picture header. When the value of the pic_act_qp_offsets_present_flag is not provided in a bitstream, the value may be determined to be 0.

FIG. 48 is a view showing a syntax table of a slice header for signaling an ACT Qp offset. In the syntax table of FIG. 48, syntax elements slice_act_y_qp_offset, slice_act_cb_qp_offset, slice_act_cr_qp_offset, and slice_act_cbcr_qp_offset may indicate offsets for quantization parameter values qP for luma, Cb, and Cr components. The values of the slice_act_y_qp_offset, the slice_act_cb_qp_offset, the slice_act_cr_qp_offset, and the slice_act_cbcr_qp_offset may have values ranging from −12 to 12. In addition, values of PpsActQpOffsetY+slice_act_y_qp_offset, PpsActQpOffsetCb+slice_act_cb_qp_offset, and PpsActQpOffsetCr+slice_act_cr_qp_offset may be limited to also have a range of values from −12 to 12.

In the meantime, in the case in which the values of the slice_act_y_qp_offset, the slice_act_cb_qp_offset, the slice_act_cr_qp_offset, and the slice_act_cbcr_qp_offset are not provided in a bitstream, when the value of the pps_pic_slice_act_qp_offsets_present_flag is the first value (e.g., 0), the values of the slice_act_y_qp_offset, the slice_act_cb_qp_offset, and the slice_act_cr_qp_offset may be determined to be 0. Alternatively, when the value of the pps_pic_slice_act_qp_offsets_present_flag is the second value (e.g., 1), the values of the slice_act_y_qp_offset, the slice_act_cb_qp_offset, and the slice_act_cr_qp_offset may be determined to be the same values as pps_act_y_qp_offset, pps_act_cb_qp_offset, and pps_act_cr_qp_offset, respectively.

In the meantime, when an ACT Qp offset is present in both a slice header and a picture header, a final offset value used to derive a qP value may be determined to be the value that is obtained by adding an offset value signaled in a PPS and an offset value signaled in the slice header or the picture header.

More specifically, in an embodiment, a quantization parameter qP may be determined as follows. First, when the cIdx has a value of 0, the qP and the ACT Qp offset may be derived as shown in the equation below.

$$qP = Qp'_Y$$

$$ActQpOffset = PPsQpOffsetY + slice\_act\_y\_qp\_offset \quad \text{[Equation 92]}$$

Alternatively, when the TuCResMode[xTbY][yTbY] has a value of 2, the qP and the ACT Qp offset may be derived as shown in the equation below.

$$qP = Qp'_{CbCr}$$

$$ActQpOffset = PPsQpOffsetCbCr + slice\_act\_CbCr\_qp\_offset \quad \text{[Equation 93]}$$

Alternatively, when the cIdx has a value of 1, the qP and the ACT Qp offset may be derived as shown in the equation below.

$$qP = Qp'_{Cb}$$

$$ActQpOffset = PpsActQpOffsetCb + slice\_act\_Cb\_qp\_offset \quad \text{[Equation 94]}$$

Alternatively, when the cIdx has a value of 2, the qP and the ACT Qp offset may be derived as shown in the equation below.

$$qP = Qp'_{Cr} \quad \text{[Equation 95]}$$

$$ActQpOffset = PpsActQpOffsetCr + slice\_act\_Cr\_qp\_offset$$

In another embodiment, when multiple ACT Qp offsets for joint CbCr are signaled, ActQpOffset for joint CbCr may be determined as follows.

First, when the cIdx has a value of 0, the qP and the ACT Qp offset may be derived as shown in the equation below.

$$qP = Qp'_Y$$

$$ActQpOffset = PPsQpOffsetY + slice\_act\_y\_qp\_offset \quad \text{[Equation 96]}$$

Alternatively, when the TuCResMode[xTbY][yTbY] has a value of 2, the qP may be derived as shown in the equation below.

$$qP = Qp'_{CbCr} \quad \text{[Equation 97]}$$

Alternatively, when the cIdx has a value of 1, the qP and the ACT Qp offset may be derived as shown in the equation below.

$$qP = Qp'_{Cb}$$

$$ActQpOffset = PpsActQpOffsetCb + slice\_act\_Cb\_qp\_offset \quad \text{[Equation 98]}$$

Alternatively, when the cIdx has a value of 2, the qP and the ACT Qp offset may be derived as shown in the equation below.

$$qP = Qp'_{Cr}$$

$$ActQpOffset = PpsActQpOffsetCr + slice\_act\_Cr\_qp\_offset \quad \text{[Equation 99]}$$

In addition, when the cIdx does not have a value of 0 and the TuCResMode[xTbY][yTbY] does not have a value of 0, the ACT Qp offset may be derived as shown in the equation below.

$$\text{ActQpOffset}=(\text{tu\_cbf\_cb}[x\text{TbY}][y\text{TbY}])?(\text{PPsQpOffsetCbCrMode}A+\text{slice\_act\_CbCr\_qp\_offset\_Mode}A):(\text{PPsQpOffsetCbCrMode}B+\text{slice\_act\_CbCr\_qp\_offset\_Mode}B)$$ [Equation 100]

In still another embodiment, when an ACT Qp offset for joint CbCr is not provided, qP and ActQpOffset for Y, Cb, and/or Cr components are determined and the ActQpOffset for joint CbCr may be determined using ACT Qp offsets of the Y, Cb, and/or Cr components as follows. For example, in the above-described embodiment, when the TuCResMode[xTbY][yTbY] related to Equation 97 has a value of 2, the calculation step of the qP may be changed and performed as follows.

"Alternatively, when the TuCResMode[xTbY][yTbY] has a value of 2, the qP and the ACT Qp offset may be derived as shown in the equation below.

$$qP=Qp'_{CbCr}$$

$$\text{ActQpOffset}=(\text{cIdx}==1])?(\text{PPsQpOffsetCb+slice\_act\_Cb\_qp\_offset}):(\text{PPsQpOffsetCr+slice\_act\_Cr\_qp\_offset})"$$ [Equation 101]

In the meantime, in another embodiment, a value of ActQpOffset may be determined as in the equation below.

$$\text{ActQpOffset}=(\text{tu\_cbf\_cb}[x\text{TbY}][y\text{TbY}])?(\text{PPsQpOffsetCb+slice\_act\_Cb\_qp\_offset}):(\text{PPsQpOffsetCr+slice\_act\_Cr\_qp\_offset})$$ [Equation 102]

Embodiment 8: Method of Signaling Multiple ACT Qp Offset Sets

In the present embodiment, a method of using a list of ACT Qp offsets will be described. To this end, the following processing may be performed.

a) Multiple sets of ACT Qp offsets may be signaled in the form of a list within a parameter set (e.g., SPS or PPS). Each set in the list may include ACT Qp offsets for Y, Cb, Cr, and joint CbCr components. For simplicity, the list of ACT Qp offsets may be signaled in the parameter set the same as the parameter set for signaling a list of chroma Qp offsets.

b) The number of the sets of the ACT Qp offsets in the list may be the same as the number of chroma Qp offset sets signaled in a PPS.

c) As an ACT Qp offset used to derive the qP for each encoding basis, an ACT Qp offset belonging to the list having an index (e.g., cu_chroma_qp_offset_idx) for a chroma Qp offset for the encoding basis may be used.

d) As an alternative embodiment of b) and c), the following may be performed.

The number of the sets of the ACT Qp offsets in the list may be signaled. The number of the sets of the ACT Qp offsets in the list may be different from the number of chroma Qp offset sets.

When ACT is applicable, an index indicating the index of the ACT Qp offset used for the encoding basis may be signaled.

Without departing from the above concept, the syntax for signaling a list of ACT Qp offsets may be used as shown in FIG. 49. For example, when cu_act_enabled_flag has a value of 1, pps_act_y_qp_offset, pps_act_cb_qp_offset, pps_act_cr_qp_offset, and pps_act_cbcr_qp_offset may be used to determine offsets to be applied to quantization parameter values qP for luma, Cb, Cr components, and joint CbCr, respectively.

When the values of the pps_act_y_qp_offset, the pps_act_cb_qp_offset, the pps_act_cr_qp_offset, and the pps_act_cbcr_qp_offset are not present, each value may be derived into 0.

When the value of the cu_act_enabled_flag is a second value (e.g., 1) and a value of cu_chroma_qp_offset_flag is a second value (e.g., 1), act_y_qp_offset_list[i], act_ch_qp_offset_list[i], act_cr_qp_offset_list[i], and act_cbcr_qp_offset_list[i] may be used to determine offsets applied to quantization parameters value qP for luma, Cb, Cr components, and a joint CbCr component, respectively. When the values of the act_y_qp_offset_list[i], the act_cb_qp_offset_list[i], the act_cr_qp_offset_list[i], and the act_cbcr_qp_offset_list[i] are not present, each value may be derived into 0.

In the present embodiment, a quantization parameter qP may be determined as follows. First, when the cIdx has a value of 0, the qP and the ACT Qp offset may be derived as shown in the equation below.

$$qP=Qp'_Y$$

$$\text{ActQpOffset}=\text{pps\_act\_y\_qp\_offset}+(\text{cu\_chroma\_qp\_offset\_flag})?\text{act\_y\_qp\_offset\_list}[\text{cu\_chroma\_qp\_offset\_idx}]: 0+\text{slice\_act\_y\_qp\_offset}$$ [Equation 103]

Alternatively, when the TuCResMode[xTbY][yTbY] has a value of 2, the qP and the ACT Qp offset may be derived as shown in the equation below.

$$qP=Qp'_{CbCr}$$ [Equation 104]

$$\text{ActQpOffset}=\text{pps\_act\_cbcr\_qp\_offset}+(\text{cu\_chroma\_qp\_offset\_flag})?\text{act\_cbcr\_qp\_offset\_list}[\text{cu\_chroma\_qp\_offset\_idx}]: 0+\text{slice\_act\_cbcr\_qp\_offset}$$

Alternatively, when the cIdx has a value of 1, the qP and the ACT Qp offset may be derived as shown in the equation below.

$$qP=Qp'_{Cb}$$

$$\text{ActQpOffset}=\text{pps\_act\_cb\_qp\_offset}+(\text{cu\_chroma\_qp\_offset\_flag})?\text{act\_cb\_qp\_offset\_list}[\text{cu\_chroma\_qp\_offset\_idx}]: 0+\text{slice\_act\_cb\_qp\_offset}$$ [Equation 105]

Alternatively, when the cIdx has a value of 2, the qP and the ACT Qp offset may be derived as shown in the equation below.

$$qP=Qp'_{Cr}$$

$$\text{ActQpOffset}=\text{pps\_act\_cr\_qp\_offset}+(\text{cu\_chroma\_qp\_offset\_flag})?\text{act\_cr\_qp\_offset\_list}[\text{cu\_chroma\_qp\_offset\_idx}]: 0+\text{slice\_act\_cr\_qp\_offset}$$ [Equation 106]

Embodiment 9: ACT Color Space Transform Method to be Applied to Both Lossless Encoding and Lossy Encoding Transform between color spaces based on the matrices for forward transform and backward transform described above may be organized as follows.

TABLE 3

| Forward Conversion: GBR to YCgCo | Backward Conversion: YCgCo to GBR | |
|---|---|---|
| Y = ((G<<1) + R + B + 2) >>2 | t = Y − Cg | |
| Cg = ((G<<1) − R − B + 2) >>2 | G = Y + Cg | |
| Co = ((R−B << 1) +2) >>2 | B = t − Co | = Y − Cg − Co |
| | R = t + Co | = Y − Cg + Co |

The transform is unable to achieve reconstruction into the original state because loss of some values occurs in the processing of Co and Cg. For example, when a sample value of the RGB color space is converted into that of the YCgCocolor space and the resulting value is inversely converted back to that of the RGB color space, the value of the original sample is not completely reconstructed. Therefore, the transform according to Table 3 cannot be used for lossless encoding. It is necessary to improve a color space transform algorithm so that loss of a sample value does not occur after color space transform even when lossless encoding is applied. Embodiments 9 and 10 describe a color space transform algorithm capable of being applied to lossless encoding as well as lossy encoding.

In the embodiment described below, described is a method of performing ACT by using color space transform reversible into an original state, which is applicable to lossy encoding as well as lossless encoding. This reversible color space transform may be applied to the above-described encoding and decoding methods. An ACT Qp offset may also be adjusted for the color space transform below. Color space transform according to an embodiment may be performed as shown in the equation below. For example, forward transform from a GBR color space to a YCgCo color space may be performed according to the equation below.

$Co = R - B;$ $t = B + (Co >> 1);$ $Cg = G - t;$ $Y = t + (Cg >> 1);$ [Equation 107]

In addition, backward transform from a YCgCo color space to a GBR color space may be performed according to the equation below.

$t = Y - (Cg >> 1)$ $G = Cg + t$ $B = t - (Co >> 1)$ $R = Co + B$ [Equation 108]

The transform between the YCgCo color space and the RGB color space according to the equations above is reversible to an original state. That is, the color space transform according to the equations supports perfect reconstruction. For example, a sample value is maintained even though backward transform is performed after forward transform. Accordingly, the color space transform according to the equations may be referred to as reversible YCgCo-R color transform. Herein, R may stand for reversible, which means that achieves reconstruction to an original state. YCgCo-R transform may be provided by increasing the bit depths of Cg and Co by 1 compared to the existing transform. If this condition is met, other types of reversible transform may be used like the above-described transform.

Because the transform as shown in the equations above has a different norm value from the above-described transform, ACT Qp offsets for Y, Cg, and Co may be adjusted to compensate for a dynamic range change due to color space transform.

It has been described that when the above-described transform is applied, a QCT Qp offset according to an embodiment may have a value of (−5, −5, −5) for Y, Cg, and Co. However, when the reversible transform according to the present embodiment is applied, as a QCT Qp offset according to an embodiment, another value not (−5, −5, −5) may be specified. For example, as a QCT Qp offset according to an embodiment, a value of (−5, 1, 3) for Y, Cg, and Co may be used.

In another embodiment, an ACT QP offset may be signaled through a bitstream as in Embodiment 6 or 7 described above.

For example, when the YCgCo-R transform described above was used together with an ACT QP offset of (−5, 1, 3), it was observed that encoding loss was not present in a lossy encoding environment (e.g., QP 22, 27, 32, 37), as shown in the figure below. In addition, it was observed that when ACT is applied, encoding performance of 5% was further obtained in realizing lossless encoding.

TABLE 4

| Sequence | Y | U | V |
|---|---|---|---|
| RGB, TGM 1080p | 0.0% | 0.2% | 0.1% |
| RGB, TGM 720p | 0.2% | −0.1% | 0.1% |
| RGB, Animation | −0.1% | −0.1% | 0.0% |
| RGB, Mixed content | −0.1% | 0.0% | −0.1% |
| RGB, Camera-Captured content | −0.3% | 0.2% | −0.3% |
| Overall All (RGB) | 0.0% | 0.0% | 0.0% |

The VVC specification for including an integrated ACT matrix may be described as the table below.

TABLE 5

Residual modification process for blocks using colour space conversion

Inputs to this process are:
- a variable nTbW specifying the block width,
- a variable nTbH specifying the block height,
- an (nTbW)x(nTbH) array of luma residual samples $r_Y$ with elements $r_Y[ x ][ y ]$,
- an (nTbW)x(nTbH) array of chroma residual samples $r_{Cb}$ with elements $r_{Cb}[ x ][ y ]$,
- an (nTbW)x(nTbH) array of chroma residual samples $r_{Cr}$ with elements $r_{Cr}[ x ][ y ]$.

Outputs of this process are:
- a modified (nTbW)x(nTbH) array $r_Y$ of luma residual samples,
- a modified (nTbW)x(nTbH) array $r_{Cb}$ of chroma residual samples,
- a modified (nTbW)x(nTbH) array $r_{Cr}$ of chroma residual samples.

TABLE 5-continued

Residual modification process for blocks using colour space conversion

The (nTbW)x(nTbH) arrays of residual samples $r_Y$, $r_{Cb}$ and $r_{Cr}$ are modified as follows:
tmp = $r_Y$[ x ][ y ] − ($r_{Cb}$[ x ][ y ] >>1)
$r_Y$[ x ][ y ] = tmp + $r_{Cb}$[ x ][ y ]
$r_{Cb}$[ x ][ y ] = tmp − ($r_{Cr}$[ x ][ y ] >>1)
$r_{Cr}$[ x ][ y ] = $r_{Cb}$[ x ][ y ] + $r_{Cr}$[ x ][ y ]

For example, (nTbW)×(nTbH)-sized residual sample arrays $r_Y$, $r_{Cb}$, and $r_{Cr}$ may be updated as follows.

$$tmp = r_Y[x][y] - (r_{Cb}[x][y] >> 1)$$

$$r_Y[x][y] = tmp + r_{Cb}[x][y]$$

$$r_{Cb}[x][y] = tmp - (r_{Cr}[x][y] >> 1)$$

$$r_{Cr}[x][y] = r_{Cb}[x][y] + r_{Cr}[x][y] \quad \text{[Equation 109]}$$

Embodiment 10: ACT Performance Method for Performing Multiple Color Transforms Based on Explicit Signaling In the present embodiment, at least one color transform may be performed by ACT. Which color transform is to be performed may be determined by a flag(s) signaled in a bitstream. The flag(s) may be signaled at multiple levels, such as an SPS, a PPS, a picture header, and a slice, or identifiable granularities.

In an embodiment, a predetermined flag may be signaled to indicate which ACT is applied. For example, when the flag has a value of 1, ACT based on reversible color transform may be applied. When the flag has a value of 0, ACT based on non-reversible color transform may be applied.

In another embodiment, a predetermined flag for ACT may be signaled to indicate which color transform is used. An example of syntax signaled in an SPS is shown in FIG. 50. The syntax element of FIG. 50 will be described. A syntax element sps_act_reversible_conversion may indicate whether a transform equation irreversible to an original state is used. A first value (e.g. 0) of the sps_act_reversible_conversion may indicate that ACT uses a transform equation irreversible to an original state. A second value (e.g., 1) of the sps_act_reversible_conversion may indicate that ACT uses a transform equation reversible to an original state.

Accordingly, a variable lossyCoding indicating whether lossy encoding is performed may be set as in the equation below.

$$\text{lossyCoding} = (!\text{sps\_act\_reversible\_conversion}) \quad \text{[Equation 110]}$$

By using the lossyCoding flag, the pseudocode for the decoding device to perform backward transform from YCgCo to GBR in the decoding process may be expressed as follows.

[Equation 111]
If (sps_act_reversible_conversion == 1)
{
// YCgCo-R reversible conversion
t = Y − (Cg>>1)
G = Cg + t
B = t − (Co>>1)
R = Co + B
}
else {
t = Y − Cg
G = Y + Cg
B = t − Co
R = t + Co
}

Accordingly, the VVC specification shown in Table 5 of Embodiment 9 may be modified as shown in the table below.

TABLE 6

Residual modification process for blocks using colour space conversion

Inputs to this process are:
- a variable nTbW specifying the block width,
- a variable nTbH specifying the block height,
- an (nTbW)x(nTbH) array of luma residual samples $r_Y$ with elements $r_Y$[ x ][ y ],
- an (nTbW)x(nTbH) array of chroma residual samples $r_{Cb}$ with elements $r_{Cb}$[ x ][ y ],
- an (nTbW)x(nTbH) array of chroma residual samples $r_{Cr}$ with elements $r_{Cr}$[ x ][ y ].

Outputs of this process are:
- a modified (nTbW)x(nTbH) array $r_Y$ of luma residual samples,
- a modified (nTbW)x(nTbH) array $r_{Cb}$ of chroma residual samples,
- a modified (nTbW)x(nTbH) array $r_{Cr}$ of chroma residual samples.

The (nTbW)x(nTbH) arrays of residual samples $r_Y$, $r_{Cb}$ and $r_{Cr}$ are modified as follows:
- If sps_act_ reversible _conversion equal to 1, the (nTbW)x(nTbH) arrays of residual samples $r_Y$, $r_{Cb}$ and $r_{Cr}$ are modified as follows
tmp = $r_Y$[ x ][ y ] − ($r_{Cb}$[ x ][ y ] >>1)          )
$r_Y$[ x ][ y ] = tmp + $r_{Cb}$[ x ][ y ]          )
$r_{Cb}$[ x ][ y ] = tmp − ($r_{Cr}$[ x ][ y ] >>1)          )
$r_{Cr}$[ x ][ y ] = $r_{Cb}$[ x ][ y ] + $r_{Cr}$[ x ][ y ]

TABLE 6-continued

Residual modification process for blocks using colour space conversion

- Otherwise, the (nTbW)x(nTbH) arrays of residual samples $r_Y$, $r_{Cb}$ and $r_{Cr}$ are modified as follows
  tmp = $r_Y$[ x ][ y ] - $r_{Cb}$[ x ][ y ]        )
  $r_Y$[ x ][ y ] = $r_Y$[ x ][ y ] + $r_{Cb}$[ x ][ y ]     )
  $r_{Cb}$[ x ][ y ] = tmp - $r_{Cr}$[ x ][ y ]        )
          $r_{Cr}$[ x ][ y ] = tmp + $r_{Cr}$[ x ][ y ]

According to the table above, a residual update process using color space transform may use the following parameters as inputs to the present process.—a variable nTbW indicating a block width a variable nTbH indicating a block height
a (nTbW)×(nTbH)-sized array $r_Y$ for a luma residual sample, composed of elements $r_Y$[x][y],
a (nTbW)×(nTbH)-sized array $r_{Cb}$ for a chroma residual sample, composed of elements $r_{Cb}$[x][y],
a (nTbW)×(nTbH)-sized array $r_{Cr}$ for a chroma residual sample, composed of elements $r_{Cr}$[x][y], The output for the present process is as follows.
a (nTbW)×(nTbH)-sized updated array $r_Y$ for a luma residual sample,
a (nTbW)×(nTbH)-sized updated array $r_{Cb}$ for a chroma residual sample,
a (nTbW)×(nTbH)-sized updated array $r_{Cr}$ for a chroma residual sample, By performing the present process, (nTbW)×(nTbH)-sized residual sample arrays $r_Y$, $r_{Cb}$, and $r_{Cr}$ may be updated as follows.

First, when the value of the sps_act_reversible_conversion is the second value (e.g., 1), (nTbW)×(nTbH)-sized residual sample arrays $r_Y$, $r_{Cb}$, and $r_{Cr}$ may be updated as shown in the equation below.

$$tmp = r_Y[x][y] - (r_{Cb}[x][y] >> 1))$$

$$r_Y[x][y] = tmp + r_{Cb}[x][y])$$

$$r_{Cb}[x][y] = tmp - (r_{Cr}[x][y] >> 1))$$

$$r_{Cr}[x][y] = r_{Cb}[x][y] + r_{Cr}[x][y] \quad \text{[Equation 112]}$$

Otherwise (e.g., when the value of the sps_act_reversible_ conversion is the first value (e.g., 0)), (nTbW)×(nTbH)-sized residual sample arrays $r_Y$, $r_{Cb}$, and $r_{Cr}$ may be updated as shown in the equation below.

$$tmp = r_Y[x][y] - r_{Cb}[x][y]$$

$$r_Y[x][y] = r_Y[x][y] + r_{Cb}[x][y]$$

$$r_{Cb}[x][y] = tmp - r_{Cr}[x][y]$$

$$r_{Cr}[x][y] = tmp + r_{Cr}[x][y] \quad \text{[Equation 113]}$$

YCgCo backward transform and YCgCo-R backward transform have some similarities. In transform reversible to an original state, when Cg and Co are replaced with Cg'=Cg<<1 and Co'=Co<<1, this may operate as lossy backward transform. The equation below shows an embodiment thereof.

$$t = Y - (Cg' >> 1) = Y - Cg$$

$$G = Cg' + t = Y + Cg$$

$$B = t - (Co' >> 1) = t - Co = Y - Cg - Co$$

$$R = Co' + B = t + Co = Y - Cg + Co \quad \text{[Equation 114]}$$

Accordingly, in an alternative embodiment, instead of maintaining two color transforms, only transform reversible to an original state may be used. In the lossy encoding case, Cg and Co components may be scaled ½ times in the operation of the encoding device, and may be scaled twice in the operation of the decoding device. This enables one integrated transform to be used even when lossy and lossless cases are supported. In addition, there is an additional advantage that bit depth does not change even when lossy encoding is in progress.

TABLE 7

Backward Conversion: YCgCo to GBR

If (lossyCoding)
{
   Cg = Cg << 1;
   Co = Co << 1;
}
t = Y - (Cg>>1)
G = Cg + t
B = t - (Co>>1)
R = Co + B In an embodiment, a flag (e.g., actShiftFlag) indicating which ACT transform is used may be used according to the syntax of FIG. 51. In the syntax table of FIG. 51, a syntax element sps_act_shift_flag may indicate whether performing color component shifting is applied while ACT is applied. For example, a first value (e.g., 0) of the sps_act_shift_flag may indicate that performing color component shifting is not applied while ACT is applied. A second value (e.g., 1) of the sps_act_shift_flag may indicate that performing color component shifting is applied while ACT is applied. The variable actShiftFlag may be set to the value of the sps_act_shift_ flag. The pseudocode for realizing backward transform from YCgCo to GBR in the decoding device may be written using the actShiftFlag, as follows.

TABLE 8

Backward Conversion: YCgCo to GBR

If (actShiftFlag)
{
  Cg = Cg >> 1;
  Co = Co >> 1;
}
t = Y - (Cg>>1)
G = Cg + t
B = t - (Co>>1)
R = Co + B

Embodiment 11 ACT Performance Method for Performing Multiple Color Transforms Using Derivation of Transform Type In an embodiment, at least one color transform may be used in performing ACT. In addition, which color transform type is used may be derived on the basis of other information of a bitstream.

In an embodiment, two types of ACT transforms may be available including ACT transform reversible to an original state and ACT transform irreversible to an original state. The ACT transform types may be derived by transform types. For example, as identified by a variable tuIsTransformSkip, when the transform type is transform skip, the ACT transform reversible to an original state may be used. Otherwise (e.g., when the transform type is not transform skip), the ACT transform irreversible to an original state may be used. Two types of pseudocode may be used.

TABLE 9

Backward Conversion: YCgCo to GBR

```
If (tuIsTransformSkip)
{
    // YCgCo-R reversible conversion
    t = Y - (Cg>>1)
    G = Cg + t
    B = t - (Co>>1)
    R = Co + B
}
else {
    t = Y - Cg
    G = Y + Cg
    B = t - Co
    R = t + Co
}
```

TABLE 10

Backward Conversion: YCgCo to GBR

```
If (tuIsTransformSkip)
{
    Cg = Cg << 1;
    Co = Co << 1;
}
t = Y - (Cg>>1)
G = Cg + t
B = t - (Co>>1)
R = Co + B
```

In another embodiment, the ACT transform types may be determined on the basis of QP values. When a Qp value is less than or equal to a predetermined threshold value (e.g., QpPrimeTsMin), the ACT transform reversible to an original state may be used. Otherwise (e.g., when the Qp value exceeds the predetermined threshold value), the non-reversible ACT transform may be used.

Embodiment 12: QP Derivation Method Using ACT QP Offset

The present embodiment is related to Embodiments 1 and 2 described above. In Embodiments 1 and 2, it has already been described that derived $Qp'_Y$, $Qp'_{CbCr}$, $Qp'_{Cb}$, and $Qp'_{Cr}$ are included as QPs. The methods described in Embodiments 1 and 2 correct the derived Qp values by using an ACT QP offset, and apply an essential clipping technique so that the corrected QP values for transform coefficient scaling are not out of an effective range.

The present embodiment describes a method of including an ACT QP offset in a QP derivation process for deriving $Qp'_Y$, $Qp'_{CbCr}$, $Qp'_{Cb}$, and $Qp'_{Cr}$. The QP derivation process already includes a predetermined clipping step so that the derived QP values are not out of the effective range. Therefore, including an ACT QP offset in the QP derivation process may avoid an additional clipping step, simplify the overall QP derivation step for a transform coefficient scaling process, and ensure that the final QP is not out of the effective range.

As described in the embodiment described above, an ACT QP offset may be pre-specified to a constant, or may be signaled through a bitstream. Without departing from consistency, ACT QP offsets for Y, Cb, Cr, and CbCr may be described as ppsActQpOffsetY, ppsActQpOffsetCb, ppsActQpOffsetCr, and ppsActQpOffsetCbCr in the description to be described later. The ppsActQpOffsetY, the ppsActQpOffsetCb, the ppsActQpOffsetCr, and the ppsActQpOffsetCbCr may be constants or variables having values ranging from −M to N. Herein, each of the M and N may be set to 12 in the lossy encoding case and may be set to 0 in the lossless encoding case in an embodiment. In addition, at least one ACT QP offset may be derived from another ACT QP offset value. For example, the ppsActQpOffsetCbCr may be set to the same value as the ppsActQpOffsetCb or the ppsActQpOffsetCr, on the basis of the jointCbCr mode.

Decoding processing for QP derivation using an ACT QP offset may be performed as described below. First, in the case of a quantization parameter derivation process, the following parameters may be utilized for the present process.

Luma coordinates (xCb, yCb) indicating relative coordinates of the top left luma sample of a current encoding block with respect to the top left luma sample of a current picture, A variable cbWidth indicating the width of the current encoding block on a per luma sample basis, A variable cbHeight indicating the height of the current encoding block on a per luma sample basis A variable treeType indicating whether a single tree (SINGLE_TREE) or a dual tree is used to partition a current coding tree node, and indicating, when the dual tree is used, whether the dual tree is a luma component dual tree (DAUL_TREE_LUMA) or a chroma component dual tree (DAUL_TREE_CHROMA)

In the present quantization parameter derivation process, a luma quantization parameter $Qp'_Y$ and chroma quantization parameters $Qp'_{Cb}$, $Qp'_{Cr}$, and $Qp'_{CbCr}$ may be derived.

Afterward, a variable $Qp_Y$ may be derived as shown in the equation below.

$$Qp_Y = ((qP_{Y\_PRED} + CuQpDeltaVal + 64 + 2*QpBdOffset) \% (64 + QpBdOffset)) - QpBdOffset \quad \text{[Equation 115]}$$

The luma quantization parameter $Qp'_Y$ may be derived as shown in the equation below.

actQpOffsetY=cu_act_enabled_flag[xCb][yCb]?pps-ActQpOffsetY: 0

$Qp'_Y = Qp_Y + QpBdOffset + actQpOffsetY$ $Qp'_Y = Clip3(0, 63 + QpBdOffset, Qp'_Y)$ [Equation 116]

When the value of a variable ChromaArrayType indicating a type of a chroma array is not a first value (e.g., 0) and the treeType is the SINGLE_TREE or the DUAL_TREE_CHROMA, the following processing may be performed.

When the value of the treeType is the DUAL_TREE_CHROMA, the value of the variable $Qp_Y$ may be set to the same value as that of the luma quantization parameter $Qp_Y$ of the luma encoding basis covering the luma sample location (xCb+cbWidth/2, yCb+cbHeight/2).

Variables $qP_{Cb}$, $qP_{Cr}$, and $qP_{CbCr}$ may be derived as shown in the equation below.

[Equation 117]

$$qP_{Chroma} = \text{Clip3}(-QpBdOffset, 63, Qp_Y) \quad (1118)$$

$$qP_{Cb} = \text{ChromaQpTable}[0][qP_{Chroma}] \quad (1119)$$

$$qP_{Cr} = \text{ChromaQpTable}[1][qP_{Chroma}] \quad (1120)$$

$$qP_{CbCr} = \text{ChromaQpTable}[2][qP_{Chroma}] \quad (1121)$$

The chroma quantization parameters $Qp'_{Cb}$ and $Qp'_{Cr}$ for Cb and Cr components and the chroma quantization parameter $Qp'_{CbCr}$ for joint Cb–Cr coding may be derived as shown in the equation below.

actQpOffsetCb=cu_act_enabled_flag[xCb][yCb]?pps-ActQpOffsetCb: 0 actQpOffsetCr=cu_act_enabled_flag[xCb][yCb]?pps-ActQpOffsetCr: 0 actQpOffsetCbCr=cu_act_enabled_flag[xCb][yCb]?ppsActQpOffsetCbCr:0

$Qp'_{Cb}$=Clip3(-QpBdOffset,63,$qP_{Cb}$+pps_cb_qp_offset+slice_cb_qp_offset+CuQpOffset$_{Cb}$+actQpOffsetCb)+QpBdOffset $Qp'_{Cr}$=Clip3(-QpBdOffset,63,$qP_{Cr}$+pps_cr_qp_offset+slice_cr_qp_offset+CuQpOffset$_{Cr}$+actQpOffsetCr)+QpBdOffset $Qp'_{CbCr}$=Clip3(-QpBdOffset,63,$qP_{CbCr}$+pps_joint_cbcr_qp_offset+slice_joint_cbcr_qp_offset+CuQpOffset$_{Cb}$cr+actQpOffsetCbCr)+QpBdOffset    [Equation 118]

Next, a dequantization process for a transform coefficient may be performed, and the following information may be utilized as an input for the present process.

Luma coordinates (xTbY, yTbY) referring to relative coordinates of the top left sample of the current luma transform block with respect to the top left luma sample of the current picture, A variable nTbW indicating the width of a transform block, A variable nTbH indicating the height of a transform block, A variable predMode indicating a prediction mode of the encoding basis, A variable cIdx indicating a color component of a current block The output of the dequantization process for the transform coefficient may be an array d of scaled transform coefficients. Herein, the size of the array d may be (nTbW)×(nTbH). The individual elements constituting this may be identified as d[x][y].

In performing the present process, a quantization parameter qP may be derived as follows. When the cIdx has a value of 0, the qP may be derived as shown in the equation below.

$$qP = Qp'_Y \quad \text{[Equation 119]}$$

Alternatively, when the TuCResMode[xTbY][yTbY] has a value of 2, derivation may be made as shown in the equation below.

$$qP = Qp'_{CbCr} \quad \text{[Equation 120]}$$

Alternatively, when the cIdx has a value of 1, the qP may be derived as shown in the equation below.

$$qP = Qp'_{Cb} \quad \text{[Equation 121]}$$

Alternatively, when the cIdx has a value of 2, the qP may be derived as shown in the equation below.

$$qP = Qp'_{Cr} \quad \text{[Equation 122]}$$

The quantization parameter qP may be updated as follows. In addition, variables rectNonTsFlag and bdShift may be derived as follows. When the transform_skip_flag[xTbY][yTbY][cIdx] has a value of 0, derivation may be made as shown in the equation below.

rectNonTsFlag=(((Log 2(nTbW)+Log 2(nTbH))&1)==1)?1:0 bdShift BitDepth+rectNonTsFlag+((Log 2(nTbW)+Log 2(nTbH))/2)−5+pic_dep_quant_enabled_flag    [Equation 123]

Alternatively, when the transform_skip_flag[xTbY][yTbY][cIdx] has a value of 1 (e.g., transform of the current transform block is skipped), derivation may be made as shown in the equation below.

qP=Max(QpPrimeTsMin,qP)

rectNonTsFlag=0 bdShift=10    [Equation 124]

Encoding and Decoding Methods

Figure 52:
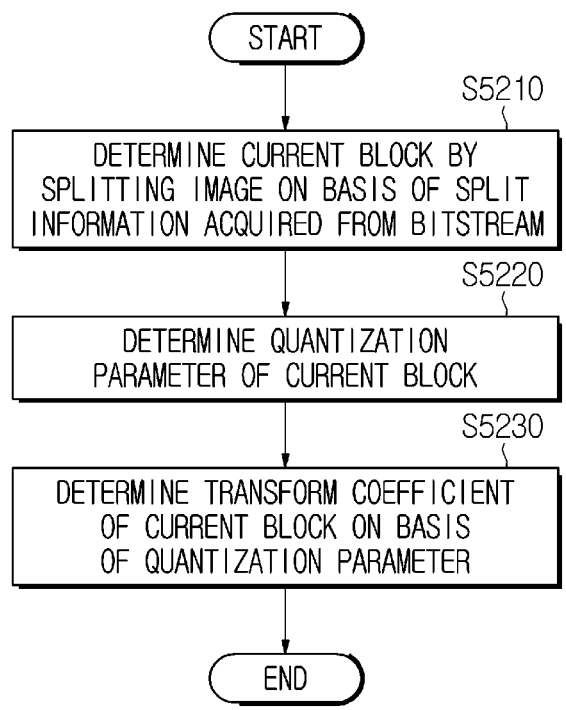
FIG. 52 is a view showing an image decoding method according to an embodiment.
Figure 53:
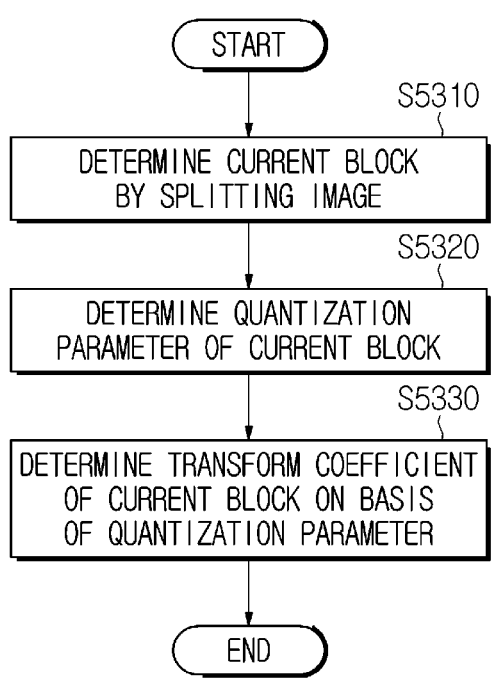
FIG. 53 is a view showing an image encoding method according to an embodiment.

Hereinafter, an image encoding method performed by an image encoding apparatus and an image decoding method performed by an image decoding apparatus will be described with reference to FIGS. 52 and 53.

First, the operation of the decoding apparatus will be described. The image decoding apparatus according to an embodiment may include a memory and a processor. The decoding apparatus may perform decoding according to the operation of the processor. For example, as shown in FIG. 52, the decoding apparatus may determine a current block in step S5210 by splitting an image on the basis of split information obtained from a bitstream. Next, a quantization parameter of the current block may be determined in step S5220. Next, a transform coefficient of the current block may be determined on the basis of the quantization parameter in step S5230. Herein, the quantization parameter may be determined on the basis of whether color space transform is applied to a residual sample of the current block. In addition, a value of the quantization parameter may be determined to have a value within a range that is set to be from a predetermined upper limit to a predetermined lower limit. For example, the value of the quantization parameter may be determined by performing clipping on the quantization parameter to have a value within the range. A predetermined lower limit value of the quantization parameter may be 0. In addition, a predetermined upper limit value of the quantization parameter may be determined on the basis of a predetermined constant value (e.g., 63). Alternatively, as described above, it may be determined on the basis of a parameter (e.g., QpBdOffset) indicating a luma and chroma quantization parameter range offset. The QpBdOffset may be preset to a predetermined constant or may be obtained on the basis of a syntax element determined in the encoding process. For example, the QpBdOffset may be calculated by multiplying a predetermined constant by a value of a syntax element that indicates a bit depth of a luma or chroma sample.

The quantization parameter may be determined on the basis of a quantization parameter offset that is determined on the basis of a color component of the current block. For example, the quantization parameter may be determined by adding the quantization parameter offset to a quantization parameter that is determined on the basis of the color component of the current block. When color space transform is applied to the residual sample of the current block and the color component of the current block is a luma component, an absolute value of the quantization parameter offset may be determined to be 5. In addition, when color space transform is applied to the residual sample of the current block and the color component of the current block is a chroma Cb component, an absolute value of the quantization parameter offset may be determined to be 1. In addition, when color space transform is applied to the residual sample of the current block and the color component of the current block is a chroma Cr component, an absolute value of the quantization parameter offset may be determined to be 3.

In addition, the residual sample of the current block may be determined on the basis of the transform coefficient of the current block. Herein, a value of the residual sample may be updated on the basis of whether color space transform is applied. For example, when color space transform is applied, the value of the residual sample may be updated by performing color space transform of the residual sample with a color space transform function reversible to a value of an original sample. For example, when color space transform is applied, the value of the residual sample may be updated on the basis of a sample value that is obtained by applying right-shift operation to a chroma component residual sample value.

Hereinafter, the operation of the encoding apparatus will be described. The image encoding apparatus according to an embodiment may include a memory and a processor. The encoding apparatus may perform encoding according to the operation of the processor in a manner that corresponds to the decoding by the decoding apparatus. For example, as shown in FIG. 53, the encoding apparatus may determine a current block by splitting an image in step S5310. Next, the encoding apparatus may determine a quantization parameter of the current block in step S5320. Next, the encoding apparatus may determine a transform coefficient of the current block on the basis of the quantization parameter in step S5330. Herein, the determining of the quantization parameter may be performed on the basis of whether color space transform is applied to a residual sample of the current block. In addition, a value of the quantization parameter may be limited to have a value within a range that is set to be from a predetermined upper limit to a predetermined lower limit.

Herein, the encoding apparatus may apply clipping to the quantization parameter such that a value of the quantization parameter has a value within a predetermined range. Herein, a lower limit value of the predetermined range may be 0. In addition, an upper limit value of the predetermined range may be an upper limit value of a luma and chroma quantization parameter. The upper limit value of the luma and chroma quantization parameter may be determined on the basis of a bit depth of a sample.

In the meantime, to determine a quantization parameter, the encoding apparatus may determine the quantization parameter on the basis of the color component of the current block, and may determine a quantization parameter offset on the basis of the color component of the current block. In addition, the encoding apparatus may reset the quantization parameter by using the quantization parameter offset, thereby determining the quantization parameter.

Herein, the encoding apparatus may add the quantization parameter offset to the quantization parameter, thereby resetting the quantization parameter.

Herein, when color space transform is applied to the residual sample of the current block and the color component of the current block is a luma component, a value of the quantization parameter offset may be determined to be −5. In addition, when color space transform is applied to the residual sample of the current block and the color component of the current block is a chroma Cb component, a value of the quantization parameter offset may be determined to be 1. In addition, when color space transform is applied to the residual sample of the current block and the color component of the current block is a chroma Cr component, a value of the quantization parameter offset may be determined to be 3.

In the meantime, the residual sample of the current block is determined on the basis of the transform coefficient of the current block, and a value of the residual sample may be updated on the basis of whether color space transform is applied. When color space transform is applied, the value of the residual sample may be updated on the basis of a sample value that is obtained by applying right-shift operation to a chroma component residual sample value.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a Blu-ray player, an Internet access TV, a home theater system, a smartphone, a tablet PC, a digital video recorder (DVR), or the like.

Figure 54:
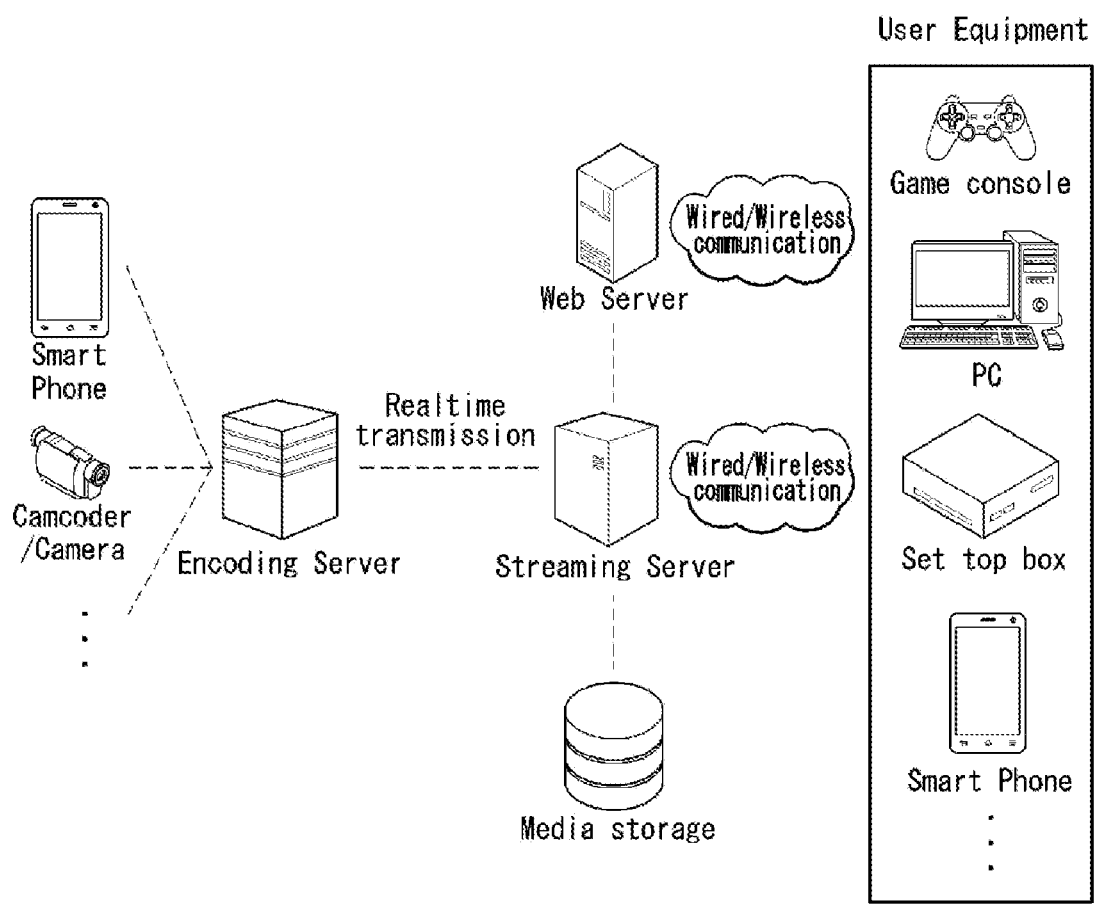
FIG. 54 is a view showing a content streaming system, to which an embodiment of the present disclosure is applicable.

FIG. 54 is a view showing a content streaming system, to which an embodiment of the present disclosure is applicable.

As shown in FIG. 54, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the method comprising:
  determining quantization parameter of a current block; and
  deriving transform coefficient of the current block based on the quantization parameter;
  wherein the quantization parameter is determined based on quantization parameter offset,
  wherein the quantization parameter offset is derived based on color space transform for residual samples of the current block and a color component of the current block, and
  wherein a value of the quantization parameter is clipped to be greater than or equal to a specific value, the specific value being set based on transform skip flag of the current block, and
  wherein the transform skip flag is obtained based on the color component of the current block.

2. The method of claim 1,
  wherein the value of the quantization parameter is clipped to be less than or equal to a predetermined upper value.

3. The method of claim 1,
  wherein the transform skip flag is for transformation from frequency domain to spatial domain.

4. The method of claim 3,
  wherein based on the transform skip flag of the current indicating the transformation from frequency domain to spatial domain being determined based on another syntax element, a predetermined lower value is set to be 0.

5. The method of claim 3,
  wherein based on the transform skip flag of the current block indicating the transformation from frequency domain to spatial domain being skipped, a predetermined lower value is set based on a minimum value of the quantization parameter for a transform skip mode.

6. The method of claim 1,
  wherein based on the color component of the current block being a chroma Cr component and the color space transform for the residual samples of the current block being applied, an absolute value of the quantization parameter offset is set to be 3.

7. The method of claim 1,
  wherein based on the color component of the current block being a luma component and the color space transform for the residual samples of the current block being applied, an absolute value of the quantization parameter offset is set to be 5.

8. The method of claim 1,
  wherein based on the color space transform for the residual samples of the current block being applied, subtraction based on a value of the quantization parameter offset based on the color component of the current block being a chroma Cr component and a value of the quantization parameter offset based on the color component of the current block being a chroma Cb component is 2.

9. An image encoding method performed by an image encoding apparatus, the method comprising:
determining quantization parameter of a current block; and
encoding transform coefficient of the current block based on the quantization parameter;
wherein the quantization parameter is determined based on quantization parameter offset,
wherein the quantization parameter offset is derived based on color space transform for residual samples of the current block and a color component of the current block, and
wherein a value of the quantization parameter is clipped to be greater than or equal to a specific value, the specific value being set based on transformation for the current block, and
wherein the transformation is determined based on the color component of the current block.

10. The method of claim 9,
wherein the value of the quantization parameter is clipped to be less than or equal to a predetermined upper value.

11. The method of claim 9,
wherein the transformation is from spatial domain to frequency domain and is encoded as transform skip flag.

12. The method of claim 11,
wherein a predetermined lower value is set to be 0 or a minimum value of the quantization parameter for a transform skip mode.

13. The method of claim 9,
wherein based on the color component of the current block being a chroma Cr component and the color space transform for the residual samples of the current block being applied, an absolute value of the quantization parameter offset is set to be 3.

14. The method for transmitting a bitstream generated by the image encoding method of claim 9.

15. A non-transitory computer-readable recording medium storing a bitstream generated by the image encoding method of claim 9.

* * * * *